United States Patent [19]

Davis et al.

[11] 4,385,357
[45] May 24, 1983

[54] WATER TREATMENT SYSTEM AND CONTROL THEREFOR

[75] Inventors: Stephen H. Davis, Dayton; Donald J. Muckerheide, Centerville, both of Ohio

[73] Assignee: Water Refining Company, Inc., Middletown, Ohio

[21] Appl. No.: 896,568

[22] Filed: Apr. 14, 1978

[51] Int. Cl.³ .................. G02F 15/46; G02F 1/42
[52] U.S. Cl. ..................... 364/500; 210/662; 210/670; 210/138; 210/143
[58] Field of Search .............. 210/98, 104, 103, 96, 210/138–141

[56] References Cited

U.S. PATENT DOCUMENTS

| | | | |
|---|---|---|---|
| 2,067,808 | 1/1937 | Zimmerman et al. | 210/104 |
| 2,919,805 | 1/1960 | Nickols | 210/141 |
| 3,130,134 | 4/1964 | Hesket | 210/104 |
| 3,176,844 | 4/1965 | Nelson | 210/96 |
| 3,278,424 | 10/1966 | Griswold | 210/140 |
| 3,366,241 | 1/1968 | McMorris | 210/138 X |
| 3,531,402 | 9/1970 | Thompson | 210/140 X |
| 3,687,289 | 8/1972 | Tischler | 210/89 |
| 3,874,412 | 4/1975 | Fleckenstein et al. | 210/140 X |
| 3,891,552 | 6/1975 | Prior et al. | 210/98 |
| 4,145,279 | 3/1979 | Selby, III | 210/108 X |

Primary Examiner—John Adee
Attorney, Agent, or Firm—Biebel, French & Nauman

[57] ABSTRACT

A water treatment system includes a water treatment tank containing a resin bed through which water is passed for treatment thereof during normal operation of the treatment system. A brine tank contains a brine solution which, when passed through the resin bed, results in regeneration of the treatment effectiveness of the bed. A plurality of electrically actuatable valve means direct water through the treatment tank during normal operation of the treatment system and direct brine solution through the treatment tank in a regeneration operation. A control for the water treatment system includes means for manually entering control data, display means for displaying data, and sensor means for sensing the volume of water treated by the water treatment system. A controller circuit means is responsive to means for manually entering control data and to the sensor means and is connected to display data on the display means. The controller circuit means provides electrical control signals to the plurality of electrically actuatable valve means. The sequence, duration, and time of occurrence of the electrical control signals is determined by the control data entered through the means for manually entering control data.

10 Claims, 20 Drawing Figures

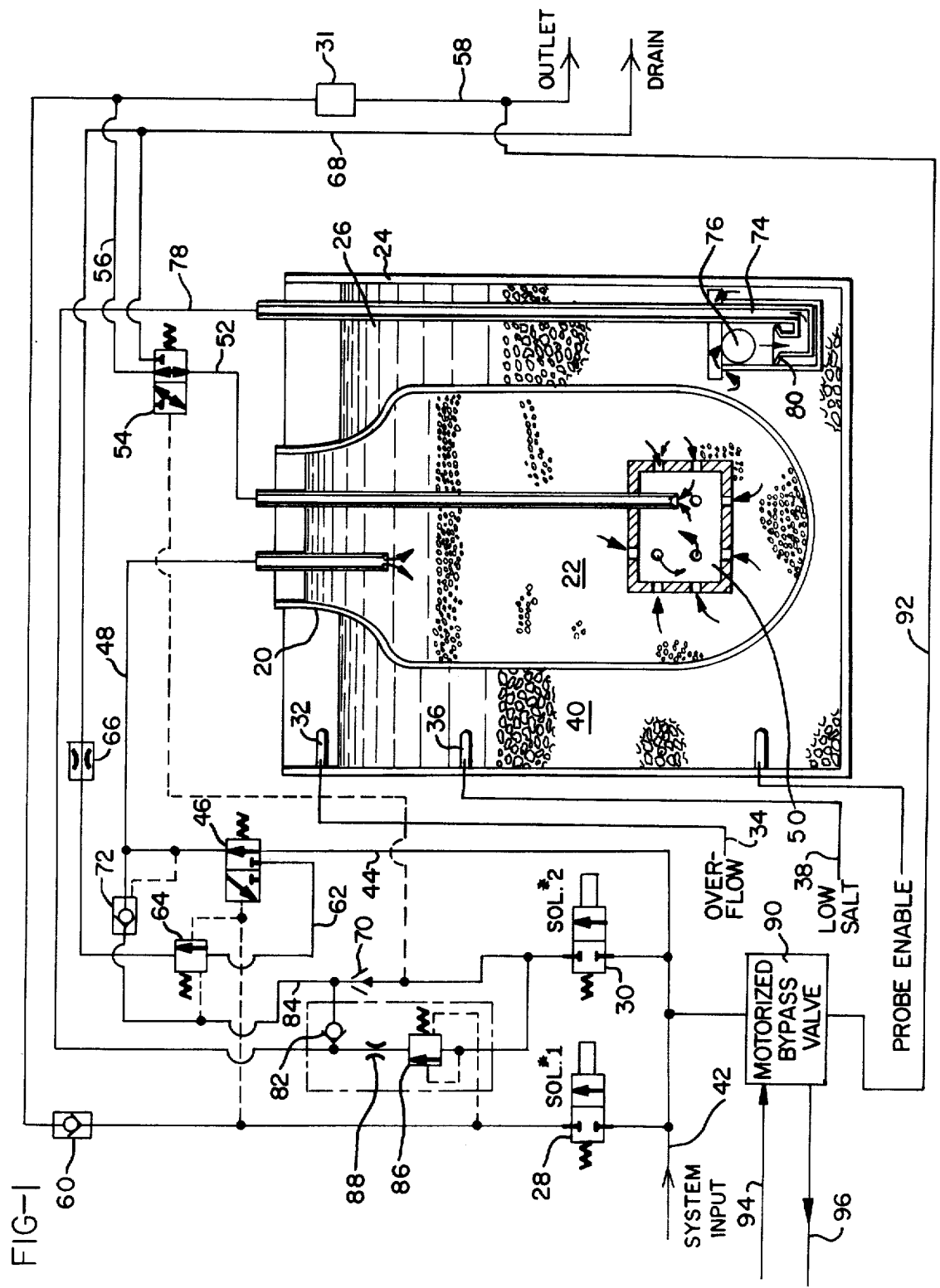

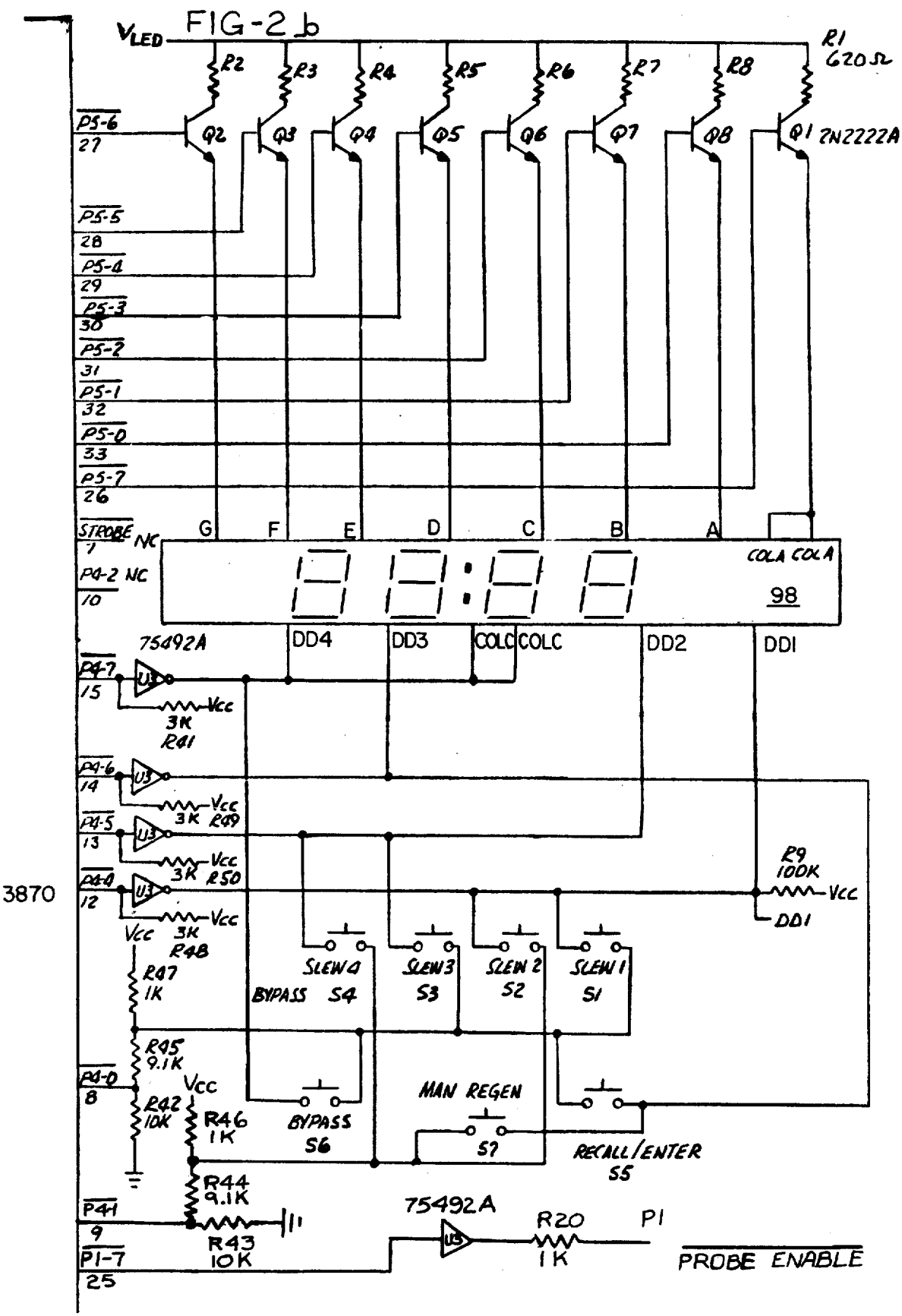

FIG-2c-
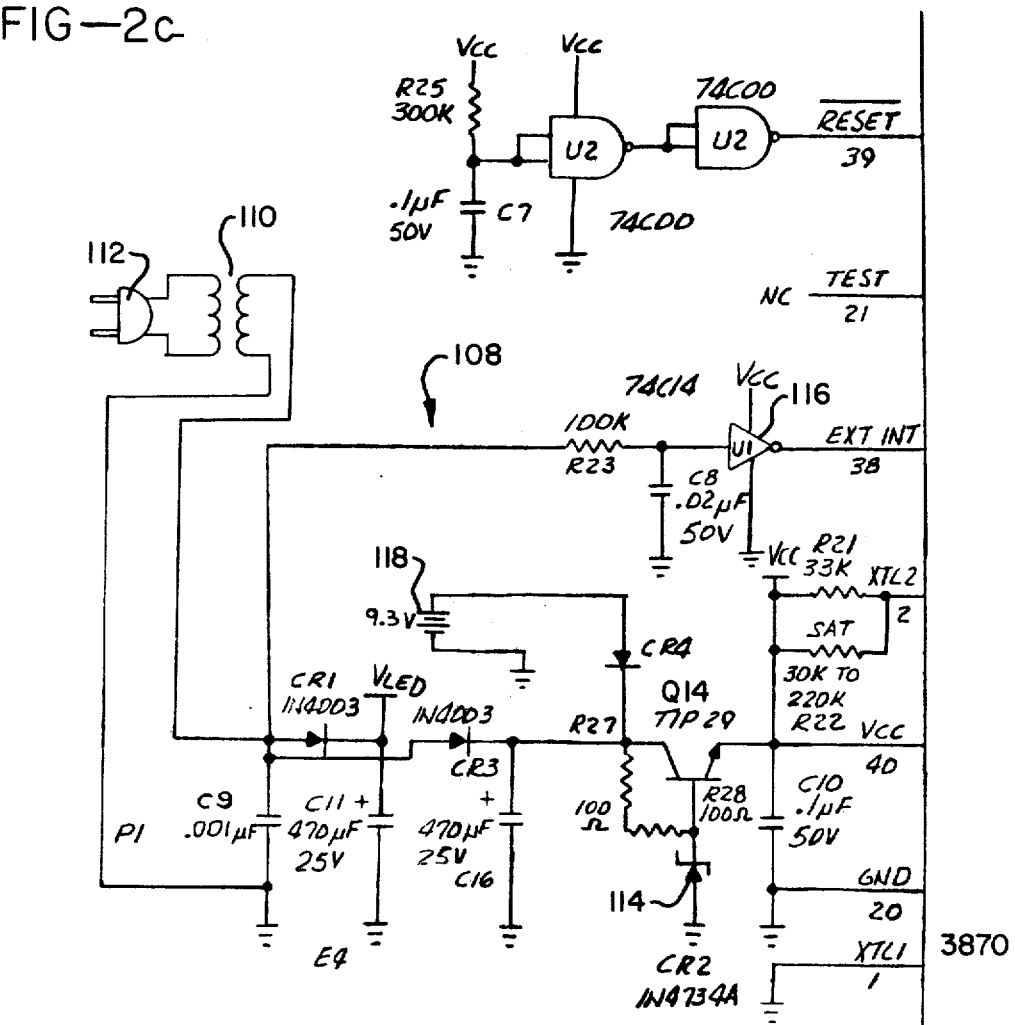

MAIN LINE

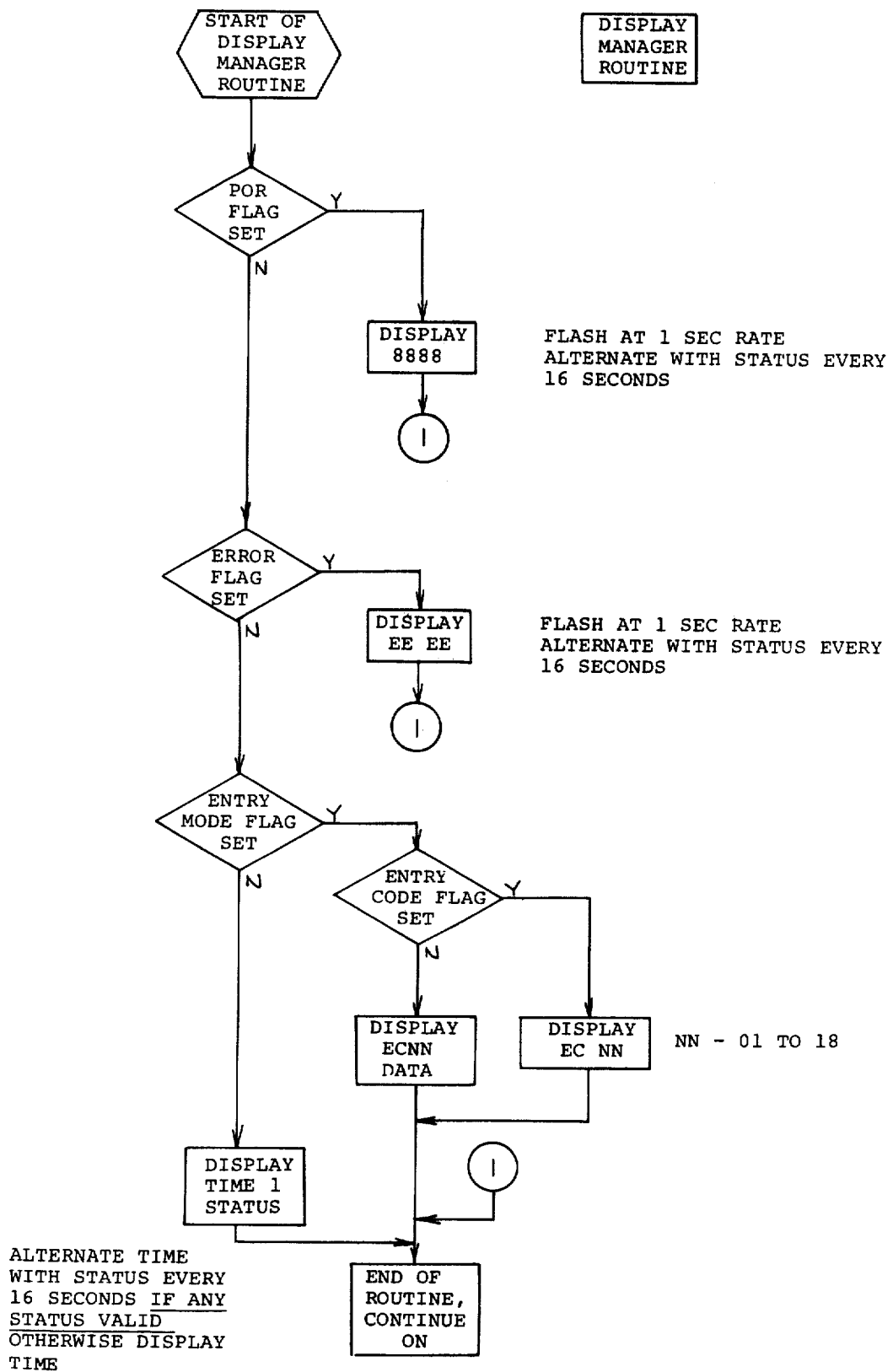

FIG-10 b
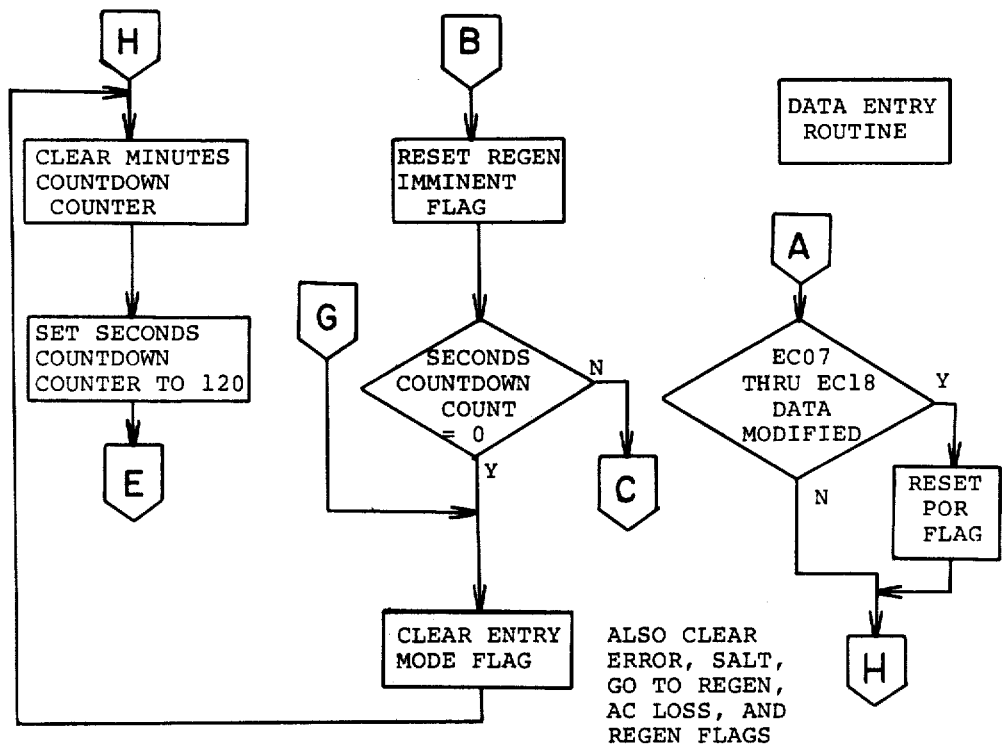
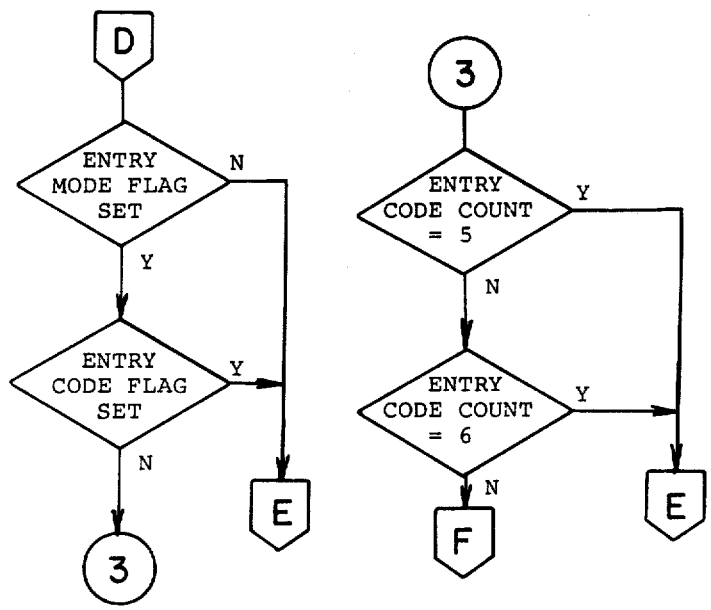

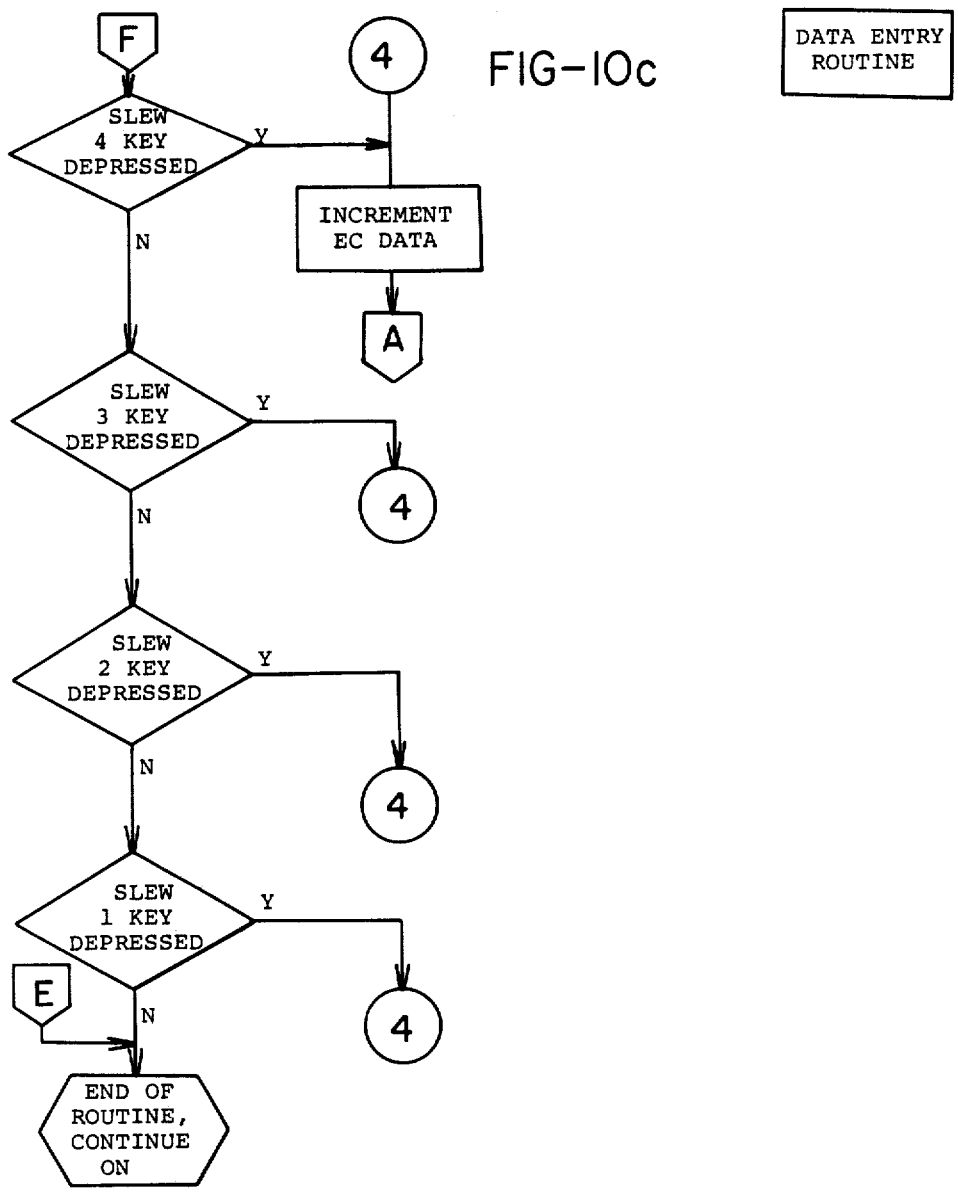

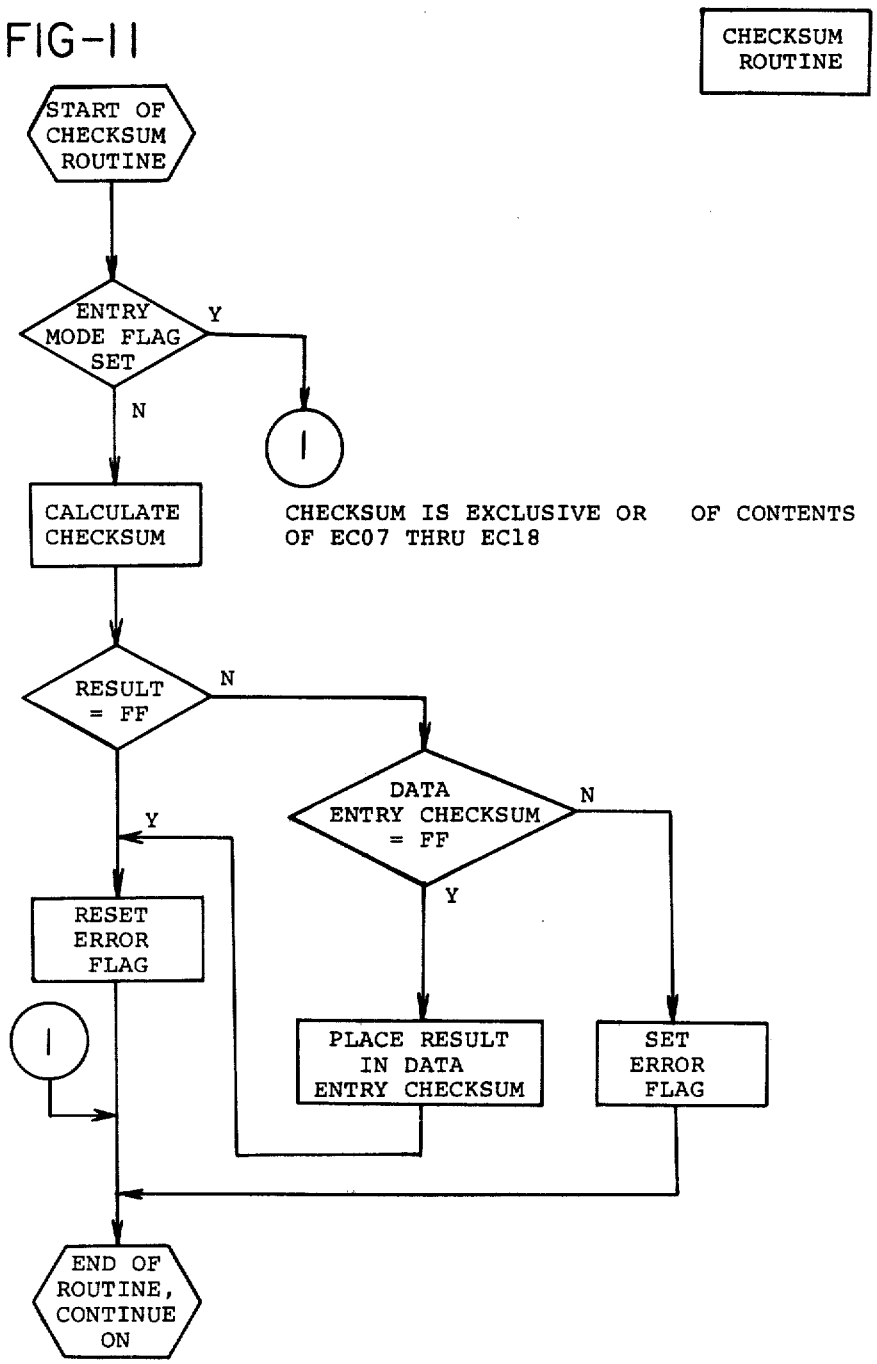

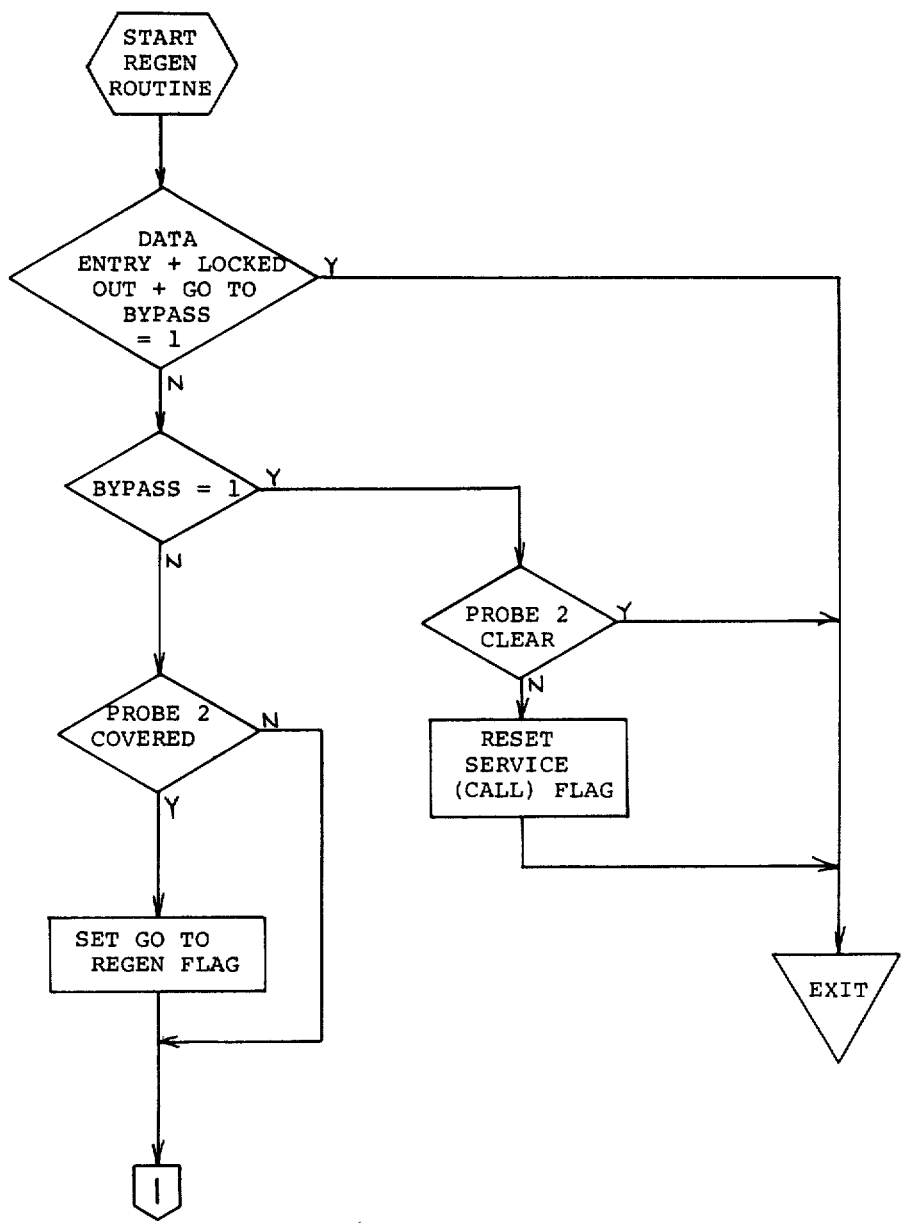

REGEN
PROBE 2 ROUTINE

REGEN SALT ROUTINE

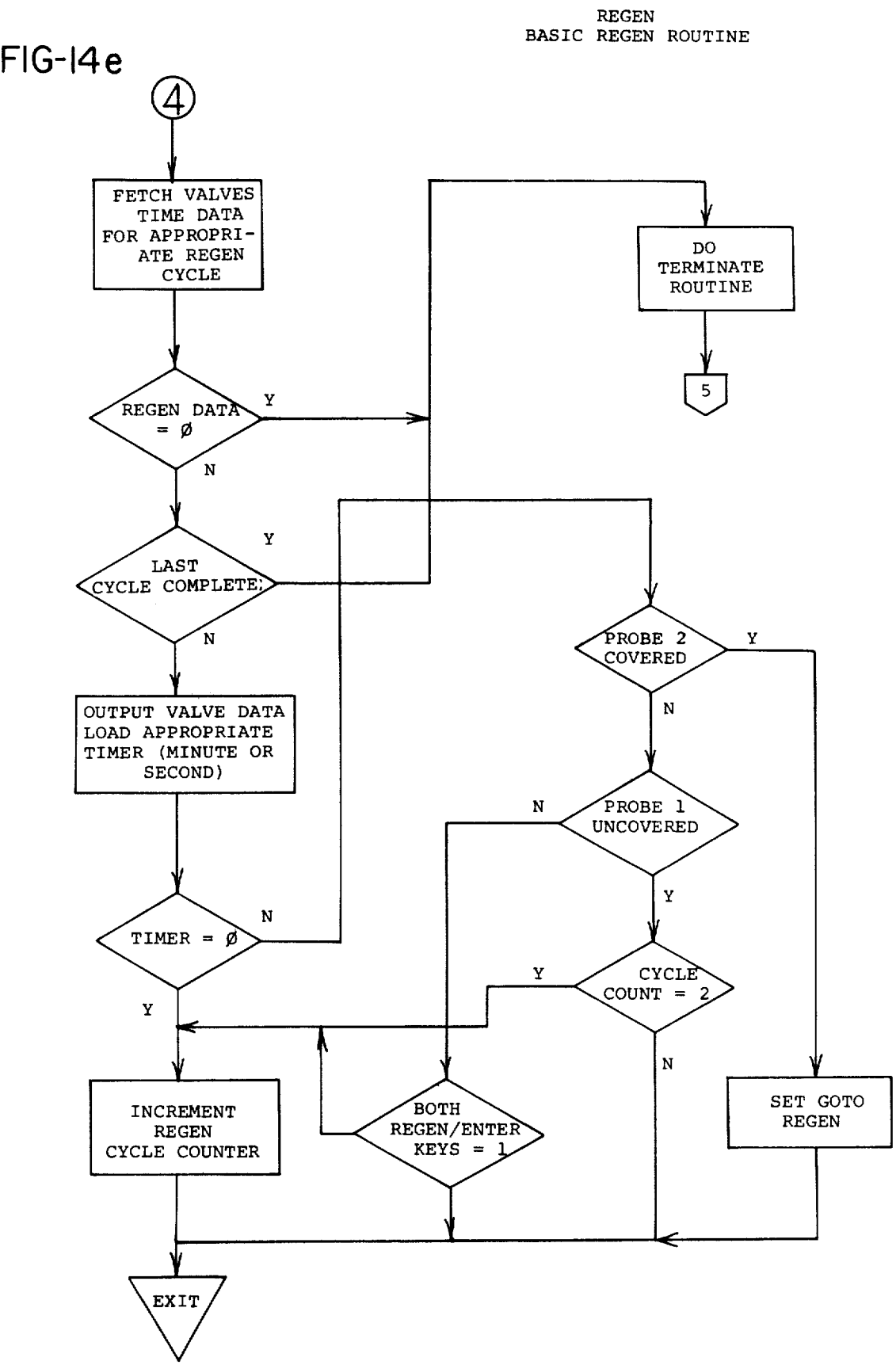

REGEN TERMINATE ROUTINE

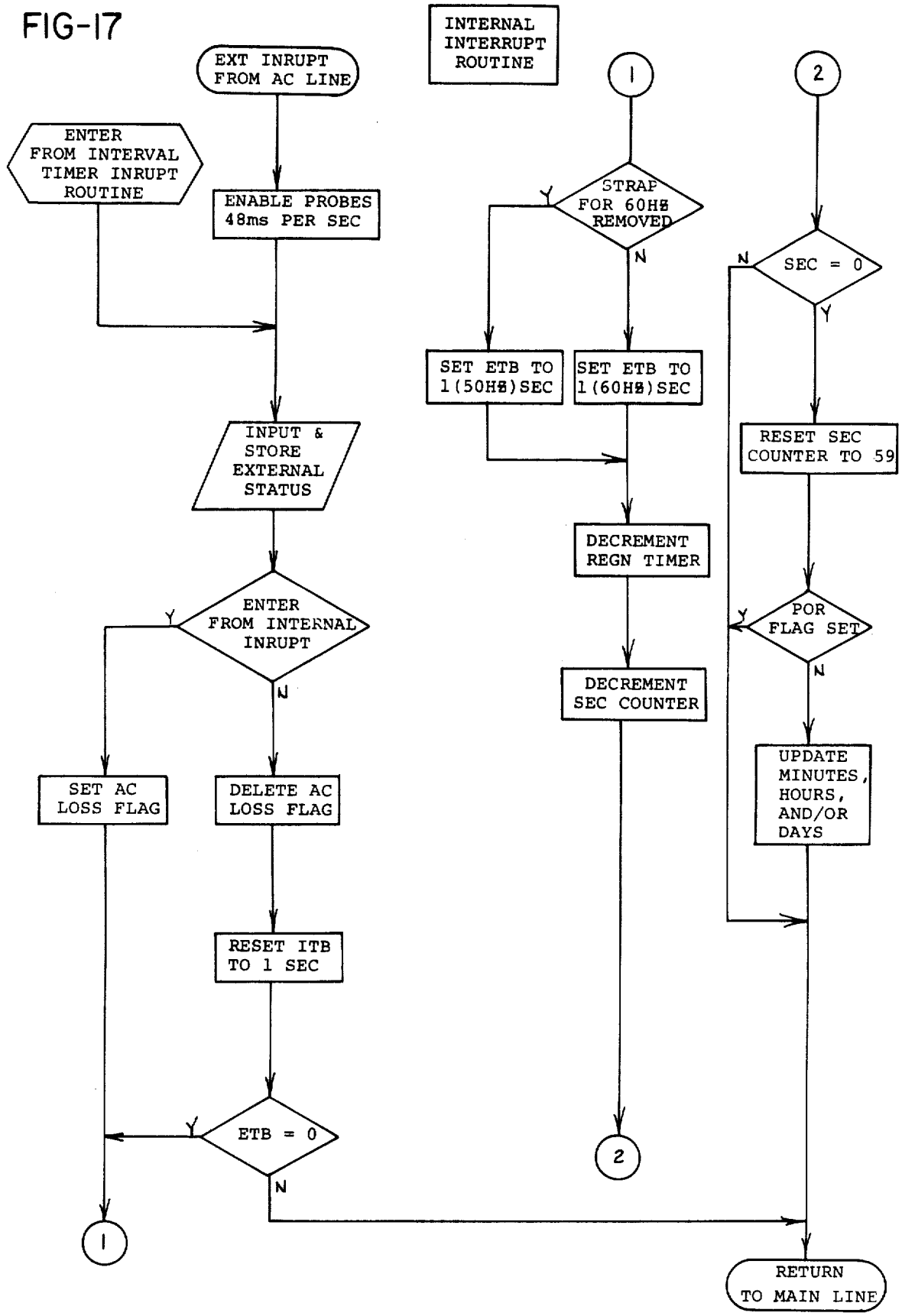

WATER TREATMENT SYSTEM AND CONTROL THEREFOR

BACKGROUND OF THE INVENTION

The present invention relates to water treating systems and, more particularly, to a water treatment system, the efficacy of which may be periodically regenerated, and an electronic control for such a treatment system.

Water treatment systems may typically include a treatment tank which is filled with a resin material, such as zeolite, forming a resin bed through which untreated water is directed. In the case of a zeolite resin bed, hard water passing through the treatment bed will experience an ion exchange process in which the sodium ions are exchanged for hard metal ions in the water. The water treating efficacy of the zeolite bed will be gradually reduced and, after a predetermined quantity of water has been treated, the ion exchange process will no longer take place. It is possible to generate the zeolite bed, however, by passing a salt brine solution through the bed to reverse the ion exchange process. The maximum period of time between successive regeneration operations is dependent upon both the hardness of the water and the quantity of water which is treated.

The operation and regeneration of prior art water treatment systems have generally been controlled by simple timer arrangements in which a regeneration cycle is initiated at a predetermined time, usually late at night, every several days. Such a regeneration control scheme results in regeneration at times which roughly approximate those at which regeneration is actually required. During periods of unusually high water usage, the zeolite bed effectiveness may be depleted substantially before regeneration occurs, thus resulting in only partially treated water being supplied by the softener. Conversely, during periods of time in which little water is used, regeneration will occur too frequently and brine solution will be wasted.

The brine which is used during regeneration is stored in a brine tank to which salt is periodically added. Should the quantity of salt in the brine tank be reduced substantially without additional salt being added, the brine solution used for regeneration may be sufficiently concentrated to restore the water treating efficacy of the resin bed. Prior art control devices made no provision for altering the regeneration cycle to compensate for this condition. Additionally, refilling the brine tank after regeneration has typically been accomplished by applying water through a control valve arrangement for a predetermined period of time. Should this valve arrangement malfunction, the brine tank might overflow. No provision has been made in prior art systems to detect or correct this condition.

Several prior art controls have been designed to minimize brine solution waste, while providing more frequent regeneration during periods of heavy water use. One such control is shown in U.S. Pat. No. 3,176,844, issued Apr. 6, 1965, to Nelson, in which the resistance between electrodes in the water softener treatment tank is measured to determine when the softening capability of the zeolite bed has been depleted. When depletion occurs, the regeneration operation is initiated.

Another technique is shown in U.S. Pat. No. 3,687,289, issued Oct. 29, 1972, to Tischler, in which a small fraction of the treated water is metered into an adjustable water storage chamber. The water in the chamber is periodically directed to the brine storage tank and when the liquid level in the brine storage tank reaches a predetermined height, a timer is actuated. The timer will cause regeneration of the system at a selected time during the following 24-hour period.

A control system for controlling regeneration of a water softener system is disclosed in U.S. patent application Ser. No. 779,097, filed Mar. 18, 1977, by Davis, and assigned to the assignee of the present invention. The Davis application discloses an electrical water softener control which includes a flow meter in the water line providing a pulse output of a frequency proportional to the flow rate of the water treated by the softener. A counter circuit initiates regeneration at a predetermined time of day next occurring after a quantity of water equal to the treatment capacity of the system, less an average 24-hour supply, has been treated. The circuit will also initiate regeneration immediately, should a quantity of water equal to the treatment capacity of the system be treated.

The control systems which have monitored the level of brine solution in the brine tank of a water softener have generally relied upon mechanical or electromechanical level sensors. U.S. Pat. No. 2,067,808, issued Jan. 12, 1937, to Zimmerman, et al, for instance, discloses a softener in which the level of brine solution in the brine tank is sensed by means of a simple float arrangement. U.S. Pat. No. 3,130,154, issued Apr. 21, 1964, to Heskett, discloses a fluid level control arrangement for the brine tank of a softener in which air is trapped in a chamber by rising brine fluid and, when the brine solution reaches a predetermined level, actuates a pressure-responsive electrical switch. U.S. Pat. No. 2,919,805, issued Jan. 5, 1960, to Nickols discloses a water softener having a brine tank in which electrical probes are used to detect when the solution in the brine tank has reached the lowest desired level during regeneration and also to detect when the brine tank has been refilled to a selected level during regeneration. The control circuit in the Nickols patent, however, includes a relatively simple electro-mechanical timer device.

It is seen, therefore, that a need exists for a water treatment system and a control therefor in which operation and regeneration of the system are monitored and controlled electrically by a control device providing maximum flexibility in operation of the system. Such a control arrangement should permit both the timing and sequencing of the system operations to be controlled selectively and, further, should provide various error indicating and correcting operations in the event of a malfunction of the treatment system.

SUMMARY OF THE INVENTION

A water treatment system includes a water treatment tank containing a resin bed through which water is passed for treatment thereof during normal operation of the treatment system. A brine tank contains a brine solution which, when passed through the resin bed, regenerates the treatment effectiveness of the bed. A plurality of electrically actuatable valve means direct water through the treatment tank during normal operation of the treatment system and direct brine solution through the treatment tank in a regeneration operation. The water treatment system control includes a means for manually entering control data, display means for displaying data, sensor means for sensing the volume of water treated by the water treatment system, and controller circuit means. The controller circuit means is responsive to the means for manually entering control data and to the sensor means. The controller circuit means is connected to display data on the display means and provides electrical control signals to the plurality of electrically actuatable valve means. The sequence, duration, and time of occurrence of the electrical control signals applied to the valve means are determined by the control data entered through the means for manually entering control data.

The controller circuit means may include means, responsive to the sensor means, for accumulating the volume of water treated by the treatment system and for disabling the treatment system when a predetermined volume of water has been treated. The controller circuit means may also include a means for providing display signals to the display means such that a plurality of entry code indicia are sequentially displayed by the display means, with the control data associated with each of the entry code indicia being displayed directly after display of the respective entry code indicia.

The means for manually entering control data comprises a plurality of slew control switches, each of which is associated with one digit in a multi-digit display arrangement. Actuation of a slew control switch will change the control data digit associated therewith.

One of the plurality of entry code indicia may have associated therewith control data related in value to the control data associated with the remainder of the plurality of entry code indicia. The control data associated with the one of the plurality of entry code indicia may be a check sum which is compared with the sum of the balance of the control data associated with the remainder of the plurality of entry code indicia to detect an error in entry of control data.

The controller circuit means also includes means for counting the number of times that the treatment system is regenerated. A bypass water line bypassing the water treatment tank includes a motor-powered bypass valve and means for actuating the bypass valve when the water treatment system is disabled. The controller circuit means may further comprise a memory which provides a back-up control data for use by the controller circuit means as required, should control data not be entered by the means for manually entering control data.

An electrical overflow probe in the brine tank detects when the level of brine solution in the brine tank exceeds a predetermined overflow level and provides an overflow signal to the controller circuit means which results in initiation of a regeneration operation. Should the overflow signal continue to be provided to the controller circuit means for more than a specified period of time after the regeneration operation is initiated, the water treatment system will be disabled. An electrical low salt probe may also be provided in the brine tank for detecting when the level of brine solution in the brine tank is less than a predetermined low salt level and for providing a low salt signal to the controller circuit means. The controller circuit means will provide a low salt display signal to the display means upon receipt of the low salt signal, such that a low salt warning display is provided until the low salt signal is terminated. Additionally, the controller circuit means will control the regeneration operation next occurring after termination of the low salt signal such that a greater quantity of brine solution is passed through the resin bed than during the previous regeneration operation. The control may further include an alternate power source means, including a battery, for providing power upon failure of the external alternating current power source.

Accordingly, it is an object of the present invention to provide a water treatment system and a control therefor which may be programmed by an operator such that the sequencing, duration, and occurrence time of electrical control signals provided to controlling valve mechanisms in the system may be programmed; to provide such a system and control which are responsive to operation of the treatment system for controlling regeneration thereof; to provide such a system and control which senses fluid levels in the system and provides modification of system operation in response to inappropriate fluid levels; to provide such a system and control in which control data may be simply entered and modified; and to provide such a system and control which will sense the system operation and disable the system after predetermined system operation limits have been reached.

BRIEF DESCRIPTION OF THE DRAWINGS

FIG. 1 is a schematic diagram illustrating the flow of water through the system and subsequent regeneration of the system;

FIGS. 2a-2d, when assembled with FIG. 2a above FIG. 2c and FIG. 2b above FIG. 2d with FIGS. 2a and 2c to the left of FIGS. 2b and 2d, is an electrical schematic representation of circuitry forming a portion of the control of the present invention; and FIGS. 3-17 comprise a flow chart illustrating the sequence of steps undertaken by a micro-computer control in the control of the present invention.

DETAILED DESCRIPTION OF THE PREFERRED EMBODIMENT

Figure 2A:
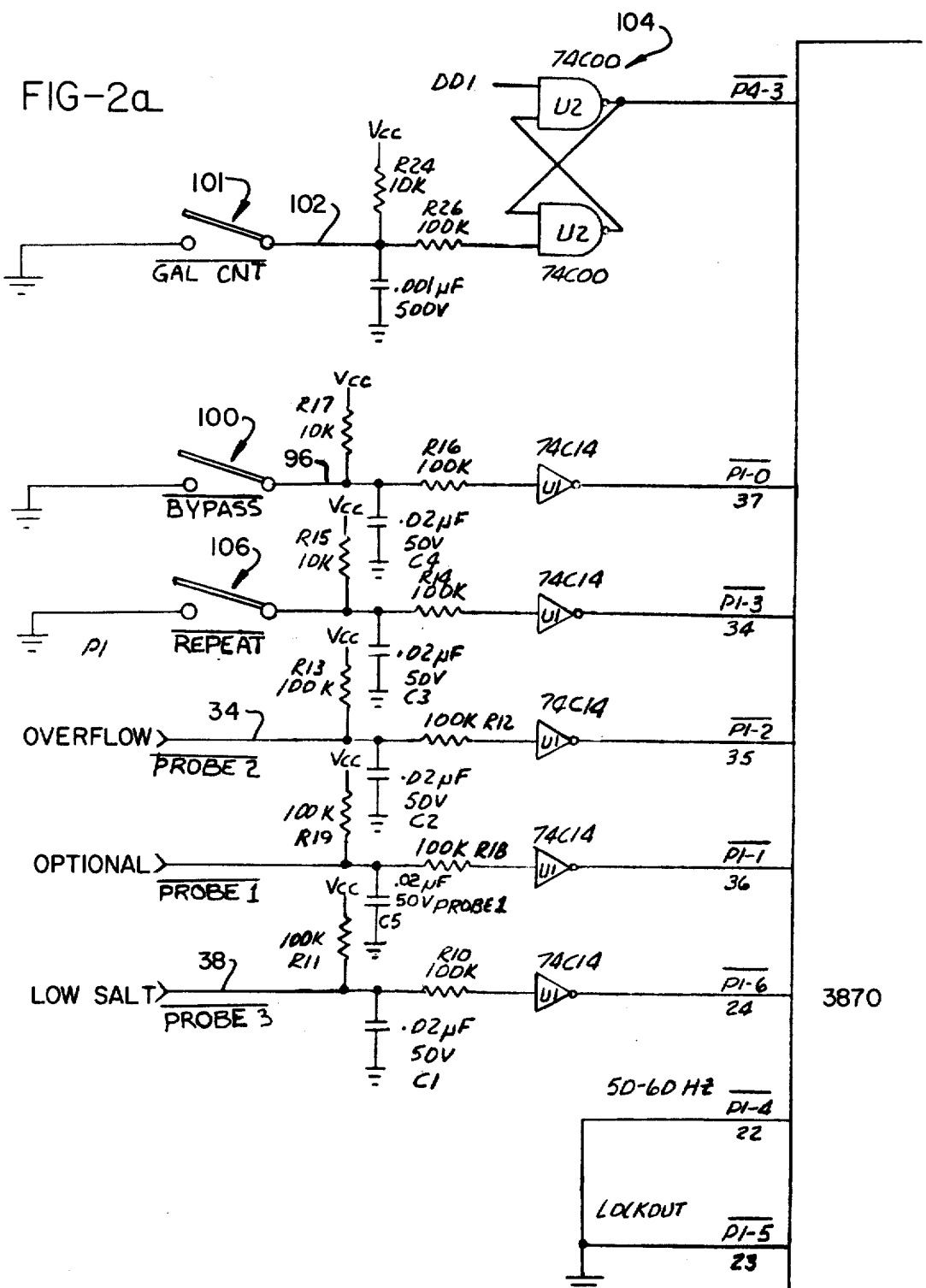
Figure 2D:
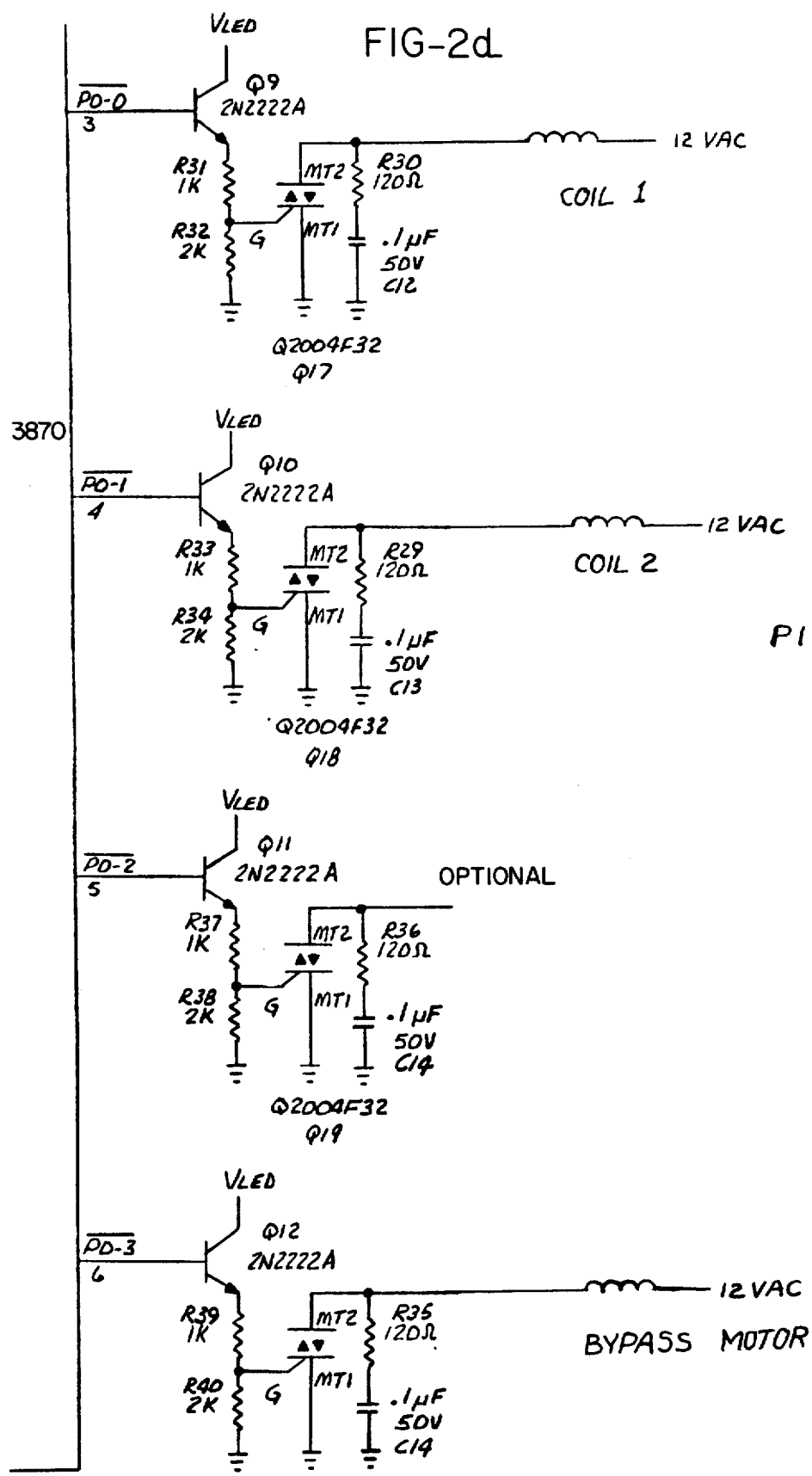

Reference is now made to FIG. 1 which illustrates the water treatment system of the present invention. The treatment system includes a treatment tank 20, containing a resin bed 22 through which water is passed for treatment thereof during normal operation of the treatment system. A brine tank 24 contains a brine solution 26 which, when passed through the resin bed 22, regenerates the treatment effectiveness of the bed 22. A plurality of electrically actuatable valves, including solenoid actuated valves 28 and 30, direct water through the treatment tank 20 during normal operation of the treatment system and direct brine solution through the treatment tank 20 during a regeneration operation. A treatment system control includes a sensor means 31 such as an electrical flow meter, for sensing the volume of water treated by the water treatment system.

The control additionally includes an electrical overflow probe means 32 for detecting when the level of brine solution in the brine tank 24 exceeds a predetermined overflow level and for providing an overflow signal on line 34 in response thereto. An electrical low salt probe means 36 is also provided in the brine tank 24 for detecting when the level of brine solution in the brine tank is less than a predetermined low salt level and for providing a low salt signal on line 38. A quantity of salt 40 in the brine tank 24 assures a sufficient salt concentration in the brine solution. The treatment tank 20 is shown in FIG. 1 as contained within the brine tank 24. It will be appreciated that the treatment tank 20 may be taken out of the brine tank 24 and placed at a remote location as long as the water lines between the two tanks are properly connected.

During normal operation of the treatment system, raw, untreated water is received on line 42. Since solenoid valves 28 and 30 are not actuated, the untreated water flows through line 44, valve 46, line 48, and into the treatment tank 20. The resin bed 22 in the tank 20 may typically be a zeolite resin bed which, through the well known ion exchange process discussed previously, softens the water. Outlet distributor 50 receives the treated water which then flows through line 52, valve 54, line 56, and outlet line 58.

When regeneration is desired, solenoid 1 is actuated, thus placing valve 28 into its left-most position and initiating a backwash cycle. During the backwash cycle, the softening system is bypassed via valve 28 and check valve 60. At the same time, untreated water is supplied from line 58 via line 56, valve 55, and line 52 to the outlet distributor 50 in the water treatment tank 20. This backwash process loosens the resin bed and facilitates regeneration of the zeolite. The water then flows out of line 48 and, via pilot-actuated valve 46, to line 62. Pilot-actuated valve 64 will also be actuated and will pass this water through the backwash flow control valve 66 to the drain line 68.

After the backwash operation has occurred for a sufficient period of time, solenoid 2 will also be energized, thus actuating valve 30 into its left-most position. The brining cycle will now begin in which a brine solution 26 from the brine tank 24 will be supplied to the water treatment tank 20. When solenoid 2 actuates valve 30, water flow through jet 70 and check valve 72 siphons the brine solution out of the brine tank 24 via air check valve 74. Air check valve 74 includes a float 76 and is provided to insure that line 78 is closed when the fluid level in the brine tank drops to the level of the valve seating arrangement 80. Brine solution is siphoned through line 78 and is provided through check valve 82 to line 84. The brine solution passes through line 48, treatment tank 20, line 52 and, since pilot-actuated valve 54 is actuated, the brine solution flows into drain line 68. After the air check valve 74 closes, siphoning is terminated. Water continues to flow from line 42 through jet 70 and tank 20, thus providing a slow rinse cycle.

Double pilot-actuated valve 86 is spring biased such that it will remain normally closed when receiving pilot pressure on both sides. If solenoid 1 is now deenergized, however, valve 28 will be de-energized, thus removing the pilot pressure from the right side of valve 86. Valve 86 will therefore be pilot-actuated open and, since it is across jet 70, the siphoning effect of the jet will be terminated. Additionally, the pilot pressure will be removed from line valve 46 with the result that water will begin flowing through line 48 into tank 20. A fast rinse cycle is thus initiated. Since, at this point, valve 30 is still actuated, pilot-actuated valve 54 continues to supply the output from tank 20 to the drain line 68.

During the fast rinse cycle, water is supplied through valve 30, valve 86, control valve 88, to line 78 such that brine tank 24 is refilled with water. Valve 86 controls the flow of water to the brine tank 24, insuring that the proper quantity of water is added to the brine tank. At the conclusion of the fast rinse and brine tank refill cycles, solenoids 1 and 2 are de-energized and the water treatment system returns to its normal operational mode in which water passes from line 42 to outlet 58 via the treatment tank 20.

It may be desirable or necessary at certain times for the flow of water from line 42 to outlet line 58 to bypass the treatment system completely. For this purpose, a motor-powered bypass valve 90 is provided in a bypass water line 92. The bypass valve is actuated by an electrical control signal applied to line 94. Line 96 provides an electrical indication to the system control of whether the bypass valve 90 is open or closed.

Reference is now made to FIGS. 2a-2d which, when assembled, illustrate schematically the water treatment system control of the present invention. Slew switches S1, S2, S3, and S4 provide a means for manually entering control data into the system control. A display means for displaying data includes a four-digit, seven-segment display 98 with the anode of each LED segment in each of the digits connecting to a respective one of transistors Q1-Q8.

The electrical flow meter 31 (FIG. 1) is shown diagrammatically as a switch in FIG. 2. This flow meter may be of the type in which a turbine in the water line includes a magnet which passes a reed switch repeatedly as the turbine is rotated by the flow of water through the line. The number of switch closures, therefore, is proportional to the volume of water which passes through the line. Switch 100 is associated with the bypass valve 90 (FIG. 1) and applies a signal to line 96 indicating whether the valve 90 is open or closed.

The control of FIG. 2 includes a controller circuit means which is responsive to the means for manually entering control data and to the sensor means, and is connected to display data on the display means. The controller circuit means provides electrical control signals to the plurality of electrically actuatable valve means. The sequence, duration, and time of occurrence of the electrical control signals are determined by control data entered through the means for manually entering control data. The controller circuit means advantageously includes a microcomputer MK 3870, available from Mostek Corporation, Carrollton, Texas.

Output lines from the micro-computer include lines $\overline{\text{PO-0}}$, $\overline{\text{PO-1}}$, $\overline{\text{PO-2}}$, and $\overline{\text{PO-3}}$. When line $\overline{\text{PO-0}}$ goes high, transistor Q9 will be switched on, causing the gate input of the associated triac to go high. This will turn on the triac, permitting current flow through the coil 1 and energizing the solenoid-controlled valve 28 (FIG. 1). Similarly, a high signal on lines $\overline{\text{PO-1}}$ and $\overline{\text{PO-3}}$ will result in energization of the coil 2, associated with valve 30, and the bypass motor coil associated with the valve 90, respectively.

The $\overline{\text{PO-2}}$ output provides an optional control signal which may be used to control additional solenoid-actuated valves which could be added to the water treatment system of FIG. 1. The MK 3870 micro-computer provides further additional output lines which are not used in the illustrated control but which might be used to control a modified version of the disclosed treatment system.

Switch 101 is the reed switch which is repetitively closed and opened by a magnet mounted on the turbine in the flow meter 31. Pulses applied to line 102 will therefore set the flip-flop 104 such that the input $\overline{\text{P4-3}}$ will go high. The DD1 low-going pulses which are applied to the upper NAND gate reset the flip-flop 104. The micro-computer accumulates the pulses applied to input $\overline{\text{P4-3}}$ and thus keeps track of the total volume of water treated since the installation of the water treatment system. The control circuit of the present invention also accumulates the pulses received on line $\overline{\text{P4-3}}$ to keep track of the volume of water treatment between successive regeneration cycles.

The bypass switch 100 provides a signal to input P1-0 via a monostable multi-vibrator indicating whether bypass valve 90 is opened or closed. An optional repeat switch 106 may be manually actuated to provide a signal to input P1-3 via a monostable multi-vibrator causing the system to return to its initial regeneration step.

A probe input, indicated as PROBE 2, receives the output signal from the overflow electrical probe 32 on line 34 and applies it via a monostable multi-vibrator to input P1-2. The output of the low salt probe 36 on line 38 is applied to the input $\overline{P1\text{-}6}$ via a monostable multi-vibrator. An optional probe input, labeled $\overline{PROBE\ 1}$ may be applied to the input line $\overline{P1\text{-}1}$ via a monostable multi-vibrator. This optional probe may be used, for instance, to detect a fluid level in a water treatment system of a different design. The signal applied to this input may be used to control operation of the optional control line $\overline{P0\text{-}2}$.

It has been found desirable to check the probes by periodically grounding a continuity probe which is positioned in the bottom of the brine tank 24. If the probes were monitored continuously, it will be appreciated that current flow between the probes and the continuity probe might result in deterioration of the probe structures.

Inputs $\overline{P1\text{-}4}$ and $\overline{P1\text{-}5}$ are shown as grounded. Input $\overline{P1\text{-}4}$ is grounded when the system operates on 60 cycle power. The ground will be removed from the $\overline{P1\text{-}4}$ input when a 50 cycle power supply is used. The system operates in what is termed a "lock out mode" when the $\overline{P1\text{-}5}$ input is grounded. When the number of pulses received from the sensor switch 32 indicates that one million gallons of water have been treated, the water treatment system will then shut down, the bypass valve will be actuated, and a CALL display presented on the display 98, if the lock out mode has been selected.

A RESET is presented at pin 39 when the control system is initially installed and turned on or when power is reapplied after a power outage.

A power supply circuit, indicated generally at 108, includes a transformer 110 which steps down the 120 volt AC line current received through connector 112 and provides a 12 volt AC output across capacitor C9. Capacitor C11 and diode CR1 provide a voltage $V_{LED}$ which powers the display 98. The diode CR3 and capacitor C16 provide a rectified potential to a power regulator circuit, including transistor Q14 and zener diode 114. Zener diode 114 is reverse biased such that the base of Q14 is held at approximately 5.6 volts. The emitter of transistor Q14 will therefore provide a 5 volt potential, $V_{cc}$, which is used as a biasing potential in various portions of the control circuit.

Resistor R23 and capacitor C8 filter the alternating current signal across capacitor C9 and provide this signal to monostable multi-vibrator 116. The output of trigger 116, termed EXT. INT., is an external interrupt signal which is used by the micro-computer MK 3870 for time-keeping purposes.

Should a power failure occur in which power is no longer provided to the transformer 110, diode CR4 will no longer be reverse biased and the 9.3 volt battery 118 will provide sufficient power to the regulator circuit to power the micro-computer for approximately a four-hour period.

The outputs $\overline{P5\text{-}0}$, $\overline{P5\text{-}1}$, $\overline{P5\text{-}2}$, $\overline{P5\text{-}3}$, $\overline{P5\text{-}4}$, $\overline{P5\text{-}5}$, and $\overline{P5\text{-}6}$ provide gating signals to transistors Q8-Q2, respectively. When a high signal appears at one of the $\overline{P5\text{-}0}$-$\overline{P5\text{-}6}$ outputs, the associated transistor will be switched on, resulting in application of voltage $V_{LED}$ to the inputs A-G of display 98. Each of the four digits displayed by display 98 is made up of seven bars which are illuminated individually by seven light-emitting diodes. The seven inputs A-G are each connected to the anode of one light-emitting diode associated with each digit. The outputs $\overline{P4\text{-}4}$, $\overline{P4\text{-}5}$, $\overline{P4\text{-}6}$, and $\overline{P4\text{-}7}$ are connected to the DD1, DD2, DD3, and DD4 inputs of display 98. When the DD1 input goes low, the cathodes of all of the light-emitting diodes associated with the least significant digit are grounded. The DD1 signal is also applied to the reset input of the flip-flop 104. When the DD2 input goes low, the cathodes of all of the light-emitting diodes associated with the next to the least significant digit are grounded. When the DD3 input goes low, the cathodes of all of the light-emitting diodes associated with the second most significant digit are grounded. Finally, when the DD4 input goes low, the cathodes of all of the light-emitting diodes associated with the most significant digit are grounded. The outputs $\overline{P4\text{-}4}$-$\overline{P4\text{-}7}$ are sequentially strobed such that the DD1-DD4 outputs will be grounded sequentially, thus providing for sequential display of the four digits with only seven data input lines. The colon appearing between the second and third digits will be illuminated when the Q1 transistor is switched on.

Switches S1-S5 provide the means for manually entering control data. When the recall/enter switch S5 is depressed, the first of a plurality of entry code indicia will be displayed on display 98. When switch S5 is again closed, the control data associated with the first entry code indicia will then be displayed. Closing switch S5 again will result in the second entry code indicia being displayed. A subsequent closure of switch S5 will result in the control data associated with the second entry code indicia being displayed. Thus by repeated closure of switch S5, an operator can cause to be displayed in sequence each of a plurality of entry code indicia with the control data associated with each of the entry code indicia being displayed directly after display of the respective entry code indicia. When control data is being displayed, it is possible to change the value of this data by depressing switches S1-S4. When switch S1 is depressed, the least significant digit will quickly step upward through all possible values of the digit. When the digit reaches the value desired by the operator, switch S1 is released and the desired data change is complete. Similarly, switches S2-S4 may be held closed until the desired control data values appear on the display in the digit positions associated with each of the switches.

Bypass switch S6 is provided to permit manual control of the bypass valve 90. Switch S7, when closed, will initiate a regeneration operation. Inputs $\overline{P4\text{-}0}$ and $\overline{P4\text{-}1}$ are grounded upon closure of switches S1-S7. The 3870 micro-computer notes the time at which this grounding occurs and translates this into information indicating closure of the respective switch S1-S7.

When power is initially turned on after installation of the system or when power is reapplied after a power outage of sufficient duration such that the battery 118 is discharged, the display will flash 88 88 at a one-second rate. A standard regeneration schedule which is stored in the micro-computer in a read only memory (ROM) will be transferred to a random access memory (RAM) and used to control a regeneration cycle which is immediately initiated, assuming that the bypass valve is not opened. After this initial regeneration, the micro-computer monitors the volume of water treated by the treatment system and, unless otherwise programmed, initiates a regeneration operation every 200 gallons.

The probe 32 is monitored and if this probe is in contact with brine solution in the brine tank, solenoids 1 and 2 are energized for two minutes, causing brine to be siphoned out of the brine tank. Should the probe 32 remain in contact with the brine solution for two minutes, the treatment system will be bypassed by the bypass valve 90 and the system will thereafter be disabled until serviced.

The initial regeneration mode in which the treatment bed is regenerated after 200 gallons of water is treated is extremely conservative and may result in brine solution being wasted. Additionally, regeneration will occur at inconvenient times during the day. In order for the operation of the system to be controlled in a manner which is individually suited to the hardness of the water, capacity of the treatment system, average daily use, and preferred time of generation, control data is entered via the switches S1-S5 as discussed above. This control data will specify the manner in which the system is to be operated and will replace the control data which was initially brought forward from the ROM to the RAM when power was turned on.

As discussed above, the system is programmed by means of switches S1-S5. Initially the recall/enter switch S5 is closed until the entry code indicia ECO1 is displayed. Subsequent closure of the switch S5 results in the time of day being displayed. The colon will flash on the display when the time indicated is PM. The time is set by means of switches S1-S4.

Thereafter, recall/enter switch S5 is momentarily closed and the entry code indicia ECO2 is displayed. Subsequent closure of the switch S5 results in the time of regeneration being displayed. The operator will now actuate switches S1-S4 until the desired time of regeneration is shown on the display 98.

The next entry code indicia, ECO3, is associated with the first four days of the week. The most significant digit is associated with Monday, the second most significant digit associated with Tuesday, the third most significant digit associated with Wednesday, and the least significant digit associated with Thursday. If a 1 is displayed in a digit position, regeneration will occur in the morning of the day associated therewith. If a 2 is displayed in a digit position, regeneration is to occur in the afternoon of the day associated with the digit position. The display of 3 in a digit position indicates that regeneration is to occur during both the morning and afternoon of the day associated with the digit position. Display of a 0 will indicate that no regeneration is to occur on this day.

Entry code indicia ECO4 is associated with control data defining whether regeneration will occur during the last three days of the week and also with the number of the present day of the week. The most significant digit is associated with Friday, the second most significant with Saturday, and the third most significant digit is associated with Sunday. The least significant digit is a number defining the present day of the week, with Monday being 1, Tuesday being a 2, Wednesday being a 3, etc.

The control data associated with entry code indicia ECO5 may not be programmed. This data is the total number of gallons ($\times 100$) which have been treated by the system since the system was installed. Similarly, entry code indicia ECO6 is associated with the total number of regeneration cycles which have occurred since the installation of the treatment system. Although these values may not be altered by means of the switches S1-S5, the value of data associated with ECO5 and ECO6 will be displayed. These entry code indicia will provide a means of checking the usage of the system and, therefore, may prove particularly advantageous in situations where the water treatment system is rented with the rental based upon usage.

The entry code indicia ECO7 is associated with control data specifying the treatment capacity of the system between regeneration cycles. The entry code indicia ECO8 is associated with control data specifying the average quantity of water treated by the system each day. In one programmed regeneration mode, the system will regenerate at the specified time of day next following the determination by the control circuit that a volume of water equal to the capacity of the system, less a 24-hour supply, has been treated since the previous regeneration operation. When the control data associated with entry code indicia ECO8 is a number other than 0, the regeneration of the water treatment system will be solely on this basis. When the control data associated with entry code indicia ECO8 is 0, on the other hand, regeneration will occur according to the day schedule specified by the control data associated with ECO3 and ECO4.

Entry code indicia ECO9 is associated with control data providing two separate control functions. The left two digits provide a check sum in hexadecimal form. The hexadecimal sum of the left-most two digits in the control data associated with entry codes ECO7-ECO13, excluding ECO9, will equal the left-most two digits of the control data associated with entry code indicia ECO9 when the system is properly programmed. This will insure that the control data has been properly entered. At start-up, a service man may place hexadecimal number FF in the two left-most digits of the control data associated with entry code indicia ECO9. After the service man has programmed the unit completely, the number appearing in the data associated with ECO9 will equal in hexadecimal form the sum of the left-most two digits of ECO7-EC13, as required. Subsequent programming of the system, such as after a power failure of substantial duration, will be effective only when the check sum and other control data are properly entered.

The two least significant digits of the control data associated with entry code indicia ECO9 indicate in hexadecimal form the number of pulses per gallon received from the turbine flow meter via line 102 and flip-flop 104. When the system is operated in the lock out mode, the number of pulses per gallon may be set at an artificial value such that lock out will occur after treatment of less than one million gallons.

Entry code indicia EC10 specifies outputs to the various control lines during the first step of the regeneration process. The control data associated with entry code indicia EC10 will be a four-digit hexadecimal number. The 3870 micro-computer will convert this hexadecimal number into a corresponding 16 bit binary number. The eight most significant binary bits specify the regeneration interval time period during which the initial regeneration step associated with EC10 will occur. The ninth most significant bit specifies whether the regeneration interval is given in minutes or seconds, with a 1 indicating minutes and a 0 indicating seconds. The seven least significant binary bits indicate the output states of the outputs PO-0 through $\overline{PO-6}$ with a 1 indicating that these outputs are to be high and a 0 indicating that the outputs are to be low. As mentioned previously, only the $\overline{PO-0}$, $\overline{PO-1}$, and $\overline{PO-3}$ outputs are used in the control arrangement of the present invention. The subsequent entry code indicia EC11–EC18 are associated with successive regeneration steps. Each of these indicia is associated with control data providing both the regeneration interval time for the step and the output states of the control outputs.

The water treatment system control of the present invention will initiate a regeneration operation based upon the control data which is entered into the controller circuit. If the data associated with entry code indicia ECO8 is 0, the system will operate in a day regeneration mode in which regeneration will occur on the days specified by the indicia associated with entry code indicia ECO3 and ECO4, at the time of day specified by entry code indicia ECO2. If, prior to a regeneration operation, the total gallon capacity of the system, as set by the control data associated with entry code indicia ECO7, is exceeded, the regeneration operation will be initiated immediately, regardless of the day or time. If the system is operated in the day regeneration mode with the $\overline{P1-5}$ input grounded, when the total accumulated gallons reaches one million, the control will switch into the bypass mode, provide a CALL service display on display 98, and terminate operation of the water treatment system.

If control data other than 0000 is entered for entry code indicia ECO8, a number indicating the average 24-hour water usage, regeneration will occur when the total gallon capacity (ECO7) minus the 24-hour usage (ECO8) is exceeded, and the time for regeneration is correct. If the total gallon capacity (ECO7) is exceeded prior to the time of day associated with ECO2, regeneration will be initiated immediately.

Figure 3:
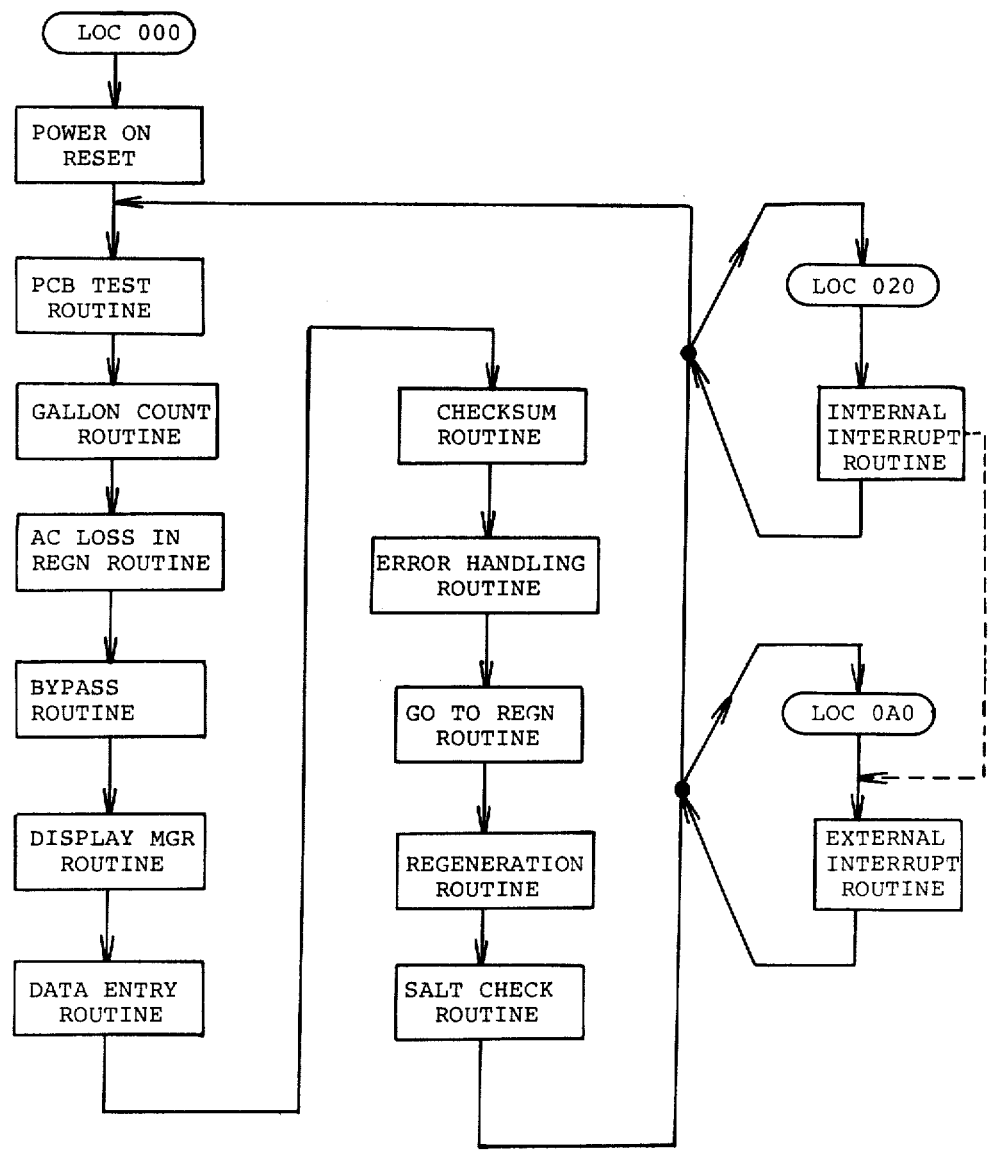

Reference is now made to FIGS. 3–17 which illustrate schematically the sequence of operations of the MK 3870 micro-computer. FIG. 3 illustrates the main line program which consists of a plurality of sub-routines, each sub-routine being represented by a block. When power is turned on initially, the main line is entered from location 000 through a POWER ON RESET sub-routine. The micro-computer will then sequentially go through the PCT test routine, the GALLON COUNT routine, the AC LOSS IN REGEN routine, the BYPASS routine, the DISPLAY MANAGER routine, the DATA ENTRY routine, the CHECK SUM routine, the ERROR HANDLING routine, the GO TO REGEN routine, the REGENERATION routine, and the SALT CHECK routine. The micro-computer will thereafter continuously cycle through all of the routines, with the exception of the POWER ON RESET routine, during operation of the treatment system.

An INTERNAL INTERRUPT routine and an EXTERNAL INTERRUPT routine are shown diagrammatically as being entered after the SALT CHECK routine. Actually, each of these routines is entered from anywhere in the MAIN LINE routine. The INTERNAL INTERRUPT routine is entered every two milliseconds, regardless of the routine being handled by the micro-computer. This routine drives the display and operates the slew switches for the entry of control data. The INTERNAL INTERRUPT routine also notes closure of the reed switch associated with the flow meter. When the INTERNAL INTERRUPT routine is terminated, the micro-computer returns to the main line at the point at which it left the main line. The EXTERNAL INTERRUPT routine performs a time-keeping function by monitoring 60 Hertz power line fluctuations. If the power from the 60 Hertz supply is lost, the INTERNAL INTERRUPT routine will take over the time-keeping function, as shown by the dashed line.

FIGS. 4–17 disclose the details of each of the sub-routines shown in FIG. 3. In order to simplify these flow charts, lines between blocks have been eliminated in some cases and letters or numbers used to indicate the sequence of steps undertaken in the sub-routines. Each letter and number so used refers only to similarly indicated points within the individual sub-routine. Transition from one sub-routine to the next is accomplished only through START, END OF ROUTINE, and EXIT blocks.

Figure 4:
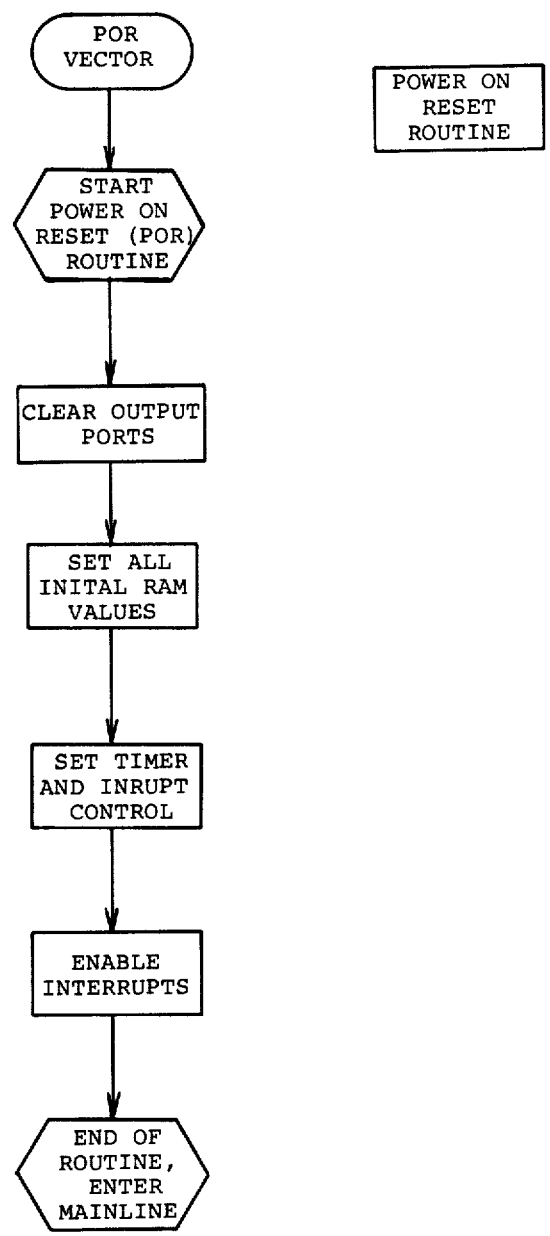

FIG. 4 illustrates the POWER ON RESET routine. This routine will initially clear all the output lines. It will then bring forward the initial regeneration program from the read only memory and insert it into a random access memory. As discussed above, this initial regeneration program insures that regeneration will occur, typically on a relatively conservative basis, even if the micro-computer is not programmed by manual entry of control data. The timer and interrupt controls are then enabled.

Figure 5:
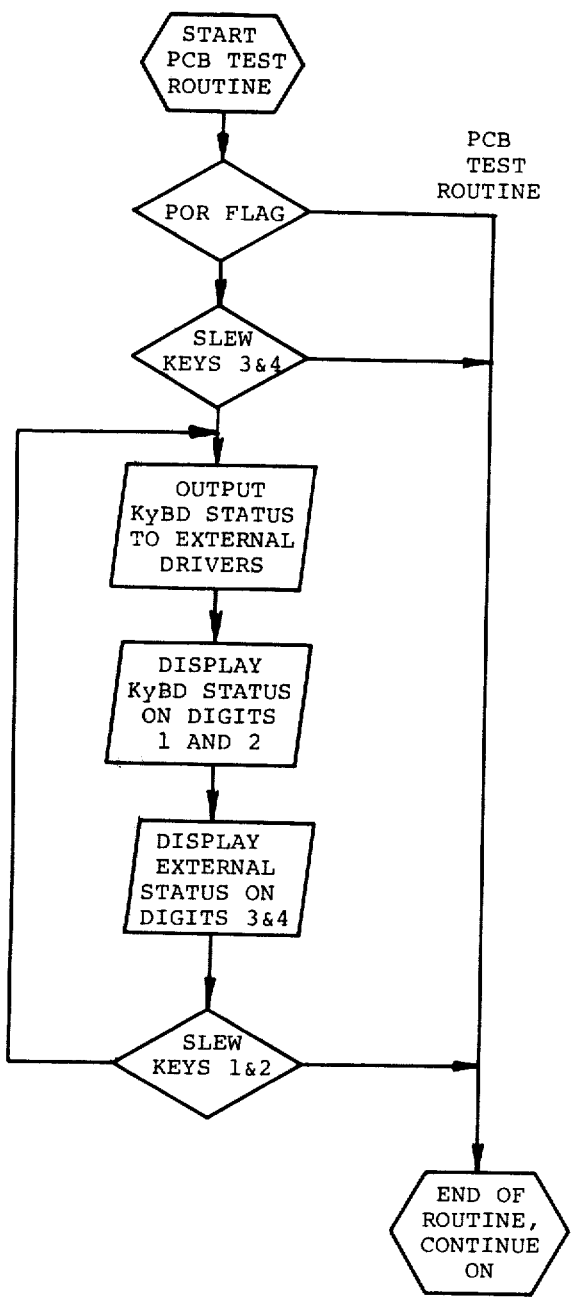

The main line program then goes into a PRINTED CIRCUIT BOARD (PCB) TEST routine which is illustrated in FIG. 5. This sub-routine is entered when the slew switches S3 and S4 are depressed. When in this routine, the operation of the control switches and the outputs may be checked, with the operation being displayed on display 98.

Figure 6:
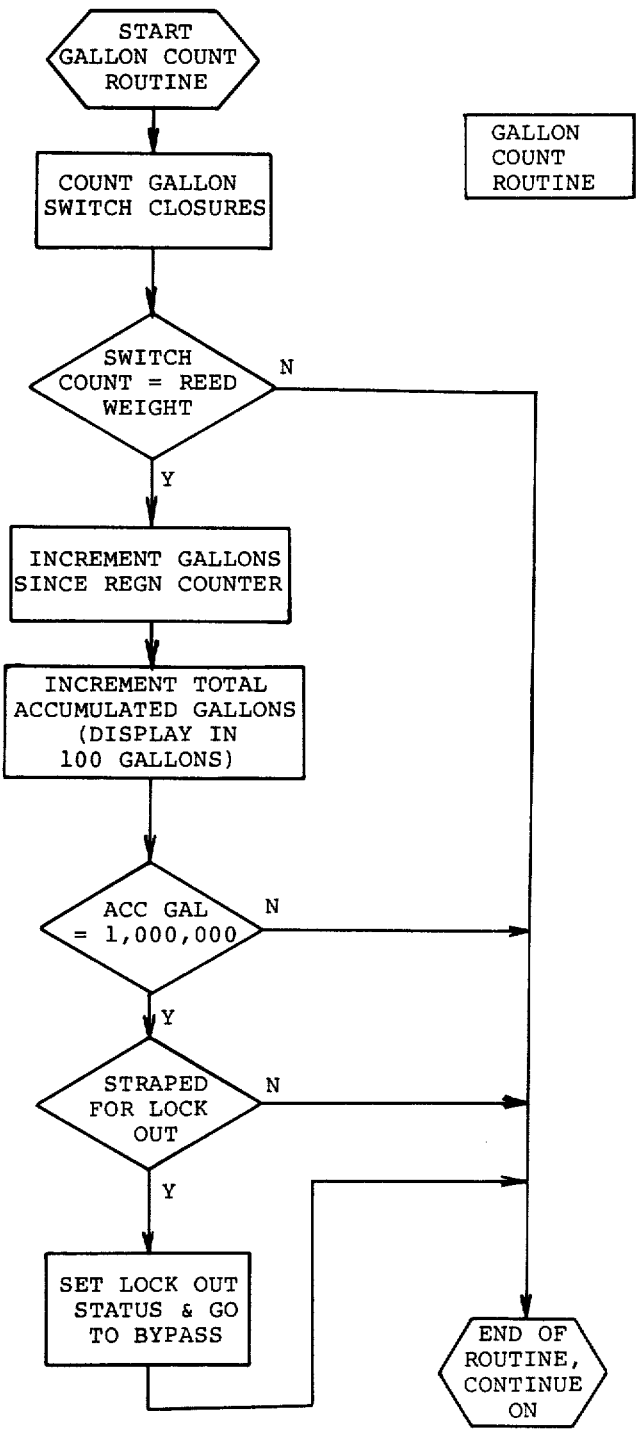

FIG. 6 illustrates the GALLON COUNT routine. This routine keeps track of the switch closures experienced by the reed switch associated with the flow meter 31 in the outlet line of the water treatment system. When the switch count reaches a total equal to the weighting function which has previously been entered (ECO9), the counters keeping track of the volume of water treated since the previous regeneration and the total volume of water treated since installation of the system will be incremented. When the gallon count accumulated since installation of the system equals one million and, further, the system is operating in a lock out mode, discussed above, a bypass of the treatment system will occur and the system will cease to operate. The display will also display a CALL indicia on display 98, indicating that a service man should be called.

Figure 7:
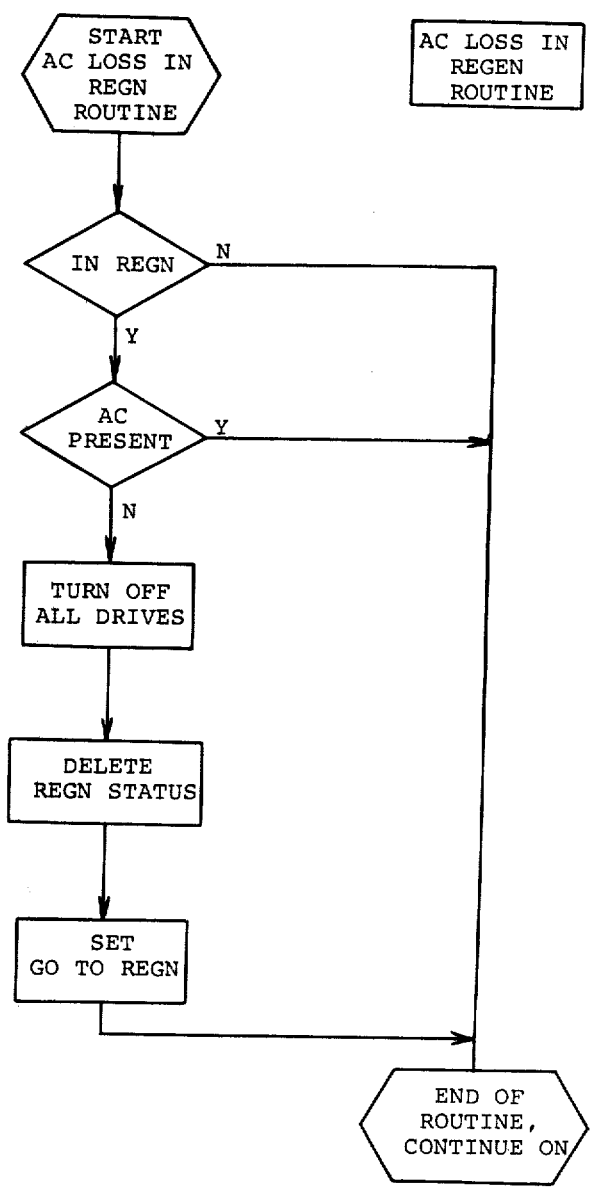

FIG. 7 illustrates the AC LOSS IN REGEN routine. This sub-routine will only be entered when the system is in the regeneration mode of operation and, simultaneously, the AC power supply for the system is interrupted. This sub-routine turns off all the drives, and sets a GO TO REGEN flag so that when the AC power is reapplied to the system, a new regeneration cycle will occur. If this were not done, the water treatment system might not be fully regenerated when power was reapplied to the system but the control circuitry would not sense this condition. With the GO TO REGEN flag set, however, the regeneration operation will be reinitiated as soon as power is reapplied to the system.

Figure 8:
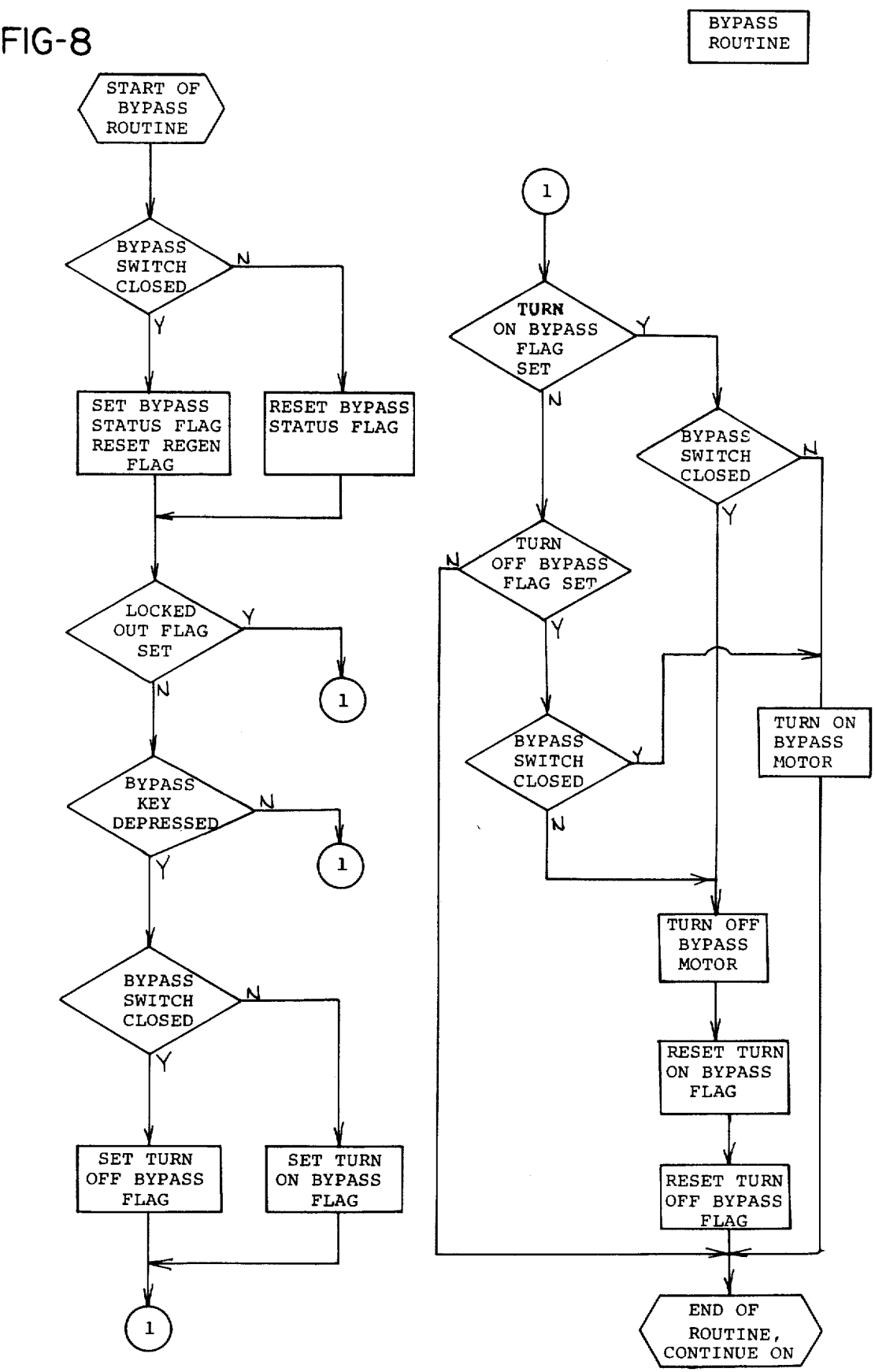

Reference is now made to FIG. 8 which illustrates the BYPASS routine. Initially the bypass switch is checked to see if it is closed. The bypass switch, switch 100 (FIG. 2), will be closed only when the bypass valve is opened such that the water treatment system is being by-passed. If the switch is closed, a BYPASS STATUS flag is set; if the switch is not closed, the BYPASS STATUS flag is reset. A check is then made to determine whether the LOCK OUT flag is set and, if it is not, whether the bypass key is depressed. If the bypass switch S6 (FIG. 2) is closed, a check is made to see if the bypass switch 100 is closed, indicating that the valve 90 is in the bypass condition. If valve 90 is in the bypass position, the TURN-OFF BYPASS flag will be set. If switch 90 is not in the bypass condition, the TURN-ON BYPASS flag will be set.

The sub-routine then continues at the point indicated at 1. If the TURN-ON BYPASS flag is set and the bypass switch 100 is closed, the bypass operation will be complete and therefore, the bypass motor turned off, the TURN-ON BYPASS flag reset, and the TURN-OFF BYPASS flag reset. If the bypass switch 100 is not closed, however, indicating that the bypass valve is not completely opened, the bypass motor will be turned on.

Should the TURN-ON BYPASS flag not be set, the sub-routine will then check to determine whether the TURN-OFF BYPASS flag has been set. If the TURN-OFF BYPASS flag has not been set, the sub-routine will end, while if the TURN-OFF BYPASS flag has been set, the bypass switch 100 will be checked to see if it is closed. If the bypass switch has been closed at this point, this will indicate that the bypass valve has yet to be opened, and the bypass motor will continue to be turned on. Should, however, the bypass switch 100 be found to be opened, this will indicate that it is desired to turn off the bypass and that this has been done. Therefore the bypass motor will be turned off, and the TURN-ON BYPASS flag and TURN-OFF BYPASS flag both reset.

Reference is now made to FIG. 9, illustrating the DISPLAY MANAGER sub-routine. The DISPLAY MANAGER routine initially checks to see whether the POWER ON RESET flag is set. If this flag is set, the display 98 will flash 88 88 at a one-second rate and alternate this with a status indicia (such as PAS-, indicating a bypass operation or PASS, indicating that the bypass is completed) every 16 seconds. If the POWER ON RESET lfag is not set, the sub-routine will then check to see if the ERROR flag is set. The ERROR flag, if set, indicates that the control data was not entered correctly as determined by the CHECK SUM routine. If the ERROR flag is set, the display will flash EEEE which will alternate with the status of the system every 16 seconds. If the ERROR flag is not set, the sub-routine will check to see if the ENTRY MODE flag is set. If this flag is not set, the time of day and status will be displayed, alternating every 16 seconds. The routine will then terminate. If the ENTRY MODE flag has been set, however, a check will be made to see if the ENTRY CODE flag is set. If the ENTRY CODE flag is set, then the display will display EC NN, with NN equaling 01, 02, 03, 04 ... or 18. If the ENTRY CODE flag has not been set, the display will display the control data associated with the entry code indicia EC NN. The routine will then terminate.

Figure 10A:
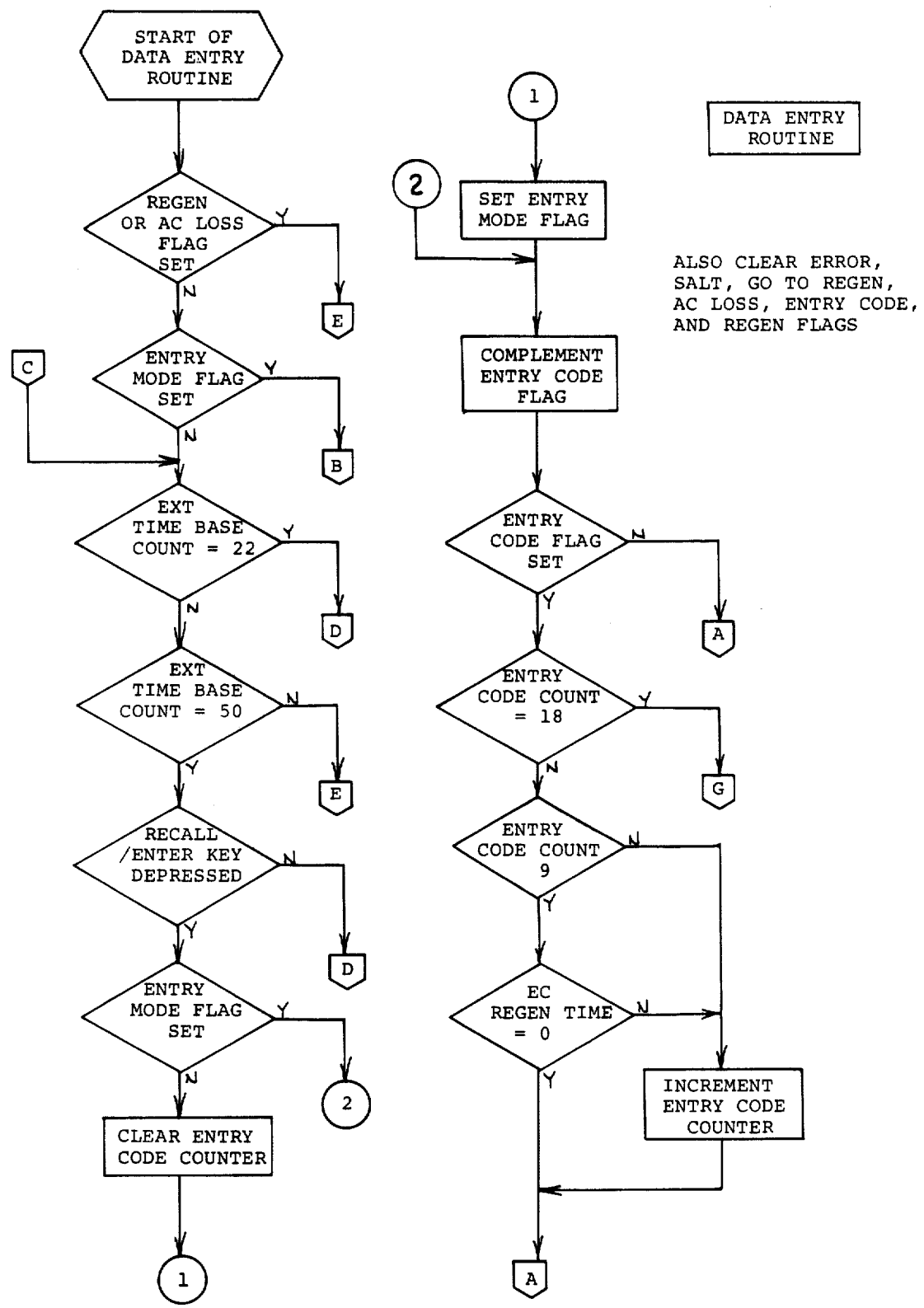

Reference is now made to FIGS. 10a, 10b and 10c, which together illustrate the DATA ENTRY sub-routine. This sub-routine is largely self-explanatory. Portion 150 of the sub-routine determines initially whether various flags have been set and then determines whether the recall/enter key has been depressed. Portion 152, among other things, sets the ENTRY MODE flag, checks the entry code count, and increments the entry code counter. Portion 154 will check whether the entry code is ECO5 or ECO6 and will end the sub-routine if either is the case since the data associated with these entry code indicia may not be altered. Portion 156 will control incrementing entry code data as each of the switches S1, S2, S3, and S4 are checked to determine if they are closed.

FIG. 11 illustrates the CHECK SUM routine in which the left-most two digits of each of the control data are added hexadecimally, without carries, to produce a two-digit check sum. The check sum is then examined to determine if it equals the two-digit check sum which was previously entered in digits 4 and 3 of the entry code indicia ECO9. If an equality is noted, the ERROR flag is reset and the sub-routine ends. If there is no equality, the entered check sum associated with entry code indicia ECO9 is then examined to determine if it equals FF. This is the special check sum value which is entered by a service man when the unit is initially programmed. If the check sum FF is entered, the micro-computer will, upon entry of all control data, perform the hexadecimal addition of the control data and enter the sum in the appropriate position associated with entry code indicia ECO9. If the recall function is then selected and the entry code indicia stepped to read out the data associated with ECO9, the two most significant digits then displayed will be the proper check sum which should be entered during a subsequent data entry in order for no error to be noted. If an error in data entry is noted and FF not entered, an ERROR flag will be set and the display 98 will then display EEEE.

Figure 12:
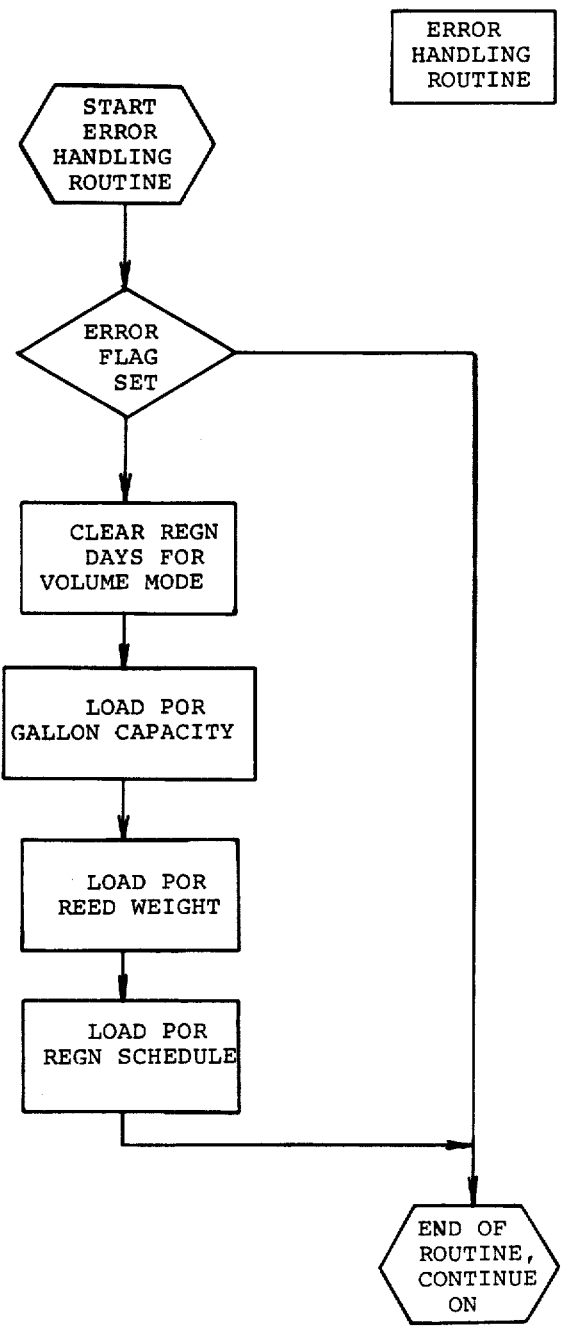

FIG. 12 illustrates the ERROR HANDLING routine. This routine brings forward to the control data which is stored in the proms in the micro-computer when an error is noted. This control data is necessary since the micro-computer will not have been properly programmed.

Figure 13:
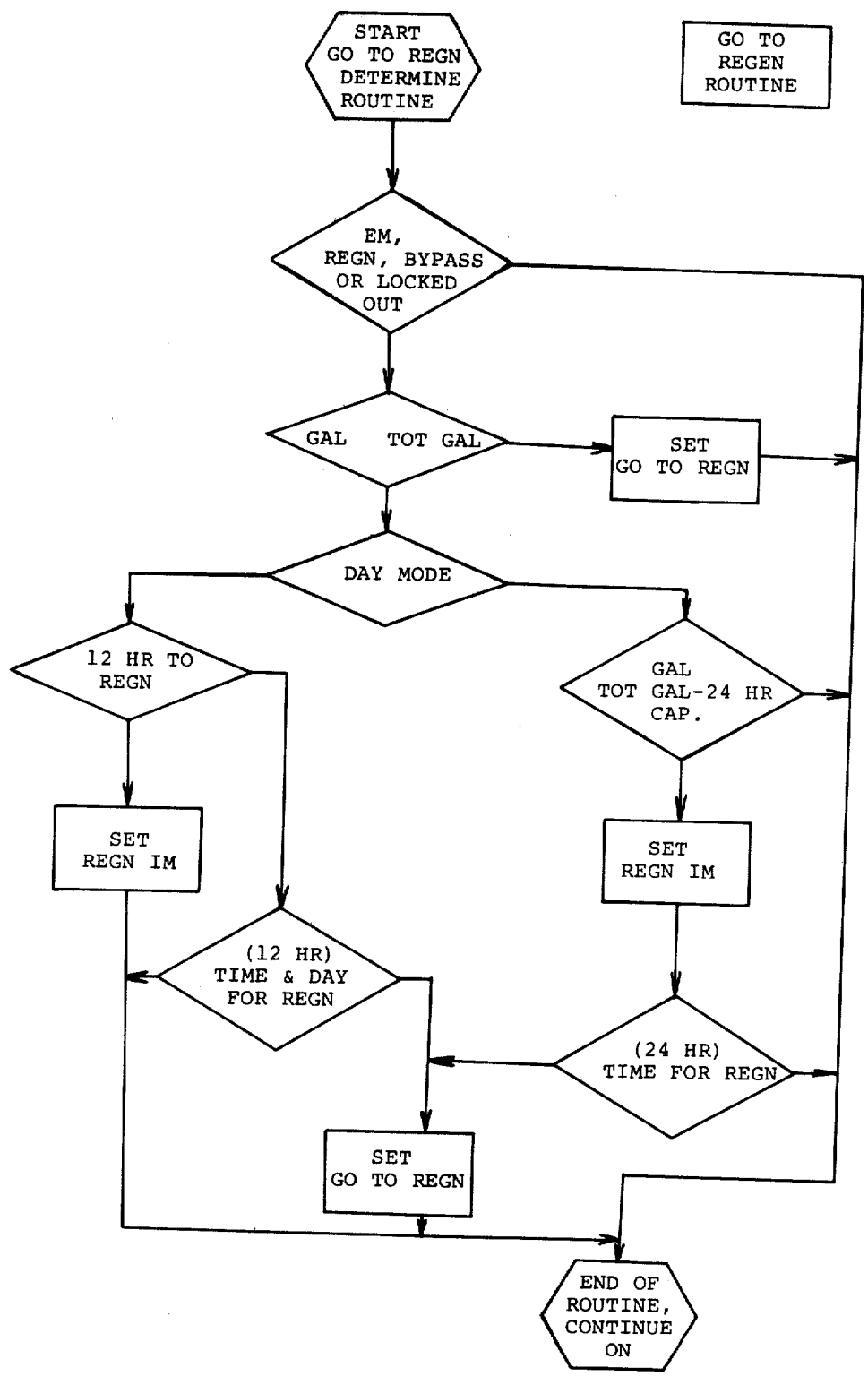
Figure 14B:
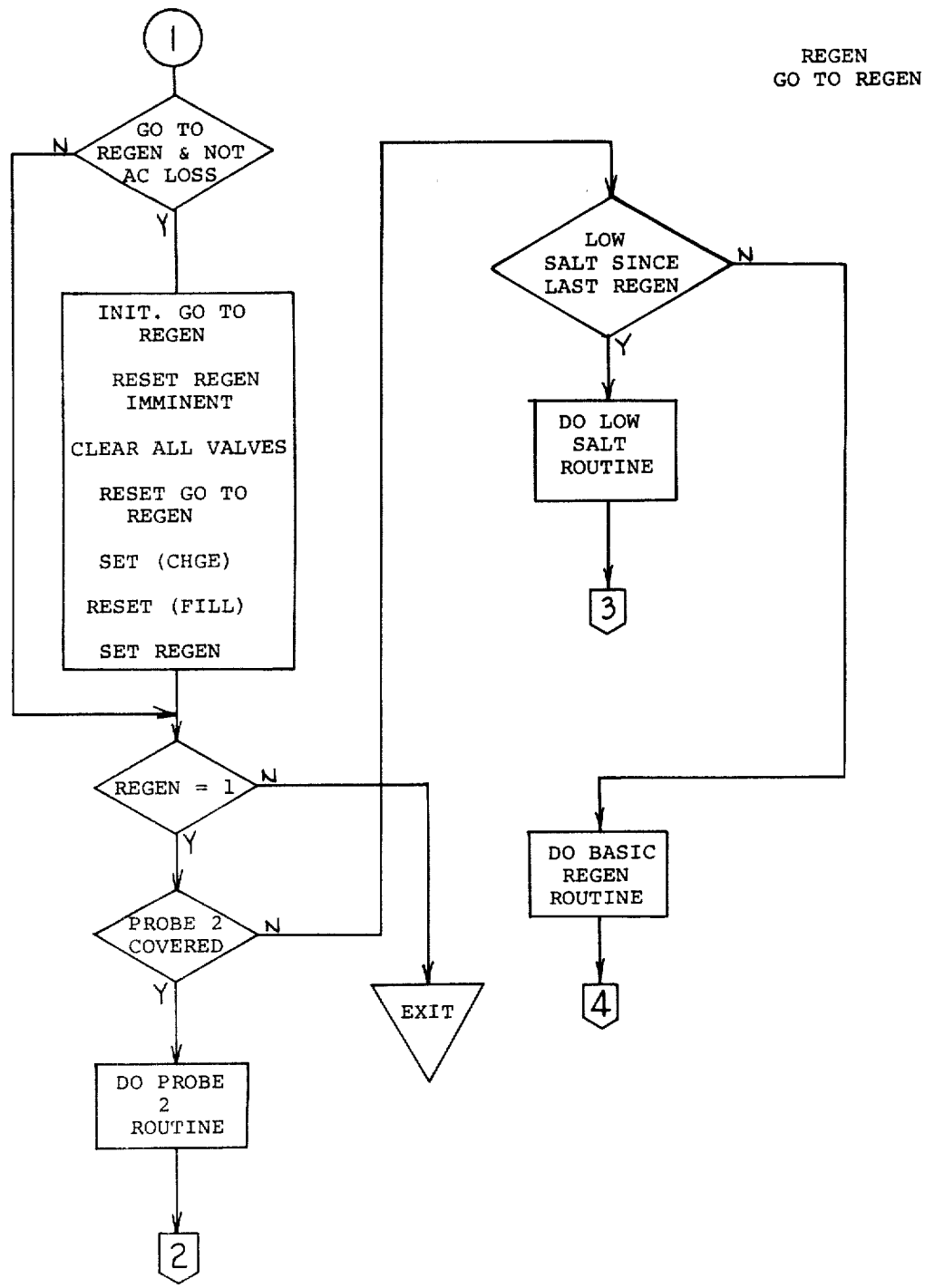
Figure 14C:
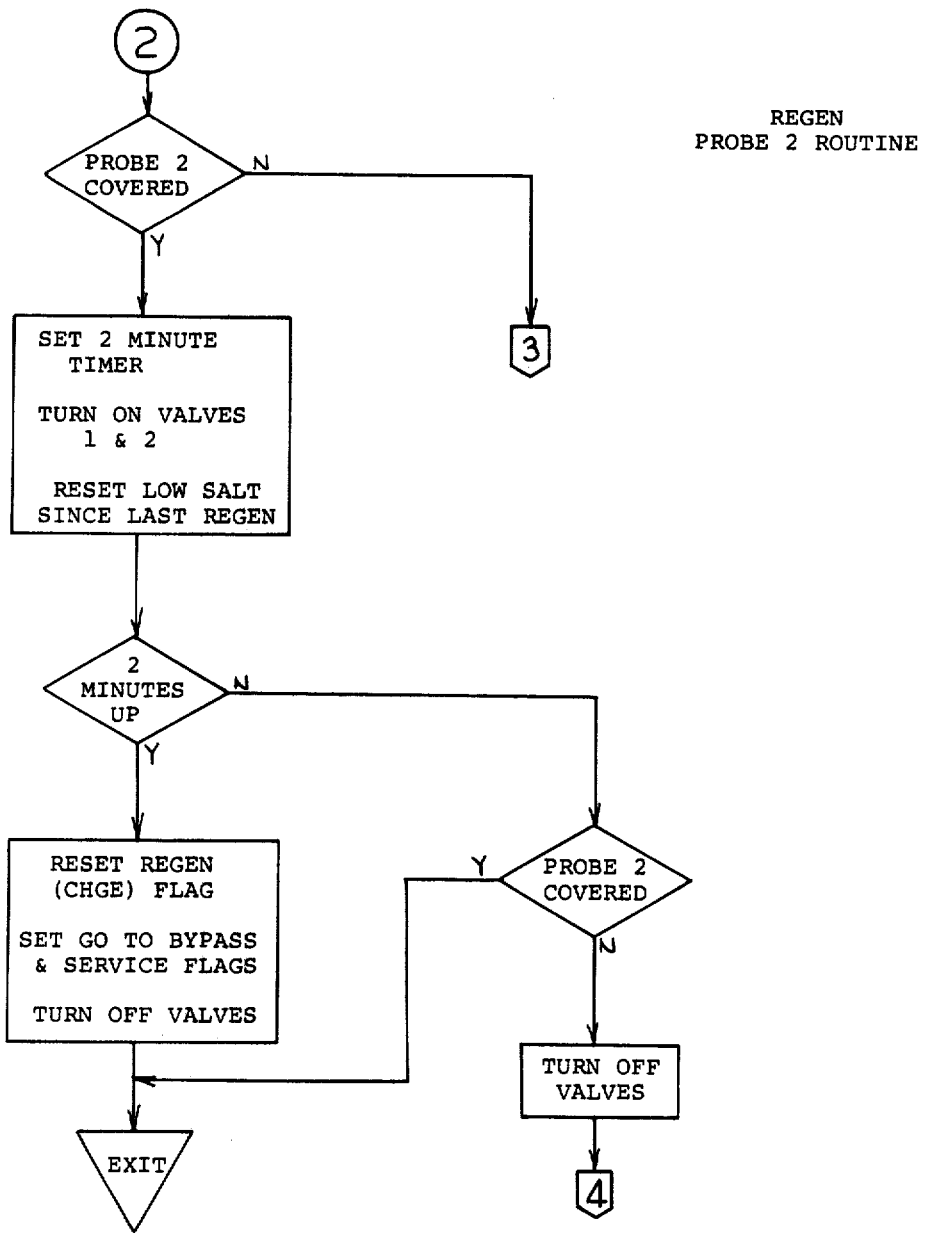
Figure 14D:
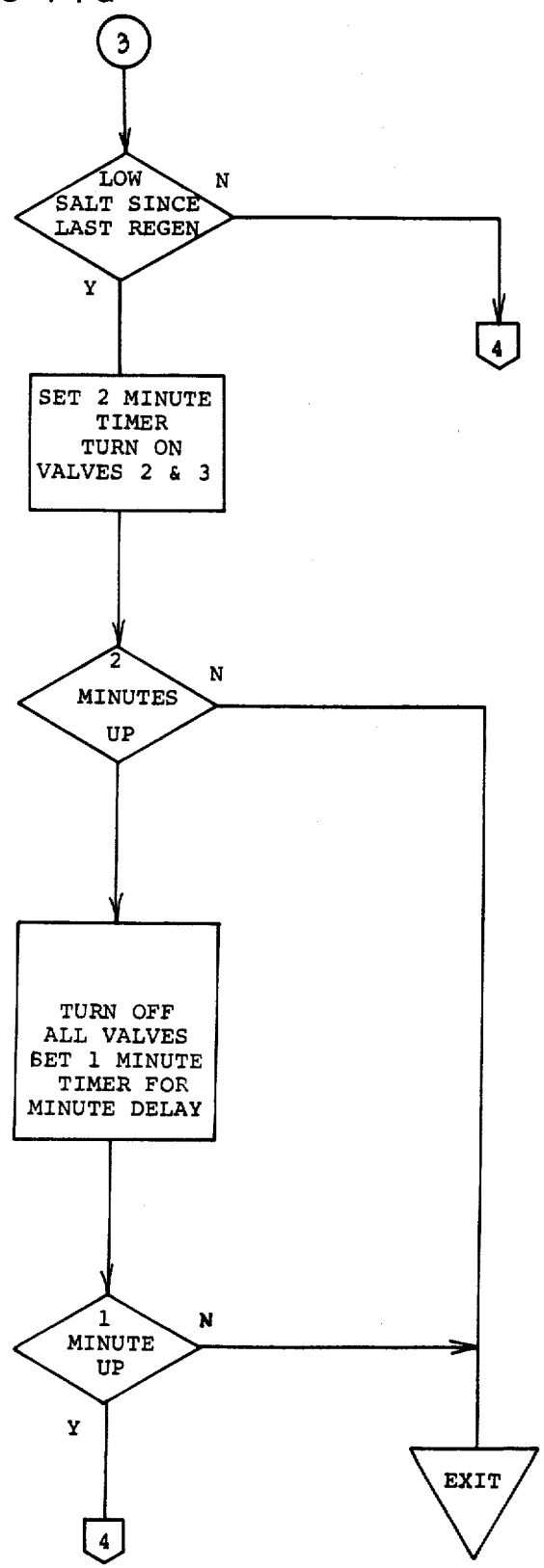
Figure 14F:
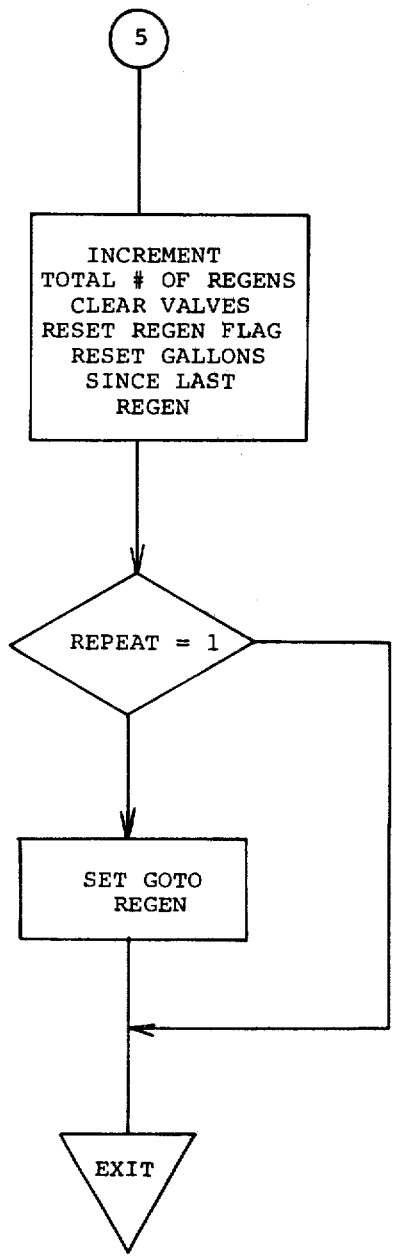

Reference is now made to FIG. 13 which illustrates the GO TO REGEN routine. Basically, this sub-routine determines when the regeneration operation should be initiated. Initially this sub-routine checks to see if the system is in its entry mode, whether a regeneration is going on, whether bypass has been effectuated, or whether the system is locked out after having treated more than a million gallons of water. If none of these conditions exist, a check is then made to see if the capacity of the system has been exceeded and, if so, the regeneration operation is initiated immediately. If the quantity of water treated since the previous regeneration is less than the treatment capacity of the system, then a check is made to determine whether the system is programmed in its day mode or programmed volume mode of regeneration.

If in the day mode of regeneration, a check is made to see if less than twelve hours remains until a scheduled regeneration. If this is the case, a REGENERATION IMMINENT flag is set and this will result in display of a regeneration imminent symbol on display 98. A check is then made to see if the time and day for regeneration have been reached and, if so, the GO TO REGEN flag is set.

If the system is in its programmed volume mode of operation, a check is made to see whether the volume treated since the previous regeneration is greater than the treatment capacity of the system, less a 24-hour average usage. If the volume of the water treated is greater than the treatment capacity of the system less a 24-hour average usage, the REGENERATION IMMINENT flag is set and a check is than made to determine whether the time for regeneration has been reached. If the appropriate time has been reached, the GO TO REGEN flag will be set.

FIGS. 14a, 14b, 14c, 14d, 14e and 14f, together illustrate the REGEN routine. This routine is largely self-explanatory. This routine modifies the regeneration operation when a low salt condition has been noted since the previous regeneration. The portion of the flow diagram on page 14c deals primarily with the program which turns on the solenoids 1 and 2 when the probe 2 is covered in order to try to drain the brine tank to prevent overflow. The portion of the sub-routine on FIG. 14d deals primarily with correcting for a previous low salt condition. The basic regeneration sub-routine is shown primarily on FIG. 14e.

Figure 15:
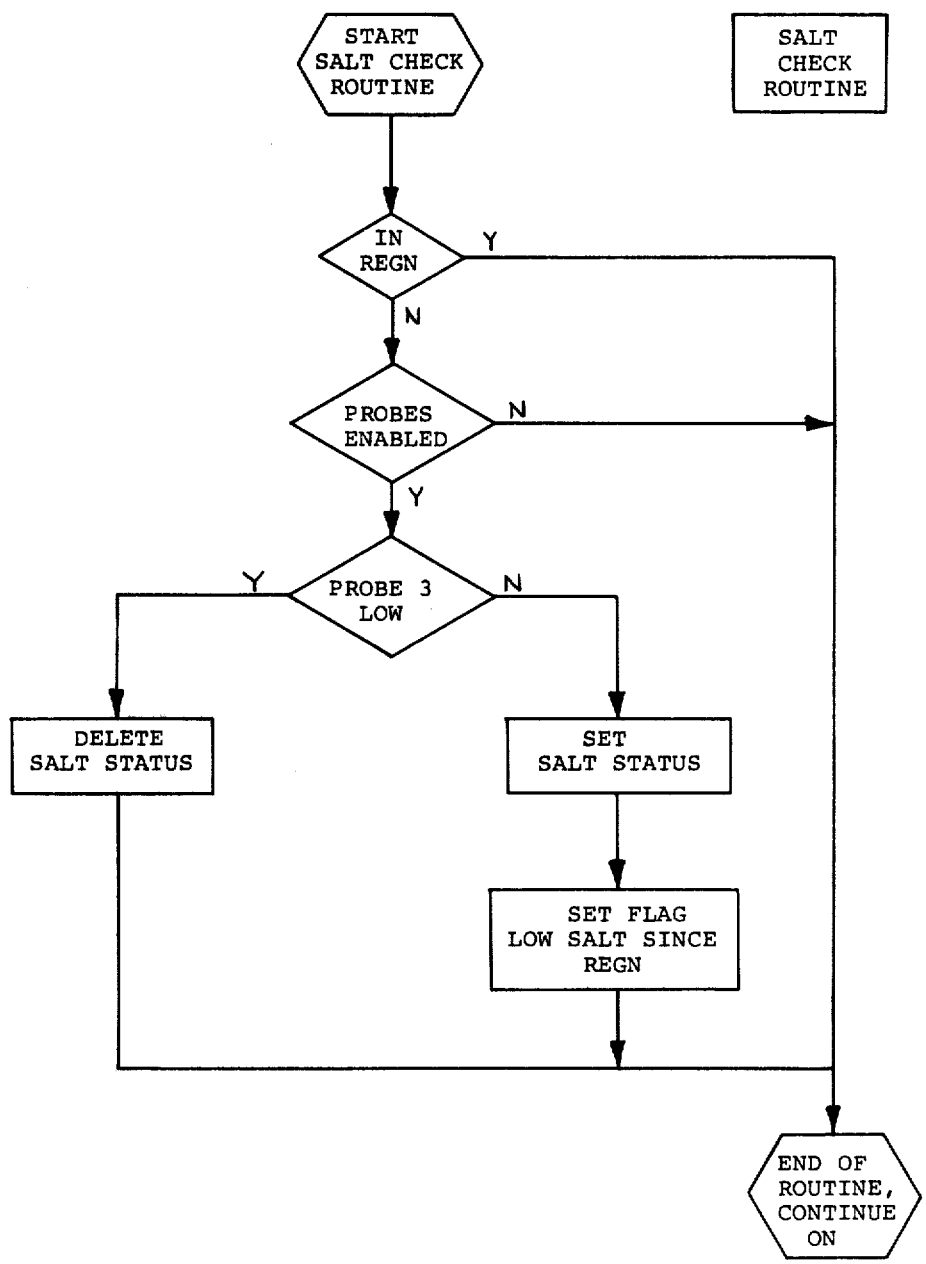

FIG. 15 illustrates the SALT CHECK routine. This routine will check whether the brine solution in the brine tank is covering probe 3. If it is covering probe 3, then it is assumed that there is sufficient salt in the brine tank. If, on the other hand, the brine solution is not covering probe 3, the sub-routine will set a LOW SALT flag which will cause a compensation to occur in the next regeneration cycle if salt is added to the system. This correction is accomplished by adding additional water to the brine tank to produce additional brine to be used in treating the resin bed. Additionally, the display 98 will display a FILL display which will provide an indication that the brine tank should be filled with salt.

Figure 16:
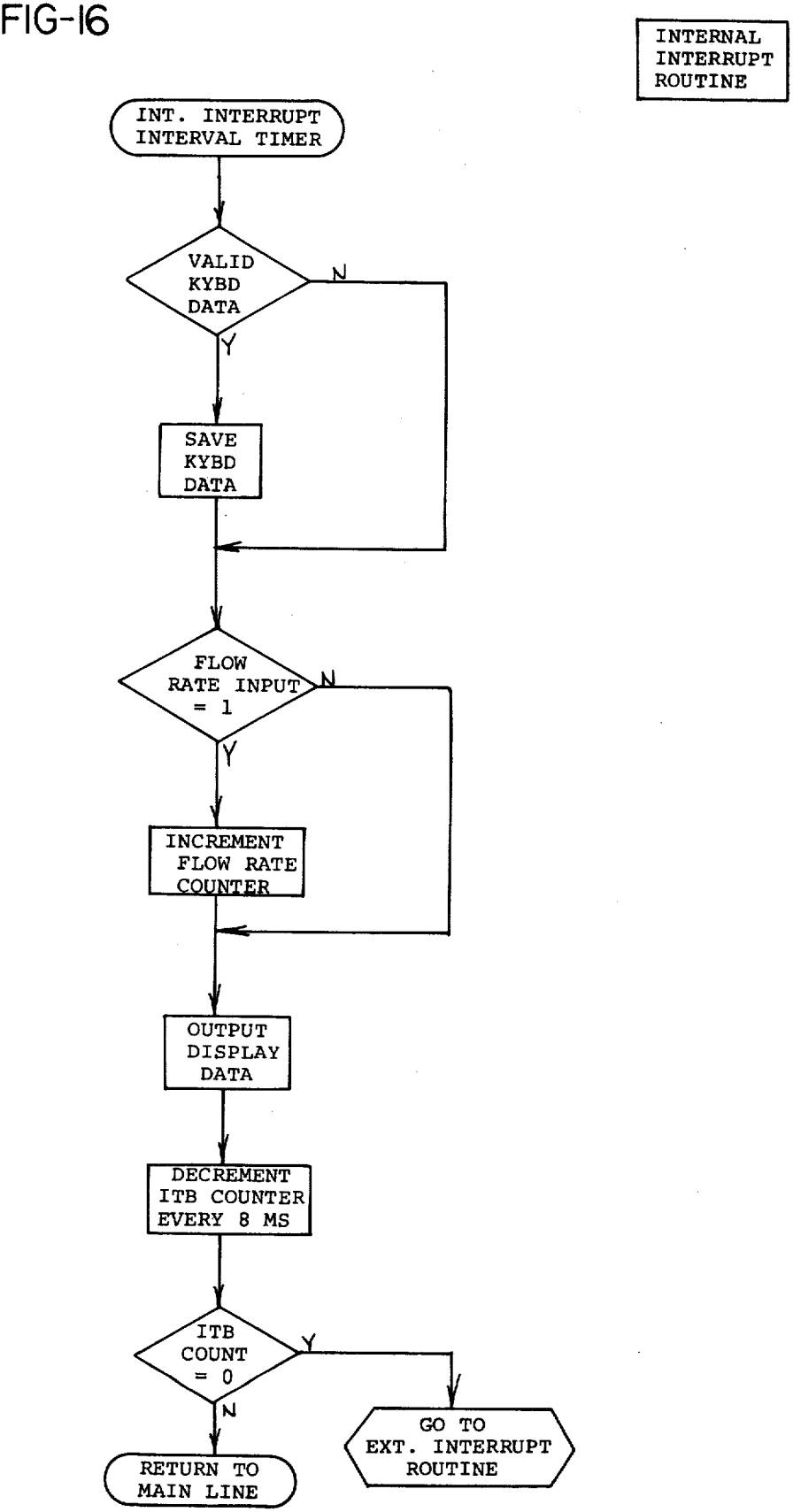

The INTERNAL INTERRUPT routine is illustrated in FIG. 16. This routine services the keyboard and the flow meter as well as providing the timing for supply of data to the display. The INTERNAL INTERRUPT routine also decrements a counter which keeps track of any interruptions in the AC power supply. Should the power supply be interrupted for one second, this counter will have counted down to zero and the EXTERNAL INTERRUPT routine will then be entered.

FIG. 17 illustrates the EXTERNAL INTERRUPT routine. This routine is entered either from the INTERNAL INTERRUPT routine or from the main line. The EXTERNAL INTERRUPT routine is entered from the main line every 16.7 milliseconds as the 60 cycle power fluctuates through zero. As can be seen, if the EXTERNAL INTERRUPT routine is entered from the INTERNAL INTERRUPT, an AC LOSS flag will be set while, if it is entered from the main line, the AC LOSS flag will be delected and the counter in the INTERNAL INTERRUPT routine will be reset to one second. The balance of the sub-routine checks to see whether 50 to 60 cycle power is applied to the system and then operates the counters which provide the time-keeping function for the system accordingly.

The following is the program listing which defines uniquely the MK 3870 micro-processor used in the control of the present invention. A separate listing for each of the above-discussed routines is given. The leftmost column, having four hexadecimal digits, specifies the line number of the program. The second column from the left, having four hexadecimal digits, specifies the ROM memory location, the third, fourth and fifth columns from the left, each having two hexadecimal digits, specify the machine object code. The sixth column from the left is a label column. The seventh and eighth columns from the left are the instruction and operand columns for the assembly language program. The ninth column contains comments which explain the operations being performed.

```
0000
0001
0002
0003
0004
0005
0006
0007
0008
0009
000A
000B
000C
000D
000E        *
000F        *
0010        *       ****************************************
0011        *              WATER REFINING CONTROL PROGRAM
0012        *       ****************************************
0013        *
0014        *
0015        ****************************************************************
0016        *
0017        ****************************************************************
0018        *
0019        *
001A        *              POWER ON RESET ROUTINE
001B        *
001C        *
001D        ****************************************************************
001E                ORG    H'00'   POR VECTOR
```

```
001F 0000 1A          POR    DI              DISABLE INTERRUPTS
0020 0001 20 FF              LI     H'FF'
0021 0003 B0                 OUTS   0         CLEAR PORT 0
0022 0004 B5                 OUTS   5         CLEAR PORT 5
0023 0005 20 80              LI     H'80'     DISABLE PROCES
0024 0007 B1                 OUTS   1         PORT 1
0025 0008 2A 07 CC           DCI    PORT      LOAD DC W/START ADDRESS OF ROM TABLE
0026 000B 61                 LISU   1         LOAD ISAR WITH 14
0027 000C 6C                 LISL   4         R14 IS INTERNAL STATUS
0028 000D 16          LDM    LM               LOAD A FROM ROM
0029 000E 5C                 LR     S,A       TRANSFER A TO RAM
002A 000F 0A                 LR     A,IS      LOAD A WITH ISAR
002B 0010 25 3F              CI     H'3F'     END OF RAM
002C 0012 84 05              BZ     END       YES GO TO END
002D 0014 1F                 INC    A         INC A
002E 0015 0B                 LR     IS,A      LOAD ISAR WITH A
002F 0016 94 F6              BNZ    LDM       BRANCH TO LDM
0030 0018 20 C8       END    LI     D'200'    LOAD 200 (2M SEC)
0031 001A B7                 OUTS   7         TIMER COUNTER PORT
0032 001B 20 6F              LI     H'6F'     ENA INT, PULSE, STRT, LEVEL, TIMER, EXTIT
0033 001D B6                 OUTS   6         INTERRUPT CONTROL PORT  (10 U SEC CLO
0034 001E 90 09              BR     ENAI      BRANCH
0035                  *
0036                  ************************************************
0037                  *
0038                  *
0039                  *              INTERVAL TIMER INTERRUPT
003A                  *
003B                  *
003C                  ************************************************
003D                  *
003E                         ORG    H'20'     TIMER INTERRUPT ENTRY
003F                  *
0040 0020 1E                 LR     J,W       SAVE STATUS WORD IN REGISTER 9
0041 0021 58                 LR     8,A       SAVE ACCUMULATOR IN REGISTER 0
0042 0022 0A                 LR     A,IS      SAVE ISAR IN REGISTER 7
0043 0023 57                 LR     7,A
0044 0024 2C                 XDC              SAVE DATA COUNT IN DC1
0045 0025 29 01 5B           JMP    KYBD      GO TO TIMER ROUTINE
0046                  *
0047                  *
0048                  ************************************************
0049 0028 1B          ENAI   EI               ENABLE INTERRUPTS
004A                  *
004B                  ************************************************
004C                  *
004D                  *                 PCB TEST
004E                  *
004F                  * ENTER BY PRESSING BOTH SLEW 3 & 4 WHILE IN POR & REGN.
0050                  * KEYBOARD WILL BE REFLECTED ON DISPLAY 2 LSD AND PORT 0
0051                  * INPUT PORT 1 WILL BE REFLECTED ON DISPLAY 2 MSD.
0052                  * EXIT BY PRESSING SLEW 1 AND 2 TOGETHER.
0053                  *
0054                  *
0055                  *       BIT WEIGHT:     8         4         2         1
0056                  *
0057                  *       DIGIT ONE:      SLEW 4    SLEW 3    SLEW 2    SLEW 1
0058                  *
0059                  *       DIGIT TWO:      -         BYPASS    MAN REG   REC/ENT
005A                  *
005B                  *       DIGIT THREE:    REPEAT    PROBE 2   PROBE 1   BYPASS
005C                  *
005D                  *       DIGIT FOUR:     FLOW      PROBE 3   LOCK OUT  50/60 HZ
005E                  *
005F                  ************************************************
0060                  *
0061 0029 00          PCBT   LR     A,KU      LD STATUS IN ACC
0062 002A 25 81              CI     H'81'     COMP FOR POR & REGN ONLY
0063 002C 94 27              BNZ    EOR       SKIP IF NOT POR ONLY
```

```
0064 002E 03            LR    A,QL    LD KYBD STATUS IN ACC
0065 002F 25 8C         CI    H'8C'   TEST FOR SLEW 3 AND 4
0066 0031 94 22         BNZ   EOR     IF NOT 3&4, BR TO END OF ROUTINE
0067 0033 20 88         LI    H'88'   SET UP FOR POR AND GTR BITS
0068 0035 04            LR    KU,A    SET STATUS
0069 0036 03    TSTL    LR    A,QL    LD KYBD IN ACC, START OF TEST LOOP
006A 0037 25 83         CI    H'83'   TEST BOTH SLEW 1 AND 2
006B 0039 84 1A         BZ    EOR     IF BOTH, END LOOP
006C 003B 21 7F         NI    H'7F'   REMOVE VALID
006D 003D 52            LR    2,A     STORE KYBD IN R2
006E 003E 18            COM   A       INVERT TO OUTPUT
006F 003F 80            OUTS  0       LOAD OUTPUT PORT 0
0070 0040 01            LR    A,KL    LD STATUS IN ACC
0071 0041 18            COM   A       INVERT
0072 0042 21 0C         NI    H'0C'   MASK FOR VALID AND PROBE ENA BITS
0073 0044 94 06         BNZ   SDPA    IF NOT BOTH BR TO SET DISPLAY ADDRESS
0074 0046 44            LR    A,4     LD KYBD FILTER IN ACC
0075 0047 21 80         NI    H'80'   MASK FOR FLOW BIT
0076 0049 C5            AS    5       COMBINE WITH EXT STATUS
0077 004A 53            LR    3,A     STORE EXT STATUS IN R3
0078 004B 1A    SDPA    DI            DIABLE INTRPT
0079 004C A4            INS   4       INPUT DIGIT/KYBD PORT
007A 004D 91 03         BM    ERPT    IF NOT ON DIG 4, BR TO ENA INRUPT
007B 004F 73            LIS   3
007C 0050 5A            LR    10,A    SET DISPLAY POINTER TO R3
007D 0051 1B    ERPT    EI            ENA INRUPT
007E 0052 90 E3         BR    TSTL    BR TO CONTINUE TEST LOOP
007F                    *
0080                    *
0081                    ****************************************
0082                    *
0083                    *
0084                    *              GALLON ROUTINE
0085                    *
0086                    *
0087                    ****************************************
0088 0054 64    EOR     LISU  4       LOAD ISAR WITH OCTAL 40
0089 0055 68            LISL  0       R40 IS WEIGHT OF REED
008A 0056 4C            LR    A,S     LOAD A WITH WEIGHT OF REED
008B 0057 18            COM   A       COMPLIMENT DATA
008C 0058 1F            INC   A       ADD ONE
008D 0059 67            LISU  7       WITH OCTAL 75
008E 005A 6D            LISL  5       LOAD ISAR
008F 005B CC            AS    S       ADD (SUBTRACT) WITH REED COUNTER
0090 005C 92 31         BNC   FINI    BR IF DO NOT COMPARE
0091 005E 70            CLR   A       CLEAR
0092 005F 5D            LR    I,A     REED COUNTER INC ISAR
0093 0060 3C            DS    S       DECREMENT GALLON COUNT  ISAR 76
0094 0061 66            LISU  6       LOAD ISAR WITH 66
0095 0062 6E            LISL  6       R66 IS GALLON CT SINCE LAST REGEN
0096 0063 20 67         LI    H'67'   DECIMAL ADJUST +1
0097 0065 DC            ASD   S       ADD DECIMAL LSD
0098 0066 5D            LR    I,A     RESTORE DATA INC ISAR
0099 0067 92 05         BNC   GAL1    BR AROUND IF NO CARRY
009A 0069 20 67         LI    H'67'   DECIMAL ADJUST +1
009B 006B DC            ASD   S       ADD DECIMAL MSD GALN. CT SINCE REGEN
009C 006C 5C            LR    S,A     RESTORE DATA
009D 006D 70    GAL1    CLR   A
009E 006E 67            LISU  7       LOAD ISAR WITH 76
009F 006F 6E            LISL  6       R76 IS GALLON COUNT
00A0 0070 CC            AS    S       LOAD A WITH GALLON COUNT
00A1 0071 91 03         BM    RINV    BR IF NEGATIVE
00A2 0073 94 1A         BNZ   FINI    BRANCH IF NOT ZERO
00A3 0075 20 64 RINV    LI    D'100'  RESTORE INITIAL VALUE
00A4 0077 5C            LR    S,A     TO GALLON COUNT REGISTER
00A5 0078 68            LISL  0       LOAD ISAR
00A6 0079 63            LISU  3       WITH OCTAL 30
00A7 007A 20 67         LI    H'67'   DECIMAL ADJUST +1
00A8 007C DC            ASD   S       ADD DECIMAL LSD
00A9 007D 5D            LR    I,A     RESTORE DATA INC ISAR
```

```
00AA 007E 92 0F            BNC    FINI         BRANCH IF NO CARRY
00AB 0080 20 67            LI     H'67'        DECIMAL ADJUST +1
00AC 0082 DC               ASD    S            ADD DECIMAL MSD  TOTAL ACC GALLONS
00AD 0083 5C               LR     S,A          RESTORE DATA
00AE 0084 92 09            BNC    FINI         BRANCH IF NO CARRY
00AF 0086 A1               INS    1            INPUT PORT 1
00B0 0087 21 20            NI     H'20'        CHECK DAY LOCKOUT STATUS
00B1 0089 84 04            BZ     FINI         BRANCH IF ZERO
00B2 008B 20 A1            LI     H'A1'        SET GOTO BYPASS,LOCKOUT & SERVICE BIT
00B3 008D 05               LR     KL,A         RESTORE NEW STATUS
00B4                     *
00B5                     ****************************************************
00B6                     *
00B7                     *
00B8                     *            AC LOSS DURING REGENERATION
00B9                     *
00BA                     * IF AC IS LOST DURING A REGENERATION, THIS PGM WILL
00BB                     * TURN OFF DRIVES, SET GO TO REGEN FLAG, AND REMOVE
00BC                     * REGEN STATUS
00BD                     *
00BE                     *
00BF                     ****************************************************
00C0 008E 00         FINI  LR     A,KU         LOAD STATUS IN ACC
00C1 008F 18               COM    A            INVERT BITS
00C2 0090 21 05            NI     H'05'        MASK FOR AC LOSS AND REGN BITS
00C3 0092 94 09            BNZ    CMLP         IF NOT BOTH, BR TO CONTINUE MAIN PGM
00C4 0094 18               COM    A            SET ACC TO FF
00C5 0095 B0               OUTS   0            OUTPUT PORT 0 TURNING OFF ALL DRIVERS
00C6 0096 00               LR     A,KU         RELOAD STATUS IN ACC
00C7 0097 21 FE            NI     H'FE'        REMOVE REGN STATUS BIT
00C8 0099 22 08            OI     H'08'        SET GO TO REGN BIT
00C9 009B 04               LR     KU,A         LOAD ADJUSTED STATUS BACK IN REG
00CA                     *
00CB                     ****************************************************
00CC                     *
00CD 009C 29 02 AD  CMLP   JMP    BYPS         JUMP TO BYPASS ROUTINE
00CE                     *
00CF                     ****************************************************
00D0                     *
00D1                     *
00D2                     *            CLOCK ROUTINE
00D3                     *
00D4                     * THIS ROUTINE IS INITIATED BY THE EXTERNAL INTERRUPT.
00D5                     * IT WILL JUMP TO THE TIME ROUTINE WHICH WILL INPUT DATA
00D6                     * FROM PORT 1, DECREMENT THE REGENERATION TIMER, AND
00D7                     * UP DATE THE 12 HOUR CLOCK AND DAY COUNT.
00D8                     *
00D9                     *
00DA                     ****************************************************
00DB                           ORG    H'A0'        ORIGIN OF PROGRAM
00DC                     *
00DD 00A0 1E               LR     J,W          SAVE STATUS WORD IN REGISTER 9
00DE 00A1 58               LR     8,A          SAVE ACCUMULATOR IN REGISTER 8
00DF 00A2 0A               LR     A,IS         SAVE ISAR IN REGISTER 7
00E0 00A3 57               LR     7,A
00E1 00A4 2C               XDC                 SAVE DATA COUNT IN DC1
00E2                     *
00E3                     * INPUT & STORE EXTERNAL SYSTEM STATUS FROM PORT 1.
00E4                     * SET VALID FLAG IF COMPARES TO PREVIOUS EXTERNAL STATUS
00E5                     *
00E6 00A5 45         TIME  LR     A,5          MOVE OLD EXTERNAL STATUS
00E7 00A6 56               LR     6,A          FROM REG 5 TO REG 6
00E8 00A7 A1               INS    1            INPUT NEW EXTERNAL STATUS FROM PORT 1
00E9 00A8 13               SL     1            DELETE PROBE ENABLE BIT
00EA 00A9 12               SR     1
00EB 00AA 55               LR     5,A          STORE NEW EXTERNAL STATUS IN REG 5
00EC 00AB E6               XS     6            COMPARE OLD AND NEW EXTERNAL STATUS
00ED 00AC 01               LR     A,KL         LOAD INTERNAL STATUS IN ACC
00EE 00AD 84 05            BZ     SETV         IF COMPARED, GO TO SET VALID FLAG
00EF 00AF 21 F7            NI     H'F7'        REMOVE VALID FLAG FROM BIT 7
```

```
00F0  00B1 90 03           BR    RLIS      GO TO RELOAD INTERNAL STATUS
00F1  00B3 22 08     SETV  OI    H'08'     SET VALID FLAG IN BIT 7
00F2  00B5 05       RLIS  LR    KL,A      RELOAD INTERNAL STATUS IN REG 67
00F3                *
00F4                * ENABLE AND DISABLE PROBES
00F5                *
00F6  00B6 67             LISU  7         LOC OF ETB
00F7  00B7 68             LISL  0
00F8  00B8 4D             LR    A,I       LD ETB IN ACC
00F9  00B9 25 2F           CI    H'2F'     IS ETB = 47?
00FA  00BB 94 06           BNZ   CE48      IF NOT, BR TO COMP ETB TO 48
00FB  00BD 01             LR    A,KL      LD INT STATUS IN ACC
00FC  00BE 22 04           OI    H'04'     SET PROBES ENABLED STATUS
00FD  00C0 90 15           BR    LDST      BR TO LOAD STATUS
00FE  00C2 24 CE     CE48  AI    H'CE'     ADD COM OF 49
00FF  00C4 82 0B           BC    DAPB      IF > 49, BR TO DISABLE PROBES
0100  00C6 24 05           AI    H'05'     ADD 5 MORE
0101  00C8 84 0A           BZ    CPES      IF = 46, BR TO CLR PROBE ENA STATUS
0102  00CA 92 05           BNC   DAPB      IF < 46, BR TO DISABLE PROBES
0103  00CC 70             CLR   A
0104  00CD B1             OUTS  1         ENABLE PROBES
0105  00CE 90 08           BR    CITB      BR TO CHECK ITB
0106  00D0 20 80     DAPB  LI    H'80'
0107  00D2 B1             OUTS  1         DISABLE PROBES
0108  00D3 01       CPES  LR    A,KL      LD INT STATUS IN ACC
0109  00D4 21 FB           NI    H'FB'     CLR PROBES ENABLED STATUS
010A  00D6 05       LDST  LR    KL,A      LOAD STATUS
010B                *
010C                * DETERMINE IF ENTERED FROM INTERNAL OR EXTERNAL INRUPT.
010D                * RESET ITB.  DECREMENT OR RESET ETB. SET AC STATUS.
010E                *
010F  00D7 70       CITB  CLR             CLEAR ACC
0110  00D8 CC             AS    S         SET W TO CHECK ITB FOR 0, SAME ISAR
0111  00D9 20 7D           LI    H'7D'     LOAD ACC WITH 125
0112  00DB 5E             LR    D,A       SET ITB TO 125, DEC ISAR
0113  00DC 00             LR    A,KU      LOAD INTERNAL STATUS IN ACC
0114  00DD 84 08           BZ    NOAC      IF ITB WAS 0, BR TO NO AC
0115  00DF 21 FB           NI    H'FB'     DELETE AC LOST BIT
0116  00E1 3C             DS    S         DECREMENT ETB COUNTER
0117  00E2 94 71           BNZ   COUT      IF ETB NOT 0, GET OUT
0118  00E4 90 03           BR    LACS      BR TO LOAD AC STATUS
0119  00E6 22 04     NOAC  OI    H'04'     SET AC LOST BIT
011A  00E8 04       LACS  LR    KU,A      LOAD AC STATUS IN REG
011B  00E9 45             LR    A,5       LOAD EXT STATUS IN ACC
011C  00EA 21 10           NI    H'10'     MASK FOR 50/60 HZ FLAG
011D  00EC 94 05           BNZ   L60H      BRANCH TO 60 HZ LOAD IF FLAG IS SET
011E  00EE 20 32           LI    H'32'     LOAD ACC WITH 50
011F  00F0 90 03           BR    SEXB      BRANCH TO SET EXTERNAL TIME BASE
0120  00F2 20 3C     L60H  LI    H'3C'     LOAD ACC WITH 60
0121  00F4 5D       SEXB  LR    1,A       SET EXTERNAL TIME BASE IN REG 70
0122                *
0123                * COUNT DOWN REGENERATION SECONDS AND MINUTES.
0124                *
0125  00F5 6B             LISL  3         SET ISAR FOR REGN SEC FETCH
0126  00F6 70             CLR             CLEAR ACC
0127  00F7 CC             AS    S         ADD REGN SEC TO ACC, SAME ISAR
0128  00F8 94 09           BNZ   DRS       BR TO DEC REGN SEC IF NOT ZERO
0129  00FA 6C             LISL  4         SET ISAR FOR REGN MIN FETCH
012A  00FB CC             AS    S         ADD REGN MIN TO ACC, SAME ISAR
012B  00FC 84 06           BZ    DDST      IF 0 BR TO DEC DISP STATUS TIMER
012C  00FE 3E             DS    D         DEC REGN MIN, DEC ISAR
012D  00FF 20 3C           LI    H'3C'     LOAD 60 IN ACC
012E  0101 5C             LR    S,A       SET REGN SEC TO 60, SAME ISAR
012F  0102 3E       DRS   DS    D         DEC REGN SEC, DEC ISAR
0130                *
0131                * COUNT DOWN DISPLAY STATUS SECONDS TIMER
0132                *
0133  0103 6F       DDST  LISL  7         LOC OF DISP STATUS TIMER
0134  0104 70             CLR             CLEAR ACC
0135  0105 CC             AS    S         FETCH TIMER DATA
```

```
0136 0106 84 02          BZ    DSEC     LEAVE ALONE IF ZERO
0137 0108 3C             DS    S        DECREMENT TIMER
0138                *
0139                * COUNT DOWN SECONDS AND KEEP ZERO COUNT FOR 1 SECOND.
013A                *
013B 0109 6A       DSEC  LISL  2        LOC OF TOD SECONDS
013C 010A 3C             DS    S        DEC SEC COUNT,
013D 010B 82 48          BC    COUT     IF SEC DID NOT PASS THRU 0, GET OUT
013E 010D 20 3B          LI    H'3B'    LOAD 59 IN ACC
013F 010F 5C             LR    S,A      SET SEC COUNT TO 59
0140                *
0141                * IF POR FLAG SET, DO NOT UPDATE MINUTES, HOURS, OR DAYS
0142                *
0143 0110 08       TPOR  LR    A,KU     LOAD INTERNAL SYSTEM STATUS IN ACC
0144 0111 19             LNK            ADD 0 CARRY TO SET W STSTUS
0145 0112 81 05          BP    CK88     IF NO POR, BR TO INCREMENT MINUTES
0146 0114 21 20          NI    H'20'    MASK FOR EM BIT
0147 0116 84 3D          BZ    COUT     IF POR & NOT EM, GET OUT
0148
0149                * INCREMENT MINUTES
014A                *
014B 0118 62       CK88  LISU  2        LOAD ISAR WITH LOCATION FOR MIN COUNT
014C 0119 68             LISL  0
014D 011A 20 67          LI    H'67'    SET UP FOR BCD INC
014E 011C DC             ASD   S        DECIMAL ADD MIN REG 20 TO ACC
014F 011D 5C             LR    S,A      LOAD INC MIN BACK IN MIN COUNT REG 20
0150 011E 24 A0          AI    H'A0'    CARRY BIT SET 60 MIN OR GREATER
0151 0120 92 33          BNC   COUT     IF MIN LESS THAN 60 GET OUT
0152 0122 70             CLR            SET ACC TO ZERO
0153 0123 5D             LR    I,A      SET MIN REG 20 TO ZERO, INC ISAR
0154                *
0155                * UPDATE HOURS
0156                *
0157 0124 4C       UDHR  LR    A,S      LOAD HRS IN ACC
0158 0125 1F             INC   A        INC HRS
0159 0126 5C             LR    S,A      RESTORE INC HRS
015A 0127 21 1F          NI    H'1F'    MASK OUT REGN IM AND AM-PM BITS
015B 0129 25 12          CI    H'12'    COMPARE FOR NOON OR MIDNIGHT
015C 012B 84 14          BZ    CHAP     IF 12 , BR TO CHANGE AM-PM
015D 012D 25 0A          CI    H'0A'    AT 10 O'CLOCK?
015E 012F 84 0B          BZ    TE10     IF COMPARE, BR TO TIME = 10 O'CLOCK
015F 0131 24 ED          AI    H'ED'    ADD COM OF 12
0160 0133 92 20          BNC   COUT     IF NOT > 12, GET OUT
0161 0135 20 E0          LI    H'E0'    LOAD MASK FOR IN AND AM-PM
0162 0137 FC             NS    S        MASK HRS
0163 0138 1F             INC   A        SET TO 1 O'CLOCK
0164 0139 90 03          BR    RHRS     BR TO RESTORE HRS
0165 013B 76       TE10  LIS   6        SET UP FOR LSD DECIMAL INC
0166 013C CC             AS    S        ADD HRS TO ACC TO SET TO 10 O'CLOCK
0167 013D 5C       RHRS  LR    S,A      RESTORE ADJ HRS
0168 013E 90 15          BR    COUT     HRS SET, GET OUT
0169 0140 20 20    CHAP  LI    H'20'    AT 12, SET UP TO CHANGE AM-PM BIT
016A 0142 EC             XS    S        TOGGLE AM-PM
016B 0143 5C             LR    S,A      RESTORE ADJ HRS
016C 0144 21 20          NI    H'20'    MASK FOR AM
016D 0146 94 0D          BNZ   COUT     AT NOON, GET OUT
016E
016F                * UPDATE DAY COUNT
0170                *
0171 0148 6E       UDAY  LISL  6        LOAD ISAR FOR REG 26
0172 0149 4C             LR    A,S      LOAD DAY COUNT REG 26 IN ACC
0173 014A 1F             INC            INC DAY COUNT
0174 014B 5C             LR    S,A      STORE INC DAY COUNT BACK IN REG 26
0175 014C 15             SL    4        ISOLATE DAY COUNT BYTE
0176 014D 81 06          BP    COUT     IF DAY LESS THAN 8, GET OUT
0177 014F 4C             LR    A,S      LOAD INC DAY COUNT BACK IN ACC
0178 0150 21 F0          NI    H'F0'    MASK OUT DAY COUNT
0179 0152 1F             INC            SET TO DAY ONE
017A 0153 5C             LR    S,A      LOAD DAY ONE IN REG 26, SAME ISAR
017B                *
```

```
017C                * THE FOLLOWING RESTORES ISAR, ACCUMULATOR, AND STATUS
017D                * OF THE INTERRUPTED ROUTINE, AND RETURNS TO THE ROUTINE
017E                * THAT WAS INTERRUPTED.
017F                *
0180 0154 47   COUT  LR    A,7        RESTORE ISAR
0181 0155 0B         LR    IS,A
0182 0156 48         LR    A,8        RESTORE ACC
0183 0157 1D         LR    W,J        RESTORE STATUS
0184 0158 2C         XDC              RESTORE DATA COUNT
0185 0159 1B         EI               ENABLE INTERRUPTS
0186 015A 1C         POP              RETURN
0187                *
0188                ************************************************
0189                *
018A                *
018B                *           INTERVAL TIMER ROUTINE
018C                *
018D                *
018E                ************************************************
018F                *
0190                *
0191                *     KEYBOARD/FLOW RATE COUNTER ROUTINE
0192                *
0193 015B 61   KYBD  LISU  1          SET ISAR FOR QL
0194 015C 6F         LISL  7
0195 015D A4         INS   4          BRING IN KYBD DATA
0196 015E 14         SR    4          STRIP OFF DATA CHECK DIGIT COUNT
0197 015F 25 07      CI    H'07'      DIGIT COUNT = 4 ?
0198 0161 84 57      BZ    DIG4       YES BRANCH TO DIGIT 4 ROUTINE
0199 0163 25 0B      CI    H'0B'      DIGIT COUNT = 3 ?
019A 0165 84 27      BZ    DIG3       YES BRANCH TO DIGIT 3 ROUTINE
019B 0167 25 0D      CI    H'0D'      DIGIT COUNT = 2 ?
019C 0169 84 16      BZ    DIG2       YES BRANCH TO DIGIT 2 ROUTINE
019D 016B 25 0E      CI    H'0E'      DIGIT COUNT = 1 ?
019E 016D 84 06      BZ    DIG1       YES BRANCH TO DIGIT 1 ROUTINE
019F 016F 20 E0      LI    H'E0'      CAN'T FIND DIGIT
01A0 0171 B4         OUTS  4          RESTORE TO DIGIT COUNT 1
01A1 0172 90 70      BR    DONE       DONE
01A2 0174 A4   DIG1  INS   4          BRING IN KYBD DATA
01A3 0175 21 03      NI    H'03'      SLEW 2 OR SLEW 1 = ONE
01A4 0177 94 05      BNZ   LD15       GO TO LD15 IF YES
01A5 0179 20 FC      LI    H'FC'      CLEAR STATUS BITS 1 AND 0
01A6 017B 90 65      BR    NKEY       GO TO NKEY
01A7 017D 07   LD15  LR    QL,A       YES STORE BITS R15
01A8 017E 90 49      BR    TSTB       GO TO TSTB
01A9 0180 A4   DIG2  INS   4          BRING IN KYBD DATA
01AA 0181 21 03      NI    H'03'      SLEW 4 OR SLEW 2 = ONE
01AB 0183 94 05      BNZ   KYD2       GO TO KYD2 IF YES
01AC 0185 20 F3      LI    H'F3'      CLEAR STATUS BITS 3 AND 2
01AD 0187 90 59      BR    NKEY       GO TO NKEY
01AE 0189 13   KYD2  SL    1          YES SHIFT LEFT
01AF 018A 13         SL    1          AGAIN
01B0 018B 90 F1      BR    LD15       BRANCH TO STORE BITS
01B1 018D A4   DIG3  INS   4          BRING IN KEYBOARD DATA
01B2 018E 21 03      NI    H'03'      MANUAL REGEN OR ENTER/RECALL = ONE
01B3 0190 94 07      BNZ   KYD3       GO TO KYD3 IF YES
01B4 0192 20 CF      LI    H'CF'      CLEAR STATUS BITS 5 AND 4
01B5 0194 FC         NS    S          AND WITH QL KYBD DATA
01B6 0195 07         LR    QL,A       RESTORE DATA
01B7 0196 90 03      BR    KYDF       BR TO CHECK FLOW RATE FF
01B8 0198 15   KYD3  SL    4          SHIFT LEFT 4
01B9 0199 07         LR    QL,A       STORE BITS IN R15
01BA 019A 00   KYDF  LR    A,KU       LOAD INTERNAL STATUS
01BB 019B 21 01      NI    H'01'      SAVE REGEN BIT
01BC 019D 94 2A      BNZ   TSTB       BRANCH IF REGEN BIT SET
01BD 019F A4         INS   4          BRING IN KYBD DATA
01BE 01A0 21 08      NI    H'08'      FLOW RATE SWITCH = ONE
01BF 01A2 84 07      BZ    CHEK       BIT =ZERO GO CHECK TRANSITION
01C0 01A4 44         LR    A,4        MOVE R4 TO A
01C1 01A5 22 80      OI    H'80'      SET FLOW RATE BIT
```

```
01C2 01A7 54              LR    4,A       RESTORE R4
01C3 01A8 90 1F           BR    TSTB      GO TO TSTB
01C4 01A9 70       CHEK   CLR   A
01C5 01AA C4              NS    4         LOAD A WITH R4
01C6 01AC 81 1B           BP    TSTB      BR IF FLOW RATE BIT = ZERO
01C7 01AE 67              LISU  7         LOAD ISAR
01C8 01AF 6D              LISL  5         R75 FLOW RATE COUNTER
01C9 01B0 4C              LR    A,S       LOAD A WITH FLOW RATE COUNTER
01CA 01B1 1F              INC   A         INCREMENT FLOW RATE CTR
01CB 01B2 5C              LR    S,A       RESTORE
01CC 01B3 20 7F           LI    H'7F'     CLEAR MSD
01CD 01B5 F4              NS    4         FLOW RATE BIT R4
01CE 01B6 54              LR    4,A       RESTORE R4
01CF 01B7 90 10           BR    TSTB      BR TO TEST BITS
01D0 01B9 A4       DIG4   INS   4         INPUT KYBD DATA
01D1 01BA 21 01           NI    H'01'     BYPASS BIT = ONE ?
01D2 01BC 94 07           BNZ   KYD4      GO TO KYD4 IF YES
01D3 01BE 20 BF           LI    H'BF'     CLEAR STATUS BIT 6
01D4 01C0 FC              NS    S         AND WITH QL
01D5 01C1 07              LR    QL,A      RESTORE QL
01D6 01C2 90 05           BR    TSTB      GO TO TSTB
01D7 01C4 15       KYD4   SL    4         PACK
01D8 01C5 13              SL    1         BYPASS
01D9 01C6 13              SL    1         BIT
01DA 01C7 07              LR    QL,A      IN R15
01DB 01C8 03       TSTB   LR    A,QL      LOAD KYBD STATUS
01DC 01C9 21 7F           NI    H'7F'     MASK FOR KEY DATA
01DD 01CB 84 0C           BZ    SET4      BRANCH IF NO BITS SET
01DE 01CD 44              LR    A,4       LOAD KYBD FILTER CTR
01DF 01CE 13              SL    1         SHIFT LEFT ONE
01E0 01CF 13              SL    1         SHIFT LEFT ONE
01E1 01D0 94 0D           BNZ   DECK      BR IF KYBD FILTER NOT ZERO
01E2 01D2 03              LR    A,QL      LOAD KYBD STATUS
01E3 01D3 22 80           OI    H'80'     SET DATA VALID BIT
01E4 01D5 07              LR    QL,A      RESTORE KYBD STATUS
01E5 01D6 90 0C           BR    DONE
01E6 01D8 44       SET4   LR    A,4       LOAD KYBD FILTER CTR
01E7 01D9 22 0B           OI    H'0B'     WITH H'B' 40 MSEC FILTER CT.
01E8 01DB 54              LR    4,A       RESTORE
01E9 01DC 70              CLR
01EA 01DD 07              LR    QL,A      CLEAR KEYBOARD STATUS
01EB 01DE 34       DECK   DS    4         DECREMENT FILTER COUNTER
01EC 01DF 90 03           BR    DONE
01ED 01E1 FC       NKEY   NS    S         AND WITH QL
01EE 01E2 07              LR    QL,A      RESTORE QL
01EF                      *
01F0                      *     DISPLAY ROUTINE
01F1                      *
01F2 01E3 A4       DONE   INS   4         INPUT DIGIT/KYBD PORT
01F3 01E4 14              SR    4         RIGHT JUSTIFY
01F4 01E5 25 07           CI    H'07'     DIGIT 1 NEXT ?
01F5 01E7 94 02           BNZ   DS01      GO TO DS01 IF NOT
01F6 01E9 3A              DS    10        YES - DECREMENT ISAR POINTER
01F7 01EA 25 0D   DS01    CI    H'0D'     DIGIT 3 NEXT ?
01F8 01EC 4A              LR    A,10      GET ISAR POINTER
01F9 01ED 94 04           BNZ   DS02      GO TO DS02 IF DIGIT 3 NOT NEXT
01FA 01EF 4A              LR    A,10      YES - INCREMENT ISAR POINTER
01FB 01F0 1F              INC
01FC 01F1 5A              LR    10,A
01FD 01F2 0B       DS02   LR    IS,A      LOAD ISAR
01FE 01F3 A4              INS   4         INPUT DIGIT/KYBD PORT
01FF 01F4 14              SR    4         RIGHT JUSTIFY
0200 01F5 25 07           CI    H'07'     DIGIT 1 NEXT ?
0201 01F7 84 09           BZ    DS03      GO TO DS03 IF YES
0202 01F9 25 0D           CI    H'0D'     DIGIT 3 NEXT ?
0203 01FB 84 05           BZ    DS03      GO TO DS03 IF YES
0204 01FD 4C              LR    A,S       LOAD ACC WITH DATA
0205 01FE 14              SR    4         MS NIBBLE - RIGHT JUSTIFY
0206 01FF 90 02           BR    DS03+1    GO TO MASK
0207 0201 4C       DS03   LR    A,S       LOAD ACC WITH DATA
```

```
0208 0202 21 0F           NI            H'0F'    MASK FOR LS NIBBLE
0209 0204 56              LR    6,A              SAVE DATA
020A 0205 0A              LR    A,IS             EXAMINE ISAR
020B 0206 12              SR    1                DELETE LS BIT
020C 0207 25 1A           CI            O'32'    LS/MS STATUS
020D 0209 84 04           BZ            DS04     GO TO DS04 IF YES
020E 020B 46              LR    A,6              GET DATA
020F 020C 90 04           BR            DS05     GO TO DS05 IF NOT
0210 020E 46        DS04  LR    A,6              GET DATA
0211 020F 24 10           AI            H'10'    ADD OFFSET FOR STATUS
0212 0211 2A 07 DO DS05   DCI           DTBL     SET DATA COUNTER TO START OF
0213 0214 8E              ADC                    SEGMENT TABLE AND ADD ACC TO DC
0214 0215 16              LM                     LOAD ACC FROM TABLE
0215 0216 56              LR    6,A              SAVE SEGMENT DATA
0216 0217 0A              LR    A,IS             EXAMINE ISAR
0217 0218 25 0F           CI            O'17'    ENTRY CODE ISAR ?
0218 021A 94 15           BNZ           DS14     GO TO DS14 IF NOT
0219 021C A4              INS   4                INPUT DIGIT/KYBD DATA
021A 021D 14              SR    4                RIGHT JUSTIFY
021B 021E 25 0D           CI            H'0D'    DIGIT 3 NEXT ?
021C 0220 94 05           BNZ           DS09     GO TO DS09 IF NOT
021D 0222 20 39           LI            H'39'    SET SEGMENT DATA FOR "C"
021E 0224 90 45           BR            DS18-1
021F 0226 A4        DS09  INS   4                INPUT DIGIT/KYBD PORT
0220 0227 14              SR    4                RIGHT JUSTIFY
0221 0228 25 0B           CI            H'0B'    DIGIT 4 NEXT ?
0222 022A 94 05           BNZ           DS14     GO TO DS14 IF NOT
0223 022C 20 79           LI            H'79'    SET SEGMENT DATA FOR "E"
0224 022E 90 3B           BR            DS18-1
0225 0230 0A        DS14  LR    A,IS             EXAMINE ISAR
0226 0231 25 11           CI            O'21'    MS TIME OF DAY ?
0227 0233 84 07           BZ            DS15     GO TO DS15 IF YES
0228 0235 25 13           CI            O'23'    MS REGEN TIME ?
0229 0237 84 03           BZ            DS15     GO TO DS15 IF YES
022A 0239 90 31           BR            DS18     GO TO DS18 IF NOT
022B 023B A4        DS15  INS   4                INPUT DIGIT/KYBD PORT
022C 023C 14              SR    4                RIGHT JUSTIFY
022D 023D 25 0B           CI            H'0B'    DIGIT 4 NEXT ?
022E 023F 94 2B           BNZ           DS18     GO TO DS18 IF NOT
022F 0241 70              CLR
0230 0242 56              LR    6,A
0231 0243 CC              AS    S                EXAMINE MS BYTE OF TIME OF DAY/REGEN
0232 0244 81 04           BP            DS16     GO TO DS16 IF REGEN IMMINENT BIT ZERO
0233 0246 20 20           LI            H'20'    SET REGEN IMMINENT SEGMENT (F)
0234 0248 56              LR    6,A
0235 0249 20 30     DS16  LI            H'30'    AND MS BYTE OF TIME OF DAY/REGEN
0236 024B FC              NS    S                WITH H'30'
0237 024C 25 30           CI            H'30'    PM & 1 ?
0238 024E 94 06           BNZ           DS17     GO TO DS17 IF NOT
0239 0250 46              LR    A,6              SET DATA FOR PM & 1
023A 0251 22 86           OI            H'86'    (RI ALSO IF SET)
023B 0253 90 45           BR            DS12     GO TO DS12
023C 0255 25 20     DS17  CI            H'20'    PM & BLANK ?
023D 0257 94 06           BNZ           DS23     GO TO DS23 IF NOT
023E 0259 46              LR    A,6              SET DATA FOR PM & BLANK
023F 025A 22 80           OI            H'80'    (NO BLANK IF RI SET)
0240 025C 90 3C           BR            DS12     GO TO DS12
0241 025E 25 10     DS23  CI            H'10'    AM & 1 ?
0242 0260 94 06           BNZ           DS24     GO TO DS24 IF NOT
0243 0262 46              LR    A,6              SET DATA FOR AM & 1
0244 0263 22 86           OI            H'86'    (RI ALSO IF SET)
0245 0265 90 04           BR            DS18-1   GO TO DS18-1
0246 0267 46        DS24  LR    A,6              SET DATA FOR AM & BLANK
0247 0268 22 80           OI            H'80'    (RI IF ALSO SET)
0248 026A 56              LR    6,A
0249 026B 4A        DS18  LR    A,10             EXAMINE ISAR POINTER
024A 026C 21 C0           NI            H'C0'    MASK FOR BITS 7&6
024B 026E 67              LISU  7                EXAMINE SECONDS DATA
024C 026F 6A              LISL  2
024D 0270 84 08           BZ            DS20     GO TO DS20 IF BITS 7&6 EQUAL ZERO
```

```
024E 0272 4C              LR    A,S
024F 0273 21 01           NI    H'01'       BIT 0 SET ?
0250 0275 94 03           BNZ   DS20        GO TO DS20 IF YES
0251 0277 70              LIS   0           SET SEGMENT DATA FOR BLANK
0252 0278 56              LR    6,A
0253 0279 20 FF    DS20   LI    H'FF'       BLANK SEGMENT PORT
0254 027B B5              OUTS  5
0255 027C A4              INS   4           INPUT DIGIT/KYBD PORT
0256 027D 22 0F           OI    H'0F'       MASK FOR LS NIBBLE
0257 027F 13              SL    1           SHIFT LEFT FOR NEXT DIGIT
0258 0280 21 F0           NI    H'F0'       MASK FOR LS NIBBLE
0259 0282 25 F0           CI    H'F0'       LAST DIGIT ?
025A 0284 94 03           BNZ   DS21        GO TO DS21 IF NOT
025B 0286 20 E0           LI    H'E0'       OUTPUT FOR DIGIT 1
025C 0288 B4       DS21   OUTS  4           OUTPUT DIGIT PORT
025D 0289 46              LR    A,6
025E 028A 18              COM               COMPLEMENT SEGMENT DATA
025F 028B B5              OUTS  5           OUTPUT SEGMENT PORT
0260 028C A4              INS   4           INPUT DIGIT/KYBD PORT
0261 028D 14              SR    4           RIGHT JUSTIFY
0262 028E 25 0E           CI    H'0E'       DIGIT 1 ?
0263 0290 94 15           BNZ   DS22        GO TO DS22 IF NOT
0264 0292 4E              LR    A,D         DECREMENT ISAR
0265 0293 3C              DS    S           DECREMENT INTERNAL TIME BASE COUNTER
0266 0294 94 11           BNZ   DS22        GO TO DS22 IF NOT
0267 0296 29 00 A5        JMP   TIMER       GO TO TIMER ROUTINE IF COUNTER ZERO
0268 0299 56       DS12   LR    6,A         LOAD DATA BYTE
0269 029A 67              LISU  7           EXAMINE EXT TIME BASE COUNTER
026A 029B 68              LISL  0
026B 029C 4C              LR    A,S
026C 029D 21 20           NI    H'20'       MASK FOR BIT 5
026D 029F 94 CB           BNZ   DS18        GO TO DS18 IF BIT 4 SET
026E 02A1 46              LR    A,6
026F 02A2 21 7F           NI    H'7F'       MASK OUT COLONS
0270 02A4 90 C5           BR    DS18-1
0271 02A6 47       DS22   LR    A,7         RESTORE ISAR
0272 02A7 0B              LR    IS,A
0273 02A8 48              LR    A,8         RESTORE ACC
0274 02A9 1D              LR    W,J         RESTORE STATUS
0275 02AA 2C              XDC               RESTORE DATA COUNT
0276 02AB 1B              EI                ENABLE INTERRUPTS
0277 02AC 1C              POP               RETURN
0278                *
0279                ********************************************************
027A                *
027B                *
027C                *                       BYPASS ROUTINE
027D                *
027E                *
027F                ********************************************************
0280 02AD 01       BYPS   LR    A,KL        LOAD SYSTEM STATUS
0281 02AE 15              SL    4           POSITION VALID BIT
0282 02AF 81 17           BP    BYP7        BRANCH IF ZERO
0283 02B1 45              LR    A,5         LOAD PORT STATUS
0284 02B2 21 01           NI    H'01'       BYPASS BIT = 1 ?
0285 02B4 94 0E           BNZ   BYP6        BRANCH IF YES
0286 02B6 01              LR    A,KL        LOAD SYSTEM STATUS
0287 02B7 22 10           OI    H'10'       SET BYPASS BIT
0288 02B9 05              LR    KL,A        RESTORE STATUS
0289 02BA 00              LR    A,KU        LOAD SYSTEM STATUS
028A 02BB 21 F6           NI    H'F6'       RESET GOTO & REGEN BITS
028B 02BD 04              LR    KU,A        RESTORE STATUS
028C 02BE 20 FF           LI    H'FF'       CLEAR
028D 02C0 B0              OUTS  0           PORT 0
028E 02C1 90 05           BR    BYP7        BRANCH
028F 02C3 01       BYP6   LR    A,KL        LOAD SYSTEM STATUS
0290 02C4 21 EF           NI    H'EF'       RESET BYPASS BIT
0291 02C6 05              LR    KL,A        RESTORE STATUS
0292 02C7 01       BYP7   LR    A,KL        LOAD SYSTEM STATUS
0293 02C8 21 21           NI    H'21'       SERVICE OR LOCKED OUT BITS = 1 ??
```

```
0294 02CA 94 15              BNZ   BYP1         YES, BRANCH AROUND
0295 02CC 00                  LR    A,KU         LOAD SYSTEM STATUS
0296 02CD 21 01               NI    H'01'        MASK FOR REGN BIT
0297 02CF 94 10               BNZ   BYP1         IF IN REGN, SKIP KEY CHECK
0298 02D1 03        BYPAS     LR    A,QL         LOAD A WITH KEYBOARD STATUS
0299 02D2 18                  COM   A            CHECK VALID AND BYPASS BITS
029A 02D3 21 C0               NI    H'C0'        SAVE VALID & BYPASS BITS
029B 02D5 94 0A               BNZ   BYP1         BRANCH IF NO KEYBOARD STATUS
029C 02D7 01                  LR    A,KL         LOAD INTERNAL STATUS
029D 02D8 21 10               NI    H'10'        SAVE BYPASS SWITCH STATUS
029E 02DA 84 1A               BZ    BYP2         BR IF BYPASS SWITCH NOT ONE
029F 02DC 01                  LR    A,KL         RELOAD INTERNAL STATUS
02A0 02DD 22 40               OI    H'40'        SET TURN OFF BYPASS BIT
02A1 02DF 05                  LR    KL,A         RESTORE INTERNAL STATUS
02A2 02E0 01        BYP1      LR    A,KL         LOAD INTERNAL STATUS
02A3 02E1 21 D0               NI    H'D0'        SAVE GOTO, TURN OFF & BYPASS STATUS
02A4 02E3 25 90               CI    H'90'        GOTO & BYPASS SWITCH = ONE ?
02A5 02E5 84 1A               BZ    BYP5         BRANCH IF YES
02A6 02E7 25 80               CI    H'80'        GOTO & NOT BYPASS SWITCH = ONE ?
02A7 02E9 84 11               BZ    BYP4         BR. IF YES
02A8 02EB 25 50               CI    H'50'        TURN OFF & BYPASS SWITCH = ONE ?
02A9 02ED 84 0D               BZ    BYP4         BR. IF YES
02AA 02EF 25 40               CI    H'40'        TURN OFF & NOT BYPASS SWITCH = ONE ?
02AB 02F1 84 0E               BZ    BYP5         BR. IF YES
02AC 02F3 90 13               BR    OUT          ELSE EXIT
02AD 02F5 01        BYP2      LR    A,KL         RELOAD INTERNAL STATUS
02AE 02F6 22 80               OI    H'80'        OR IMMEDIATE  SET GOTO BYPASS BIT
02AF 02F8 05                  LR    KL,A         RESTORE STATUS
02B0 02F9 90 E6               BR    BYP1         BRANCH
02B1 02FB 20 F7     BYP4      LI    H'F7'        SET BIT 3  TURN MOTOR ON
02B2 02FD 80                  OUTS  0            PORT 0
02B3 02FE 90 08               BR    OUT          EXIT
02B4 0300 01        BYP5      LR    A,KL         LOAD INTERNAL STATUS
02B5 0301 21 3F               NI    H'3F'        STRIP OFF GO TO & TURN OFF BITS
02B6 0303 05                  LR    KL,A         RESTORE STATUS
02B7 0304 20 FF               LI    H'FF'        CLEAR  TURN BYPASS MOTOR OFF
02B8 0306 80                  OUTS  0            PORT 0
02B9                    *
02BA                    ***********************************************
02BB                    *
02BC                    *
02BD                    *              DISPLAY MANAGER ROUTINE
02BE                    *
02BF                    *
02C0                    ***********************************************
02C1                    *
02C2 0307 00        OUT       LR    A,KU         EXAMINE STATUS
02C3 0308 18                  COM
02C4 0309 13                  SL    1
02C5 030A 13                  SL    1            ENTRY MODE FLAG SET ?
02C6 030B 91 10               BM    DM20         GO TO DM20 IF EM FLAG NOT SET
02C7 030D 15                  SL    4            ENTRY CODE FLAG SET ?
02C8 030E 91 05               BM    DM03         GO TO DM03 IF EC FLAG NOT SET
02C9 0310 20 0F               LI    0'17'        SET ISAR POINTER FOR EC CODE
02CA 0312 90 7C               BR    DM07         GO TO DM07
02CB 0314 02        DM03      LR    A,QU         GET ENTRY CODE NUMBER
02CC 0315 2A 07 96            DCI   ETBL-1       LOOK UP FOR ISAR POINTER
02CD 0318 8E                  ADC
02CE 0319 16                  LM
02CF 031A 90 74               BR    DM07         GO TO DM07
02D0 031C 67        DM20      LISU  7            LOC OF DISP STATUS TIMER
02D1 031D 6F                  LISL  7
02D2 031E 70                  CLR                CLEAR ACC
02D3 031F CC                  AS    S            FETCH DISP STATUS TIMER
02D4 0320 94 08               BNZ   DM21         IF NOT 0, GO TO DM21
02D5 0322 6A                  LISL  2            LOC OF SECONDS
02D6 0323 4C                  LR    A,S          FETCH SECONDS
02D7 0324 21 01               NI    H'01'        MASK FOR ODD OR EVEN SEC CHECK
02D8 0326 94 51               BNZ   DM06         IF NOT EVEN, GO TO DM06
02D9 0328 6F                  LISL  7            LOC OF DISP STATUS TIMER
```

```
0200 0329 20 20        LI    H'20'    SET FOR 32 SECONDS
0201 032B 5C           LR    S,A      SET TIMER
02DC 032C 24 EF   DM21 AI    H'EF'    ADD COMPLEMENT OF 16
02DD 032E 92 49        BNC   DM06     IF 16 LESS, GO TO DM06
02DE 0330 01      DM05 LR    A,KL     EXAMINE STATUS
02DF 0331 21 01        NI    H'01'    MASK FOR SERVICE BIT
02E0 0333 01           LR    A,KL     EXAMINE STATUS
02E1 0334 66           LISU  6        SET ISAR FOR STATUS BYTES
02E2 0335 6C           LISL  4
02E3 0336 84 09        BZ    DM50     GO TO DM50 IF SERVICE BIT ZERO
02E4 0338 20 77        LI    H'77'
02E5 033A 5D           LR    I,A      LS BYTE NOW LL
02E6 033B 20 10        LI    H'10'
02E7 033D 5C           LR    S,A      MS BYTE NOW CA
02E8 033E 90 32        BR    DM22     GO TO DM22
02E9 0340 21 C0   DM50 NI    H'C0'    MASK FOR GO TO BYPASS/TURN OFF BYPASS
02EA 0342 01           LR    A,KL     EXAMINE STATUS
02EB 0343 84 09        BZ    DM10     GO TO DM10 IF GO TO/TURN OFF ZERO
02EC 0345 20 9B        LI    H'9B'
02ED 0347 5D           LR    I,A      LS BYTE NOW S-
02EE 0348 20 80        LI    H'80'
02EF 034A 5C           LR    S,A      MS BYTE NOW PA
02F0 034B 90 25        BR    DM22     GO TO DM22
02F1 034D 21 10   DM10 NI    H'10'    MASK FOR BYPASS BIT
02F2 034F 84 09        BZ    DM11     GO TO DM11 IF BYPASS BIT ZERO
02F3 0351 20 99        LI    H'99'
02F4 0353 5D           LR    I,A      LS BYTE NOW SS
02F5 0354 20 80        LI    H'80'
02F6 0356 5C           LR    S,A      MS BYTE NOW PA
02F7 0357 90 19        BR    DM22     GO TO DM22
02F8 0359 00      DM11 LR    A,KU     EXAMINE STATUS
02F9 035A 21 10        NI    H'10'    MASK FOR SALT BIT
02FA 035C 84 09        BZ    DM12     GO TO DM12 IF SALT BIT ZERO
02FB 035E 20 77        LI    H'77'
02FC 0360 5D           LR    I,A      LS BYTE NOW LL
02FD 0361 20 36        LI    H'36'
02FE 0363 5C           LR    S,A      MS BYTE NOW FI
02FF 0364 90 0C        BR    DM22     GO TO DM22
0300 0366 00      DM12 LR    A,KU     EXAMINE STATUS
0301 0367 21 01        NI    H'01'    MASK FOR REGN BIT
0302 0369 84 0B        BZ    DM04     IF NO STATUS, GO TO DM04
0303 036B 20 42        LI    H'42'
0304 036D 5D           LR    I,A      LS BYTE NOW GE
0305 036E 20 15        LI    H'15'
0306 0370 5C           LR    S,A      MS BYTE NOW CH
0307 0371 20 F5   DM22 LI    H'F5'    SET ISAR POINTER FOR STATUS
0308 0373 90 1B        BR    DM07     GO TO DM07
0309 0375 67      DM04 LISU  7        LOC OF DISP STATUS TIMER
030A 0376 6F           LISL  7
030B 0377 5C           LR    S,A      CLEAR TIMER
030C 0378 66      DM06 LISU  6        SET ISAR FOR STATUS BYTES
030D 0379 6C           LISL  4
030E 037A 00           LR    A,KU     EXAMINE STATUS
030F 037B 18           COM
0310 037C 91 07        BM    DM25     GO TO DM25 IF POR FLAG NOT SET
0311 037E 20 AA        LI    H'AA'
0312 0380 5D           LR    I,A      LS BYTE NOW 88
0313 0381 5C           LR    S,A      MS BYTE NOW 88
0314 0382 90 EE        BR    DM22     GO TO DM22
0315 0384 13      DM25 SL    1        ERROR FLAG SET ?
0316 0385 91 07        BM    DM15     GO TO DM15 IF NOT
0317 0387 20 22        LI    H'22'
0318 0389 5D           LR    I,A      LS BYTE NOW EE
0319 038A 5C           LR    S,A      MS BYTE NOW EE
031A 038B 90 E5        BR    DM22     GO TO DM22
031B 038D 20 11   DM15 LI    0'21'    SET ISAR FOR TIME OF DAY
031C 038F 1A      DM07 DI             DISABLE INTERRUPTS
031D 0390 50           LR    0,A      SAVE ISAR POINTER
031E 0391 A4           INS   4        INPUT DIGIT/KYBD PORT
031F 0392 14           SR    4
```

```
0320 0393 25 07        CI    H'07'   DIGIT 1 NEXT ?
0321 0395 94 03        BNZ   DM03    GO TO DM03 IF NOT
0322 0397 40           LR    A,0     GET SAVED ISAR POINTER
0323 0398 5A           LR    10,A    UPDATE ISAR POINTER
0324                *************************************************
0325                *
0326                *
0327                *             DATA ENTRY ROUTINE
0328                *
0329                *
032A                *
032B                *************************************************
032C                *
032D 0399 00    DM03   LR    A,KU    EXAMINE STATUS
032E 039A 21 05        NI    H'05'   REGEN OR AC LOSS FLAG SET ?
032F 039C 94 5B        BNZ   DE13    GO TO DE12 IF YES
0330 039E 00           LR    A,KU    EXAMINE STATUS
0331 039F 21 20        NI    H'20'   ENTRY MODE FLAG SET ?
0332 03A1 84 0D        BZ    DE01    GO TO DE01 IF NOT
0333 03A3 62           LISU  2               SET ISAR FOR TIME OF DAY MS BYTE
0334 03A4 69           LISL  1
0335 03A5 20 3F        LI    H'3F'   MASK OUT BITS 7 AND 6
0336 03A7 FC           NS    S       AND WITH ISAR BYTE
0337 03A8 5C           LR    S,A     RESTORE BYTE
0338 03A9 70           CLR
0339 03AA 67           LISU  7       EXAMINE SECONDS TIMER
033A 03AB 6B           LISL  3
033B 03AC CC           AS    S       TIMER EQUALS ZERO ?
033C 03AD 84 40        BZ    DE14    GO TO DE03 IF YES
033D 03AF 67    DE01   LISU  7       EXAMINE EXT TIME BASE COUNTER
033E 03B0 68           LISL  0
033F 03B1 4C           LR    A,S
0340 03B2 25 16        CI    22      TIMER EQUALS 22 ?
0341 03B4 84 46        BZ    DE04    GO TO DE04 IF YES
0342 03B6 25 32        CI    50      TIMER EQUALS 50 ?
0343 03B8 94 3F        BNZ   DE13    GO TO DE13 IF NOT
0344 03BA 03    DE02   LR    A,QL    EXAMINE KEYBOARD STATUS
0345 03BB 25 90        CI    H'90'   VALID AND ENTER/RECALL FLAGS SET ?
0346 03BD 94 3D        BNZ   DE04    GO TO DE04 IF NOT
0347 03BF 00           LR    A,KU    EXAMINE STATUS
0348 03C0 21 20        NI    H'20'   ENTRY MODE FLAG SET ?
0349 03C2 70           CLR
034A 03C3 94 03        BNZ   DE03    GO TO DE03 IF YES
034B 03C5 06           LR    QU,A    CLEAR ENTRY CODE COUNTER
034C 03C6 00           LR    A,KU    EXAMINE STATUS
034D 03C7 21 80        NI    H'80'   KEEP PUR FLAG
034E 03C9 22 20        OI    H'20'   SET ENTRY MODE FLAG
034F 03CB 04           LR    KU,A    RESTORE STATUS
0350 03CC 00    DE03   LR    A,KU    GET STATUS
0351 03CD 23 02        XI    H'02'   TOGGLE ENTRY CODE FLAG
0352 03CF 04           LR    KU,A    RESTORE STATUS
0353 03D0 21 02        NI    H'02'   ENTRY CODE FLAG SET ?
0354 03D2 84 23        BZ    DE20    GO TO DE09 IF NOT
0355 03D4 02           LR    A,QU    EXAMINE ENTRY CODE COUNT
0356 03D5 25 18        CI    H'18'   COUNT EQUALS 19 ?
0357 03D7 84 62        BZ    DE03    GO TO DE03 IF YES
0358 03D9 24 F0        AI    H'F0'   ADD H'F0' TO COUNT
0359 03DB 92 14        BNC   DC20    GO TO DE20 IF COUNT NOT > 9
035A 03DD 4A           LR    A,10    EXAMINE ISAR POINTER
035B 03DE 22 01        OI    H'01'   MAKE ISAR ODD
035C 03E0 0B    DE18   LR    IS,A    SET ISAR FOR REGEN TIME BYTE
035D 03E1 70           CLR           GET BYTE
035E 03E2 CC           AS    S
035F 03E3 94 0C        BNZ   DE20    GO TO DE20 IF BYTE NON-ZERO
0360 03E5 70    DE19   CLR           CLEAR BYTE
0361 03E6 5C           LR    S,A
0362 03E7 0A           LR    A,IS    GET ISAR
0363 03E8 1F           INC
0364 03E9 0B           LR    IS,A
0365 03EA 24 CC        AI    H'CC'   ADD H'CC' TO ISAR
```

```
03EC 92 F8              BNC   DE19         GO TO DE19 IF ISAR < 0'66'
03EE 90 4B       DE14   BR    DE08         GO TO DE08
03F0 61          DE20   LISU  1            SET ISAR FOR ENTRY CODE COUNTER
03F1 6E                 LISL  6
03F2 20 67              LI    H'67'        INCREMENT BCD
03F4 DC                 ASD   S
03F5 5C                 LR    S,A          RESTORE ENTRY CODE COUNTER
03F6 90 47              BR    DE09         GO TO DE09
03F8 29 04 DF    DE13   JMP   DE12         GO TO DE12
03FB 00          DE04   LR    A,KU         EXAMINE STATUS
03FC 21 22              NI    H'22'        MASK FOR EM AND EC FLAGS
03FE 25 20              CI    H'20'        EM SET AND EC RESET ?
0400 94 49              BNZ   DE31         GO TO DE12 IF NOT
0402 02                 LR    A,QU         EXAMINE ENTRY CODE COUNTER
0403 25 05              CI    H'05'        EC 05 ?
0405 84 44              BZ    DE31         GO TO DE12 IF YES
0407 25 06              CI    H'06'        EC 06 ?
0409 84 40              BZ    DE31         GO TO DE12 IF YES
040B 03                 LR    A,QL         EXAMINE KEYBOARD STATUS
040C 25 88              CI    H'88'        SLEW 4 KEY ?
040E 94 06              BNZ   DE05         GO TO DE05 IF NOT
0410 4A                 LR    A,10         EXAMINE ISAR POINTER
0411 22 01              OI    H'01'        MAKE ISAR ODD
0413 90 39              BR    DE10         GO TO DE10
0415 25 84       DE05   CI    H'84'        SLEW 3 KEY?
0417 94 06              BNZ   DE06         GO TO DE06 IF NOT
0419 4A                 LR    A,10         EXAMINE ISAR POINTER
041A 22 01              OI    H'01'        MAKE ISAR ODD
041C 90 6A              BR    DE11         GO TO DE11
041E 25 82       DE06   CI    H'82'        SLEW 2 KEY?
0420 94 06              BNZ   DE07         GO TO DE07 IF NOT
0422 4A                 LR    A,10         EXAMINE ISAR POINTER
0423 21 FE              NI    H'FE'        MAKE ISAR EVEN
0425 90 27              BR    DE10         GO TO DE10
0427 25 81       DE07   CI    H'81'        SLEW 1 KEY?
0429 94 20              BNZ   DE31         GO TO DE12 IF NOT
042B 4A                 LR    A,10         EXAMINE ISAR POINTER
042C 21 FE              NI    H'FE'        MAKE ISAR EVEN
042E 90 58              BR    DE11         GO TO DE11
0430 02          DE30   LR    A,QU         EXAMINE EC COUNT
0431 24 F9              AI    H'F9'        ADD H'F9' TO COUNT
0433 92 0A              BNC   DE09         GO TO DE09 IF COUNT < 7
0435 00                 LR    A,KU         EXAMINE STATUS
0436 21 7F              NI    H'7F'        RESET FOR FLAG
0438 90 04              BR    DE09-1       GO TO DE09-1
043A 00          DE08   LR    A,KU         EXAMINE STATUS
043B 21 80              NI    H'80'        RESET STATUS - SAVE FOR FLAG
043D 04                 LR    KU,A         RESTORE STATUS
043E 70          DE09   CLR
043F 67                 LISU  7
0440 6C                 LISL  4            SET ISAR FOR MINUTES COUNTER
0441 5E                 LR    D,A          CLEAR MINUTES COUNT
0442 20 78              LI    120
0444 5C                 LR    S,A          SET SECONDS COUNT FOR 2 MINUTES
0445 07                 LR    QL,A         CLEAR KEYBOARD STATUS
0446 44                 LR    A,4          RESET KEYBOARD FILTER COUNTER
0447 22 0B              OI    H'0B'
0449 54                 LR    4,A
044A 29 04 DF    DE31   JMP   DE12         GO TO DE12
044D 0B          DE10   LR    IS,A         SET ISAR FOR POINTER
044E 20 10              LI    H'10'        INCREMENT MS NIBBLE
0450 CC                 AS    S            ADD SCRATCHPAD TO ACC
0451 5B                 LR    11,A         SAVE INCREMENTED RESULT
0452 0A                 LR    A,IS         EXAMINE ISAR
0453 25 10              CI    H'20'        TIME OF DAY MINUTES ?
0455 84 05              BZ    DE21         GO TO DE21 IF YES
0457 25 12              CI    H'22'        TIME OF PIGEN MINUTES ?
0459 94 07              BNZ   DE22         GO TO DE22 IF NOT
045B 4B          DE21   LR    A,11         GET INCREMENTED RESULT
045C 24 A0              AI    H'A0'        ADD H'A0'
```

```
0CAC 045E 92 02              BNC  DE22      GO TO DE22 IF MS NIBBLE NOT > 5
0CAD 0460 5B                 LR   11,A      MS NIBBLE NOW ZERO
03AE 0461 0A         DE22    LR   A,IS      EXAMINE ISAR
0CAF 0462 25 11              CI   O'21'     TIME OF DAY HRS ?
0CB0 0464 84 D9              BZ   DE09      GO TO DE09 IF YES
0CB1 0466 25 13              CI   O'23'     TIME OF REGEN HRS ?
0CB2 0468 84 D5              BZ   DE09      GO TO DE09 IF YES
0CB3 046A 02                 LR   A,QU      EXAMINE EC COUNTER
0CB4 046B 25 03              CI   H'03'     EC03 ?
0CB5 046D 84 05              BZ   DE23      GO TO DE23 IF YES
0CB6 046F 25 04              CI   H'04'     EC04 ?
0CB7 0471 94 07              BNZ  DE24      GO TO DE24 IF NOT
0CB8 0473 4B         DE23    LR   A,11      GET INCREMENTED RESULT
0CB9 0474 24 C0              AI   H'C0'     ADD H'C0'
0CBA 0476 92 02              BNC  DE24      GO TO DE24 IF MS NIBBLE NOT > 3
0CBB 0478 5B                 LR   11,A      MS NIBBLE NOW ZERO
0CBC 0479 02         DE24    LR   A,QU      EXAMINE EC COUNTER
0CBD 047A 24 F7              AI   H'F7'     ADD H'F7' TO COUNT
0CBE 047C 82 06              BC   DE15      GO TO DE15 IF COUNT > 8
0CBF 047E 4B                 LR   A,11      GET INCREMENTED RESULT
0CC0 047F 24 60              AI   H'60'     ADD H'60' TO RESULT
0CC1 0481 82 02              BC   DE16      GO TO DE16 IF MS NIBBLE WAS H'A'
0CC2 0483 4B         DE15    LR   A,11      GET INCREMENTED RESULT
0CC3 0484 5C         DE16    LR   S,A       RESTORE BYTE
0CC4 0485 90 AA              BR   DE60      GO TO DE60
0CC5 0487 0B         DE11    LR   IS,A      SET ISAR FOR POINTER
0CC6 0488 25 11              CI   O'21'     MS TIME OF DAY ?
0CC7 048A 84 05              BZ   DE40      GO TO DE40 IF YES
0CC8 048C 25 13              CI   O'23'     MS TIME OF REGEN ?
0CC9 048E 94 1C              BNZ  DE50      GO TO DE50 IF NOT
0CCA 0490 20 67     DE40     LI   H'67'     INCREMENT BCD
0CCB 0492 DC                 ASD  S
0CCC 0493 5C                 LR   S,A       RESTORE BYTE
0CCD 0494 21 1F              NI   H'1F'     MASK FOR DIGIT BITS
0CCE 0496 25 12              CI   H'12'     12 O'CLOCK ?
0CCF 0498 94 06              BNZ  DE41      GO TO DE41 IF NOT
0CD0 049A 20 20              LI   H'20'
0CD1 049C EC                 XS   S         TOGGLE PM BIT
0CD2 049D 90 0A              BR   DE42      GO TO DE42
0CD3 049F 25 13     DE41     CI   H'13'     13 O'CLOCK ?
0CD4 04A1 94 07              BNZ  DE43      GO TO DE43 IF NOT
0CD5 04A3 20 20              LI   H'20'     MASK FOR PM BIT
0CD6 04A5 FC                 NS   S         AND WITH BYTE
0CD7 04A6 22 01              OI   H'01'     SET FOR 1 O'CLOCK
0CD8 04A8 5C         DE42    LR   S,A       RESTORE BYTE
0CD9 04A9 90 94     DE43     BR   DE09      GO TO DE09
0CDA 04AB 71         DE50    LIS  1         INCREMENT LS NIBBLE
0CDB 04AC CC                 AS   S         ADD SCRATCHPAD TO ACC
0CDC 04AD 21 0F              NI   H'0F'     MASK FOR LS NIBBLE
0CDD 04AF 5B                 LR   11,A      SAVE INCREMENTED MASKED RESULT
0CDE 04B0 02         DE26    LR   A,QU      EXAMINE EC COUNTER
0CDF 04B1 25 03              CI   H'03'     EC03 ?
0CE0 04B3 84 06              BZ   DE27      GO TO DE27 IF YES
0CE1 04B5 0A                 LR   A,IS      EXAMINE ISAR
0CE2 04B6 25 17              CI   O'27'     O'27' ?
0CE3 04B8 94 07              BNZ  DE28      GO TO DE28 IF NOT
0CE4 04BA 4B         DE27    LR   A,11      GET INCREMENTED RESULT
0CE5 04BB 24 FC              AI   H'FC'     ADD H'FC'
0CE6 04BD 92 02              BNC  DE28      GO TO DE28 IF LS NIBBLE NOT > 3
0CE7 04BF 5B                 LR   11,A      LS NIBBLE NOW ZERO
0CE8 04C0 0A         DE28    LR   A,IS      EXAMINE ISAR
0CE9 04C1 25 16              CI   O'26'     O'26' ?
0CEA 04C3 94 08              BNZ  DE29      GO TO DE29 IF NOT
0CEB 04C5 4B                 LR   A,11      GET INCREMENTED RESULT
0CEC 04C6 24 F8              AI   H'F8'     ADD H'F8'
0CED 04C8 92 03              BNC  DE29      GO TO DE29 IF LS NIBBLE NOT > 7
0CEE 04CA 71                 LIS  1         JAM ONE INTO ACC
0CEF 04CB 5B                 LR   11,A      LS NIBBLE NOW ONE
0CF0 04CC 02         DE29    LR   A,QU      EXAMINE EC COUNTER
0CF1 04CD 24 F7              AI   H'F7'     ADD H'F7' TO COUNT
```

```
04F2 04CF 82 07              BC    DE17       GO TO DE17 IF COUNT > 8
04F3 04D1 4B                 LR    A,11       GET INCREMENTED MASKED RESULT
04F4 04D2 24 F6              AI    H'F6'      ADD H'F6' TO INCREMENTED MASKED RESUL
04F5 04D4 92 02              BNC   DE17       GO TO DE17 IF LS NIBBLE WAS NOT H'A'
04F6 04D6 5B                 LR    11,A       RESULT WAS H'A' - SET R11 TO ZERO
04F7 04D7 4C    DE17         LR    A,S        GET SCRATCHPAD
04F8 04D8 21 F0              NI    H'F0'      MASK FOR MS NIBBLE
04F9 04DA CB                 AS    11         ADD INCREMENTED MASKED LS NIBBLE
04FA 04DB 5C                 LR    S,A        TO MASKED MS NIBBLE AND RESTORE BYTE
04FB 04DC 29 04 30           JMP   DE60       GO TO DE60
04FC 04DF 1B    DE12         EI               ENABLE INTERRUPTS
03FD                    *
03FE                    *
03FF                    ************************************************
0400                    *
0401                    *    CHECKSUM ROUTINE
0402                    *
0403                    *    DURWOOD FLETCHER
0404                    *
0405                    *    30 AUGUST 1977
0406                    *
0407                    *    CHECKSUM IS CALCULATED IF ENTRY MODE FLAG IS
0408                    *    NOT SET. ROUTINE IS BYPASSED IF ENTRY MODE
0409                    *    FLAG IS SET. IF CHECKSUM (SCRATCHPAD 0'41')
040A                    *    IS H'FF' WHEN ROUTINE IS ENTERED, THEN CORRECT
040B                    *    CHECKSUM WILL BE CALCULATED AND WILL REPLACE
040C                    *    H'FF' VALUE. IF CALCULATED CHECKSUM DOES NOT
040D                    *    EQUAL H'FF', THEN ERROR FLAG WILL BE SET.
040E                    *    IF CALCULATED CHECKSUM EQUALS H'FF', THEN ERROR
040F                    *    FLAG WILL BE RESET.
0410                    *
0411                    *    SCRATCHPAD 11 IS USED FOR THE CALCULATION OF
0412                    *    THE CHECKSUM BY THE ROUTINE.
0413                    *
0414                    ************************************************
0415                    *
0416                    *
0417 04E0 00    CS00         LR    A,KU       EXAMINE STATUS
0418 04E1 21 20              NI    H'20'      MASK FOR ENTRY MODE BIT
0419 04E2 94 24              BNZ   CS05       GO TO CS05 IF ENTRY MODE SET
041A 04E5 63    CS01         LISU  3          SET ISAR FOR START OF CHECKSUM
041B 04E6 6C                 LISL  4
041C 04E7 5B                 LR    11,A       CLEAR TEMP CHECKSUM
041D 04E8 4B    CS02         LR    A,11       GET TEMP CHECKSUM
041E 04E9 EC                 XS    S          EXCLUSIVE OR WITH SCRATCHPAD
041F 04EA 5B                 LR    11,A       SAVE RESULT
0420 04EB 0A                 LR    A,IS       EXAMINE ISAR
0421 04EC 1F                 INC              INCREMENT ISAR
0422 04ED 0B                 LR    IS,A       RESTORE ISAR
0423 04EE 25 64              CI    H'64'      END OF CHECKSUM ?
0424 04F0 94 F7              BNZ   CS02       GO TO CS02 IF NOT FINISHED
0425 04F2 4B                 LR    A,11       GET TEMP CHECKSUM
0426 04F3 18                 COM              TEMP CHECKSUM EQUALS H'FF'?
0427 04F4 84 09              BZ    CS03       GO TO CS03 IF YES
0428 04F6 64                 LISU  4          SET ISAR FOR CHECKSUM
0429 04F7 69                 LISL  1
042A 04F8 4C                 LR    A,S        GET CHECKSUM
042B 04F9 18                 COM              TEMP CHECKSUM EQUALS H'FF'?
042C 04FA 94 09              BNZ   CS04       GO TO CS04 IF NOT
042D 04FC 4B                 LR    A,11
042E 04FD 5C                 LR    S,A        REPLACE OLD CHECKSUM WITH NEW ONE
042F 04FE 00    CS03         LR    A,KU       GET STATUS
0430 04FF 21 BF              NI    H'BF'      RESET ERROR FLAG
0431 0501 04                 LR    KU,A       RESTORE STATUS
0432 0502 90 05              BR    CS05       GO TO CS05
0433 0504 00    CS04         LR    A,KU       GET STATUS
0434 0505 22 40              OI    H'40'      SET ERROR FLAG
0435 0507 04                 LR    KU,A       RESTORE STATUS
0436                    *
0437                    ************************************************
```

```
0438                    *
0439                    *
043A                    *             GO TO REGEN DETERMINATION
043B                    *
043C                    *
043D                    ************************************************
043E                    *
043F                    * SKIP THIS ROUTINE IF IN BYPASS, REGENERATION,
0440                    * DATA ENTRY MODE, OR LOCKED OUT
0441                    *
0442 0508 00       CS05 LR    A,KU      EXAMINE STATUS
0443 0509 21 21         NI    H'21'     MASK FOR REGN OR ENTRY MODE
0444 050B 94 06         BNZ   JTOG      IF SET, BR TO JUMP TO ON GOING
0445 050D 01            LR    A,KL      LOAD 2ND STATUS BYTE IN ACC
0446 050E 21 30         NI    H'30'     MASK FOR BYPASS OR LOCKED OUT
0447 0510 84 04         BZ    TGCE      IF NOT SET, GO TEST GAL CAP EXCEEDED
0448 0512 29 06 0D JTOG JMP   ONGO      SKIP AND JUMP TO ON GOING
0449                    *
044A                    * THE FOLLOWING SETS THE 'GO TO REGEN' STATUS BIT IF THE
044B                    * TOTAL GALLON CAPACITY HAS BEEN EXCEEDED.
044C                    *
044D 0515 63       TGCE LISU  3         LOCATION OF TOTAL GAL CAP MSD
044E 0516 6D            LISL  5
044F 0517 4C            LR    A,S       LOAD 2 MSD OF TOTAL GAL CAP IN ACC
0450 0518 18            COM             COMPLEMENT FOR SUBTRACTION
0451 0519 66            LISU  6         LOC OF GAL SINCE REGN MSD
0452 051A 6F            LISL  7
0453 051B CC            AS    S         SUBTRACT GAL CAP MSD FROM GAL COUNT
0454 051C 82 14         BC    GTR1      IF CAP < COUNT GO SET GO TO REGN BIT
0455 051E 1F            INC             ADD 1 TO COMPLETE NEGATION
0456 051F 94 0A         BNZ   MANR      IF NOT EQUAL, BR TO MAN REGN TEST
0457 0521 63       GLSD LISU  3         LOC OF TOTAL GAL CAP LSD
0458 0522 6C            LISL  4
0459 0523 4C            LR    A,S       LOAD 2 LSD OF TOTAL GAL CAP IN ACC
045A 0524 18            COM             COMPLEMENT FOR SUBTRACTION
045B 0525 66            LISU  6         LOC OF GAL SINCE REGN LSD
045C 0526 6E            LISL  6
045D 0527 CC            AS    S         SUBTRACT GAL CAP LSD FROM GAL COUNT
045E 0528 82 03         BC    GTR1      IF CAP , COUNT GO SET GO TO REGN BIT
045F                    *
0460                    * SET THE 'GO TO REGEN' BIT IF THE MANUAL REGENERATION
0461                    * BUTTON IS PRESSED WHILE OUT OF ENTRY MODE
0462                    *
0463 052A 03       MANR LR    A,QL      LOAD KEYBOARD STATUS IN ACC
0464 052B 21 B0         NI    H'B0'     MASK FOR MAN REGN & VALID BITS
0465 052D 23 A0         XI    H'A0'     COMPARE FOR BITS
0466 052F 94 04         BNZ   DVDM      NO COMPARE, BR TO DET DAY OR VOL
0467 0531 29 06 09 GTR1 JMP   SGTR      JUMP TO SET 'GO TO REGEN' FLAG
0468                    *
0469                    * DETERMINATION IF IN VOLUMN MODE OR IN DAY MODE
046A                    *
046B 0534 63       DVDM LISU  3         LOC OF 24 HR GALLON CAPACITY
046C 0535 6E            LISL  6
046D 0536 4D            LR    A,I       FETCH 24 HR GAL CAP 2 LSD
046E 0537 CC            AS    S         ADD IN 2 MSD
046F 0538 84 04         BZ    DAYM      IF 0, BR TO DAY MODE
0470 053A 29 05 D6      JMP   VOLM      IF AN 24 HR GAL CAP, GO TO VOL MODE
0471                    *
0472                    *                DAY MODE
0473                    *
0474                    * DETERMINATION IF 12 HR TIME IF IS GREATER THAN, LESS
0475                    * THAN, OR EQUAL TO REGENERATION TIME.
0476                    *
0477 053D 62       DAYM LISU  2         LOC OF REGN HR
0478 053E 6B            LISL  3
0479 053F 4C            LR    A,S       LOAD REGN HR IN ACC
047A 0540 21 1F         NI    H'1F'     REMOVE AM-PM BIT
047B 0542 25 12         CI    H'12'     COMPARE FOR 12TH HR
047C 0544 94 02         BNZ   STHR      IF NOT 12TH HR BR TO STORE HR
047D 0546 70            CLR             IF 12TH HR, SET TO ZERO
```

```
047E 0547 1F            STHR    INC                 INSURE NON-ZERO
047F 0548 50                    LR      0,A         STORE ADJUSTED REGN HR IN REG 0
0480 0549 1A                    DI                  DISABLE INTRPTS FOR TIME OF DAY CHECK
0481 054A 69                    LISL    1           LOC OF TIME OF DAY HR
0482 054B 4D                    LR      A,I         LOAD TOD HR IN ACC
0483 054C 21 1F                 NI      H'1F'       REMOVE AM-PM BIT
0484 054E 25 12                 CI      H'12'       COMPARE FOR 12TH HR
0485 0550 94 02                 BNZ     NEGH        IF NOT 12TH HR, BR TO NEGATE HR
0486 0552 70                    CLR                 IF 12TH HR, SET TO ZERO
0487 0553 18            NEGH    COM                 COMPLEMENT
0488 0554 C0                    AS      0           SUBTRACT TOD HR FROM REGN HR
0489 0555 84 05                 BZ      CHKM        IF 0, GO CHECK MINUTES
048A 0557 82 12                 BC      SLTF        IF CARRY, BR TO SET LESS TIME FLAG
048B 0559 90 0C                 BR      SGTF        BR TO SET GREATER TIME FLAG
048C 055B 4C            CHKM    LR      A,S         LOAD REGN MIN IN ACC
048D 055C 1F                    INC                 INSURE NON-ZERO
048E 055D 50                    LR      0,A         STORE ADJ REGN MIN IN R 0
048F 055E 68                    LISL    0           LOC OF TOD MIN
0490 055F 4C                    LR      A,S         LOAD TOD MIN TO CHECK MINUTES
0491 0560 18                    COM                 COMPLEMENT
0492 0561 C0                    AS      0           SUBTRACT TOD MIN FROM REGN MIN
0493 0562 84 09                 BZ      STCF        IF 0, BR TO STORE TIME COMPARE FLAG
0494 0564 82 05                 BC      SLTF        IF CARRY, BR TO SET
0495 0566 20 C0        SGTF     LI      H'C0'       SET GREATER TOD FLAG
0496 0568 90 03                 BR      STCF        BR TO STORE TIME COMPARE FLAG
0497 056A 20 80        SLTF     LI      H'80'       SET LESSER TOD FLAG
0498 056C 51           STCF     LR      1,A         STORE TIME COMPARE FLAG IN REG 1
0499 056D 1B                    EI                  ENABLE INTERRUPTS
049A
049B                    * DETERMINATION OF TODAY AND TOMMRROW IN ORDER TO FETCH
049C                    * DATA FROM REGEN SCHEDULE
049D                    *
049E 056E 73                    LIS     3           SET UP LOOP COUNTER
049F 056F 53                    LR      3,A         LOAD LOOP COUNT IN REG 3
04A0 0570 33            TOTD    DS      3           DECREMENT LOOP COUNT
04A1 0571 6E                    LISL    6           LOC OF TODAY
04A2 0572 4E                    LR      A,D         LOAD TODAY IN ACC
04A3 0573 94 02                 BNZ     ISDC        IF LOOP COUNT = 0, SET TOMORROW COUNT
04A4 0575 1F                    INC                 ADD 1 TO DAY COUNT
04A5 0576 15            ISDC    SL      4           ISOLATE DAY COUNT
04A6 0577 13                    SL      1           FIRST DAY CHECK (MON OR TUES)
04A7 0578 91 0C                 BM      CTTS        BR TO CHECK FOR THUR TO SUN
04A8 057A 13                    SL      1           2ND DAY CHECK (M OR TU)
04A9 057B 81 1C                 BP      LODD        ISAR AT DAY, BR TO LOAD ODD DAY
04AA 057D 13                    SL      1           3RD DAY CHECK (TUE OR WED)
04AB 057E 91 03                 BM      DAD3        BR TO DAY ADDRESS 3
04AC 0580 90 1A                 BR      LEVE        ISAR AT DAY 2, BR TO LOAD EVEN DAY
04AD 0582 6C            DAD3    LISL    4           DAY ADDRESS 3
04AE 0583 90 14                 BR      LODD        BR TO LOAD ODD DAY
04AF 0585 13            CTTS    SL      1           4TH DAY CHECK (TF OR SS)
04B0 0586 91 0A                 BM      CSOS        BR TO SAT OR SUN CHECK
04B1 0588 13                    SL      1           5TH DAY CHECK (THUR OR FRI)
04B2 0589 91 04                 BM      DAD5        BR TO DAY ADDRESS 5
04B3 058B 6C                    LISL    4           DAY ADDRESS 4
04B4 058C 90 0E                 BR      LEVE        BR TO LOAD EVEN DAY
04B5 058E 6F            DAD5    LISL    7           DAY ADDRESS 5
04B6 058F 90 08                 BR      LODD        BR TO LOAD ODD DAY
04B7 0591 13            CSOS    SL      1           6TH DAY CHECK (SAT OR SUN)
04B8 0592 91 04                 BM      DAD7        BR TO DAY ADDRESS 7
04B9 0594 6F                    LISL    7           DAY ADDRESS 6
04BA 0595 90 05                 BR      LEVE        BR TO LOAD EVEN DAY
04BB 0597 6E            DAD7    LISL    6           DAY ADDRESS 7
04BC 0598 4C            LODD    LR      A,S         LOAD ODD DAY REGN SCHEDULE DATA IN A
04BD 0599 90 03                 BR      TTBC        BR TO TODAY OR TOMORROW BRANCH CHECK
04BE 059B 4C            LEVE    LR      A,S         LOAD EVEN DAY REGN SCHEDULE DATA IN A
04BF 059C 15                    SL      4           ISOLATE EVEN DAY DATA
04C0 059D 33            TTBC    DS      3           DEC LOOP COUNTER
04C1 059E 92 2A                 BNC     TOMC        IF WAS 0, BR TO TOMORROW CHECK
04C2                    *
04C3                    * COMPARE REGEN SCHEDULE DATA TO TIME FLAGS FOR SETTING
```

```
04C4                * 'GO TO REGEN BIT' OR REGEN IMMINENT
04C5                *
04C6  05A0 50         LR    0,A       STORE REGN SCH DATA IN REG 0
04C7  05A1 69         LISL  1         LOC OF TOD HR
04C8  05A2 4C         LR    A,S       LOAD TOD HR IN ACC
04C9  05A3 21 20      NI    H'20'     MASK FOR AM-PM BIT
04CA  05A5 94 03      BNZ   SPMC      IF PM, BR TO SCH PM CHECK
04CB  05A7 40         LR    A,0       RECALL STORED REGN SCH DATA FROM R 0
04CC  05A8 21 10      NI    H'10'     MASK FOR AM REGN SCH
04CD  05AA 84 13      BZ    AFTN      IF NO AM SCH'D, BR TO AFTERNOON TEST
04CE  05AC 90 0A      BR    TEQU      AM SCH'D, BR TO TIME EQUAL CHECK
04CF  05AE 41    SPMC LR    A,1       LOAD TIME COMPARE FLAGS IN ACC
04D0  05AF 13         SL    1         ISOLATE GREATER TOD FLAG
04D1  05B0 94 BF      BNZ   TOTD      > PM TIME, BR TO TOMORROW DETERMINE
04D2  05B2 40         LR    A,0       RECALL STORED REGN SCH DATA FROM R 0
04D3  05B3 21 20      NI    H'20'     MASK FOR PM REGN SCH
04D4  05B5 84 57      BZ    ONGO      NO PM SCH'D, BR TO ON GOING
04D5  05B7 70    TEQU CLR             CLEAR ACC
04D6  05B8 C1         AS    1         LOAD TIME COMPARE FLAGS IN ACC
04D7  05B9 84 4F      BZ    SGTR      SAME TIME, BR TO SET GO TO REGN BIT
04D8  05BB 13         SL    1         ISOLATE UNEQUAL BIT
04D9  05BC 84 10      BZ    SRIM      LESS TIME, BR TO SET REGN IMMINENT
04DA  05BE 40    AFTN LR    A,0       RECALL STORED REGN SCH DATA FROM R 0
04DB  05BF 21 20      NI    H'20'     MASK FOR PM REGN SCH
04DC  05C1 84 4B      BZ    ONGO      NO PM SCH'D, BR TO ON GOING
04DD  05C3 41         LR    A,1       LOAD TIME COMPARE FLAGS IN ACC
04DE  05C4 13         SL    1         ISOLATE GREATER TOD FLAG
04DF  05C5 84 47      BZ    ONGO      IF NOT GREATER TOD, BR TO ON GOING
04E0  05C7 90 05      BR    SRIM      BR TO SET REGN IMMINENT
04E1                *
04E2                * COMPARE IF WITHIN 12 HRS OF A SCHEDULED REGEN TOMORROW
04E3                *
04E4  05C9 21 10 TOMC NI    H'10'     MASK FOR SCH AM
04E5  05CB 84 41      BZ    ONGO      IF NOT AM, BR TO ON GOING
04E6  05CD 62    SRIM LISU  2         LOC OF TOD HR
04E7  05CE 69         LISL  1
04E8  05CF 1A         DI              DISABLE INTERRUPTS TO FREEZE TIME
04E9  05D0 4C         LR    A,S       LOAD TOD HR IN ACC
04EA  05D1 22 80      OI    H'80'     SET REGN IM BIT
04EB  05D3 5C         LR    S,A       RESTORE TOD HR
04EC  05D4 90 38      BR    ONGO      BR TO ON GOING
04ED                *
04EE                *                 VOLUME MODE
04EF                *
04F0                *
04F1                * THE GALLONS SINCE LAST REGENERATION IS COMPARED TO THE
04F2                * WITHIN THE 24 HR GALLON CAPACITY
04F3                *
04F4  05D6 66    VOLM LISU  6         LOC OF GAL SINCE REGN MSD
04F5  05D7 6F         LISL  7
04F6  05D8 4C         LR    A,S       LOAD GAL CNT MSD IN ACC
04F7  05D9 24 66      AI    H'66'     SET UP FOR DEC ADD
04F8  05DB 63         LISU  3         LOC OF 24 HR GAL CAP MSD
04F9  05DC DC         ASD   S         DEC ADD
04FA  05DD 82 1A      BC    VSRI      > 99, BR TO VOL SET REGN IM
04FB  05DF 18         COM   A         +1 NEGATE
04FC  05E0 50         LR    0,A       STORE IN REG 0
04FD  05E1 6D         LISL  5         LOC OF TOT GAL MSD
04FE  05E2 4E         LR    A,D       LOAD TOT GAL MSD IN ACC
04FF  05E3 1F         INC   A         NONZERO
0500  05E4 C0         AS    0         SUBTRACT MSD SUM
0501  05E5 92 12      BNC   VSRI      SUM MSD > TOT MSD, BR TO VOL SET IM
0502  05E7 94 25      BNZ   ONGO      SUM MSD < TOT MSD, BR TO ON GOING
0503  05E9 4C         LR    A,S       LOAD TOT GAL LSD IN ACC
0504  05EA 1F         INC   A         NONZERO
0505  05EB 50         LR    0,A       STORE IN REG 0
0506  05EC 6E         LISL  6         LOC OF 24 HR GAL CAP LSD
0507  05ED 4C         LR    A,S       LOAD 24 HR GAL CAP IN ACC
0508  05EE 24 66      AI    H'66'     SET UP FOR DEC ADD
0509  05F0 66         LISU  6         LOC OF GAL SINCE LSD
```

```
050A 05F1 DC            ASD   S         DEC ADD
050B 05F2 82 05         BC    VSRI      > 99, BR TO VOL SET REGN IM
050C 05F4 18            COM   A         +1 NEGATE
050D 05F5 C0            AS    0         SUBTRACT LSD SUM
050E 05F6 82 16         BC    ONGO      LSD SUM NOT > TOT LSD, BR TO ON GOING
050F                  *
0510                  * WITHIN 24 HR GALLON CAPACITY, SET REGEN IMMINENT
0511                  *
0512 05F8 62     VSRI   LISU  2         LOC OF TOD HR
0513 05F9 69            LISL  1
0514 05FA 1A            DI              DISABLE INTERRUPTS TO FREEZE TIME
0515 05FB 4C            LR    A, S      LOAD TOD HR IN ACC
0516 05FC 22 80         OI    H'80'     SET REGN IM BIT
0517 05FE 5C            LR    S, A      RESTORE TOD HR
0518                  *
0519                  * TIME FOR VOLUME MODE REGENERATION
051A                  *
051B 05FF 6B            LISL  3         LOC OF REGN HR
051C 0600 EE            XS    D         COMPARE TOD HR TO REGN HR
051D 0601 13            SL    1         REMOVE REGN IM BIT
051E 0602 94 0A         BNZ   ONGO      IF NOT SAME, BR TO ON GOING
051F 0604 4C            LR    A, S      LOAD REGN MIN IN ACC
0520 0605 69            LISL  0         LOC OF TOD MIN
0521 0606 EC            XS    S         COMPARE TOD MIN TO REGN MIN
0522 0607 94 05         BNZ   ONGO      IF NOT SAME, BR TO ON GOING
0523                  *
0524                  * SET 'GO TO REGEN' SATUS BIT
0525                  *
0526 0609 00     SGTR   LR    A, KU     LOAD SATUS BYTE IN ACC
0527 060A 22 08         OI    H'08'     SET GO TO REGN BIT
0528 060C 04            LR    KU, A     RESTORE SATUS BYTE
0529 060D 1B     ONGO   EI              ENABLE INTRUPTS AND CONTINUE
052A                  *
052B                  ****************************************************
052C                  *
052D                  *
052E                  *                 ERROR ROUTINE
052F                  *
0530                  *
0531                  ****************************************************
0532                  * IF ERROR STATUS, THE STANDARD POR REGENERATION IS
0533                  * LOADED FROM ROM TO RAM
0534                  *
0535 060E 00     ERTN   LR    A, KU     LOAD STATUS IN ACC
0536 060F 13            SL    1         SHIFT ERROR BIT TO MSB
0537 0610 81 2C         BP    REGN      IF NO ERROR, BR TO REGENERATION
0538 0612 21 10         NI    H'10'     MASK FOR GTR BIT
0539 0614 94 06         BNZ   LROM      IF GTR BIT, BR TO LOAD ROM
053A 0616 67            LISU  7         LOC OF REGN SEC COUNTER
053B 0617 6B            LISL  3
053C 0618 CC            AS    S         FETCH REGN SECONDS
053D 0619 94 23         BNZ   REGN      IF NOT 0 SEC, BR TO REGN
053E 061B 62     LROM   LISU  2         LOC TO START LOAD INTO
053F 061C 6C            LISL  4
0540 061D 2A 07 D4      DCI   H'704'    ROM LOC OF FIRST DATA
0541 0620 16     LDLP   LM    A         LOAD ROM DATA IN ACC
0542 0621 5C     LDCS   LR    S, A      LOAD DATA INTO RAM
0543 0622 0A            LR    A, IS     LOAD ISAR IN ACC
0544 0623 1F            INC   A         INC ISAR
0545 0624 0B            LR    IS, A     RETURN INC ISAR
0546 0625 25 18         CI    H'18'     PAST REGN DAYS?
0547 0627 84 0B         BZ    LTGC      IF PAST DAYS, BR TO LD TOTAL GAL CAP
0548 0629 25 21         CI    H'21'     AT CHECKSUM?
0549 062B 84 0D         BZ    LRGN      IF AT CKSUM, BR TO LD REGN DATA
054A 062D 25 34         CI    H'34'     END OF LOADING?
054B 062F 84 0D         BZ    REGN      FINISHED LOADING, BR TO REGENERATION
054C 0631 90 EE         BR    LDLP      BR TO LOAD LOOP AND KEEP LOADING
054D 0632 6C     LTGC   LISL  4         RAM LOC OF TOTAL GAL CAP
054E 0634 2A 07 DC      DCI   H'7DC'    ROM LOC OF TOTAL GAL CAP
054F 0637 90 E8         BR    LDLP      CONTINUE LOAD LOOP
```

```
0550 0639 16        LRGN  LM    A         INC DC AND ISAR TO SKIP OVER CKSUM
0551 063A 70              CLR   A         ZERO ACC
0552 063B 90 E5           BR    LDCS      CONTINUE LOAD LOOP W/O CKSUM
0553                  *
0554                  ****************************************************
0555                  *
0556                  *
0557                  *              REGENERATION ROUTINE
0558                  *
0559                  *
055A                  ****************************************************
055B 063D 00        REGN  LR    A,KU      LOAD SYSTEM STATUS 1
055C 063E 21 20           NI    H'20'     ENTRY MODE =1 ?
055D 0640 94 5C           BNZ   XITA      YES, EXIT
055E 0642 01              LR    A,KL      LOAD SYSTEM STATUS 2
055F 0643 21 A0           NI    H'A0'     GO TO BYPASS, LOCKOUT = 1 ?
0560 0645 94 50           BNZ   REGE      BR IF NOT ZERO
0561 0647 00        REGC  LR    A,KU      RELOAD SYSTEM STATUS
0562 0648 21 0C           NI    H'0C'     SAVE GO TO REGEN & AC LOSS BITS
0563 064A 25 08           CI    H'08'     GO TO REGEN ONLY = 1 ?
0564 064C 94 1A           BNZ   REG1      BR IF NOT
0565 064E 71        GOTO  LIS   1         LOAD ONE
0566 064F 06              LR    QU,A      INTO R16 REGEN COUNTER
0567 0650 67              LISU  7         LOAD ISAR WITH 74
0568 0651 6C              LISL  4         R74 IS REGEN MINUTE CTR
0569 0652 73              LIS   3         LOAD 3
056A 0653 5E              LR    D,A       INTO MINUTE CTR R74 THEN DECREMENT
056B 0654 5C              LR    S,A       LOAD 3 INTO SEC CTR R73
056C 0655 00              LR    A,KU      LOAD SYSTEM STATUS
056D 0656 21 C0           NI    H'C0'     SAVE POR, BIT 6, RESET LOW SALT BIT
056E 0658 1F              INC   A         SET LSB REGEN BIT
056F 0659 04              LR    KU,A      RESTORE STATUS
0570 065A 20 FF           LI    H'FF'     CLEAR
0571 065C B0              OUTS  0         PORT 0 RESET REGEN IMMINENT
0572 065D 7B              LIS   H'B'      ZERO FLAG BIT & INIT
0573 065E 54              LR    4,A       R4 IWD FILTER CTR
0574 065F 1A              DI              DISABLE INTERRUPTS
0575 0660 62              LISU  2         LOAD ISAR WITH 21
0576 0661 69              LISL  1         R21 IS TIME OF DAY MSD
0577 0662 4C              LR    A,S       LOAD TIME OF DAY
0578 0663 13              SL    1         STRIP OFF REGEN IMMINENT BIT
0579 0664 12              SR    1         REPOSITION DATA
057A 0665 5C              LR    S,A       RESTORE DATA
057B 0666 1B              EI              ENABLE INTERRUPTS
057C 0667 00        REG1  LR    A,KU      LOAD SYSTEM STATUS
057D 0668 21 01           NI    H'01'     REGEN BIT = 1 ?
057E 066A 84 18           BZ    XITB      EXIT IF NOT
057F 066C 02              LR    A,QU      LOAD REGEN CTR
0580 066D 25 01           CI    H'01'     COUNT = 1 ?
0581 066F 94 04           BNZ   *+5       NO, SKIP
0582 0671 29 07 50        JMP   RGP2      YES JUMP TO PROBE 2 TEST
0583 0674 25 02           CI    H'02'     COUNT = 2 ?
0584 0676 84 54           BZ    SALT      YES BR TO SALT TEST
0585 0678 25 03           CI    H'03'     COUNT = 3 ?
0586 067A 84 5A           BZ    REG9      YES BRANCH
0587 067C 25 04           CI    H'04'     COUNT = 4 ?
0588 067E 94 20           BNZ   REG2      BRANCH IF NOT ZERO
0589 0680 67        DELAY LISU  7         LOAD ISAR WITH 74
058A 0681 6C              LISL  4         R74 IS REGEN MINUTE CTR
058B 0682 70              CLR   A
058C 0683 CC              AS    S         ADD MINUTE CTR
058D 0684 84 4B           BZ    INIT      IF ZERO BR TO INIT ROUTINE
058E 0686 01        XITB  LR    A,KL      LOAD SYSTEM STATUS 2
058F 0687 18              COM   A         BOTH PORT VALID & PROBE ENA ?
0590 0688 21 0C           NI    H'0C'     SAVE PORT VALID & PROBE ENABLE BITS
0591 068A 94 12           BNZ   XITA      EXIT IF NOT
0592 068C 45              LR    A,S       LOAD PORT STATUS
0593 068D 21 04           NI    H'04'     P2 BIT = 1 ?
0594 068F 94 09           BNZ   REGD      BR IF NOT ZERO
0595 0691 01              LR    A,KL      LOAD SYSTEM STATUS
```

```
0596 0692 21 10            NI    H'10'   BYPASS BIT = 1 ?
0597 0694 84 B9            BZ    GOTO    NO, BR TO GOTO REGEN
0598 0696 29 07 6C  REGE   JMP   REGB    JUMP TO RESET ROUTINE
0599 0699 01        REGD   LR    A,KL    LOAD SYSTEM STATUS 2
059A 069A 21 FE            NI    H'FE'   STRIP OFF SERVICE BIT
059B 069C 05               LR    KL,A    RESTORE STATUS
059C 069D 90 28    XITA    BR    XIT1    EXIT
059D 069F 67       REG2    LISU  7       LOAD ISAR WITH 74
059E 06A0 6C               LISL  4       R74 IS REGEN MINUTE CTR
059F 06A1 70               CLR   A
05A0 06A2 CE               AS    D       ADD CONTENTS OF MIN CTR DEC ISAR
05A1 06A3 CC               AS    S       ADD CONTENTS OF SEC CTR
05A2 06A4 94 7B            BNZ   REG3    BR IF NOT ZERO
05A3 06A6 02      INCRG    LR    A,QU    LOAD REGEN CTR
05A4 06A7 1F               INC   A
05A5 06A8 1F               INC   A
05A6 06A9 25 34            CI    O'64'   COMPARE WITH 64
05A7 06AB 84 52            BZ    TERM    BR IF EQUAL
05A8 06AD 91 50            BM    TERM    BR TO TERMINATE IF COUNT IS GREATER
05A9 06AF 06               LR    QU,A    RESTORE UPDATED REGEN CTR
05AA 06B0 02      FETCH    LR    A,QU    LOAD REGEN CTR
05AB 06B1 21 01            NI    H'01'   SAVE LSB
05AC 06B3 84 05            BZ    REG4    BRANCH IF EVEN
05AD 06B5 02               LR    A,QU    LOAD REGEN CTR
05AE 06B6 24 FF            AI    H'FF'   DECREMENT CTR
05AF 06B8 06               LR    QU,A    RESTORE NEW COUNT
05B0 06B9 02      REG4     LR    A,QU    RELOAD REGEN CTR
05B1 06BA 0B               LR    IS,A    LOAD ISAR WITH CURRENT REGEN COUNT
05B2 06BB 4D               LR    A,I     LOAD VALUE DATA POINTED BY ISAR
05B3 06BC 18               COM   A       COMPLIMENT DATA
05B4 06BD B0               OUTS  0       OUTPUT DATA PORT 0
05B5 06BE 70               CLR   A       CLEAR A
05B6 06BF CC               AS    S       ADD TIME DATA
05B7 06C0 84 3D            BZ    TERM    BR IF TIME DATA = ZERO
05B8 06C2 A0      INPUT    INS   0       INPUT VALVE DATA
05B9 06C3 91 32            BM    LSEC    BR TO LOAD SEC IF MSB = ONE
05BA 06C5 4C               LR    A,S     LOAD TIME DATA
05BB 06C6 67               LISU  7       LOAD ISAR WITH 74
05BC 06C7 6C               LISL  4       R74 IS REGEN MINUTE CTR
05BD 06C8 5C               LR    S,A     LOAD MINUTE CTR
05BE 06C9 90 54   XIT1     BR    XIT2    EXIT
05BF 06CB 01      SALT     LR    A,KL    LOAD SYSTEM STATUS
05C0 06CC 21 02            NI    H'02'   SALT LOW SINCE LAST REGEN ?
05C1 06CE 94 06            BNZ   REG9    BRANCH IF YES
05C2 06D0 20 22   INIT     LI    O'42'   LOAD STARTING REGEN POINTER
05C3 06D2 06               LR    QU,A    INTO REGEN COUNTER
05C4 06D3 90 DC            BR    FETCH   BRANCH TO FETCH ROUTINE
05C5 06D5 67      REG9     LISU  7       LOAD ISAR WITH 74
05C6 06D6 6C               LISL  4       R74 IS MINUTE CTR
05C7 06D7 02               LR    A,QU    LOAD A WITH REGEN CTR
05C8 06D8 25 03            CI    H'03'   COUNT = 3 ?
05C9 06DA 84 09            BZ    REGA    BR IF YES
05CA 06DC 20 F9            LI    H'F9'   TURN ON VALVES 2 & 3
05CB 06DE B0               OUTS  0       PORT 0
05CC 06DF 72               LIS   2       LOAD 2
05CD 06E0 5E               LR    D,A     INTO MINUTES CTR  R74
05CE 06E1 5D               LR    I,A     INTO SECONDS CTR  R73
05CF 06E2 73               LIS   3       LOAD 3
05D0 06E3 06               LR    QU,A    INTO REGEN CTR
05D1 06E4 70      REGA     CLR   A       CLEAR A
05D2 06E5 CC               AS    S       AND WITH CONTENTS OF MINUTE CTR
05D3 06E6 94 9F            BNZ   XITB    BR IF NOT ZERO
05D4 06E8 72               LIS   2       LOAD 2
05D5 06E9 5E               LR    D,A     INTO MINUTE CTR
05D6 06EA 5C               LR    S,A     AND  SECOND CTR
05D7 06EB 20 FF            LI    H'FF'   TURN OFF ALL VALVES
05D8 06ED B0               OUTS  0       PORT 0
05D9 06EE 74               LIS   4       LOAD 4
05DA 06EF 06               LR    QU,A    INTO REGEN CTR
05DB 06F0 01               LR    A,KL    LOAD SYSTEM STATUS
```

```
05DC 06F1 21 AC           NI    H'AC'     RESET SALT LOW SINCE LAST REGEN BIT
05DD 06F3 05              LR    KL,A      RESTORE STATUS
05DE 06F4 90 29           BR    XIT2      EXIT
05DF 06F6 4C      LSEC    LR    A,S       LOAD TIME DATA
05E0 06F7 67              LISU  7         LOAD ISAR WITH 73
05E1 06F8 6B              LISL  3         R73 IS REGEN SECOND CTR
05E2 06F9 5D              LR    I,A       LOAD SECOND CTR
05E3 06FA 70              CLR   A         CLEAR
05E4 06FB 5C              LR    S,A       MINUTE CTR
05E5 06FC 90 21           BR    XIT2      BRANCH
05E6 06FE 20 FF   TERM    LI    H'FF'     CLEAR
05E7 0700 B0              OUTS  0         PORT 0
05E8 0701 66              LISU  6         LOAD ISAR WITH 66
05E9 0702 6E              LISL  6         R66 IS GALLONS SINCE REGEN
05EA 0703 70              CLR   A
05EB 0704 5D              LR    I,A       ZERO R66
05EC 0705 5C              LR    S,A       ZERO R67
05ED 0706 63              LISU  3         LOAD ISAR WITH 32
05EE 0707 6A              LISL  2         R32 IS TOTAL NO OF REGENS LSD
05EF 0708 20 67           LI    H'67'     DECIMAL ADJUST +1
05F0 070A DC              ASD   S         ADD DECIMAL LSD  INC ISAR
05F1 070B 5D              LR    I,A       RESTORE DATA
05F2 070C 92 05           BNC   REG7      BRANCH IF NO CARRY
05F3 070E 20 67           LI    H'67'     DECIMAL ADJUST +1
05F4 0710 DC              ASD   S         INC TOTAL NO OF REGENS MSD
05F5 0711 5C              LR    S,A       RESTORE DATA
05F6 0712 01      REG7    LR    A,KL      LOAD A WITH INTERNAL STATUS
05F7 0713 15              SL    4         MOVE VALID BIT
05F8 0714 81 57           BP    REG8      BR IF BIT = 0
05F9 0716 45              LR    A,S       LOAD A WITH WITH EXT STATUS
05FA 0717 15              SL    4         MOVE REPEAT BIT
05FB 0718 91 53           BM    REG8      BR IF ONE
05FC 071A 00      REG5    LR    A,KU      LOAD A WITH INTERNAL STATUS
05FD 071B 22 08           OI    H'08'     SET AUTO REGEN BIT
05FE 071D 04              LR    KU,A      RESTORE NEW STATUS
05FF 071E 90 54   XIT2    BR    EXIT      EXIT
0600 0720 01      REG8    LR    A,KL      LOAD SYSTEM STATUS
0601 0721 18              COM   A         BOTH PORT VALID & PROBE ENA ?
0602 0722 21 0C           NI    H'0C'     SAVE PORT VALID & PROBE ENABLE BITS
0603 0724 94 0E           BNZ   REG6      BR IF NOT
0604 0726 45              LR    A,S       LOAD PORT STATUS
0605 0727 15              SL    4         SHIFT LEFT FOUR
0606 0728 13              SL    1         POSITION P2 BIT
0607 0729 81 F0           BP    REG5      BR IF ZERO (P2 TRUE)
0608 072B 13              SL    1         POSITION P1 BIT
0609 072C 81 06           BP    REG6      BR IF ZERO ( P1 TRUE)
060A 072E 02              LR    A,OU      LOAD REGEN CTR
060B 072F 25 24           CI    H'24'     IN SECOND REGEN CYCLE ??
060C 0731 84 11           BZ    REGJ      BR IF YES
060D 0733 03      REG6    LR    A,QL      LOAD KYED DATA
060E 0734 25 B0           CI    H'B0'     VALID, MAN REGEN & ENTER = ONE ?
060F 0736 84 0F           BZ    ZERO      BR IF YES
0610 0738 25 00           CI    H'00'     MAN REGEN & ENTER = 0 ?
0611 073A 94 38           BNZ   EXIT      NO, EXIT
0612 073C 44              LR    A,4       LOAD FLAG AND KYED FILTER REG.
0613 073D 13              SL    1         POSITION FLAG BIT
0614 073E 81 34           BP    EXIT      EXIT IF ZERO
0615 0740 20 3F           LI    H'3F'     LOAD KYED FILTER CTR WITH MAX CNT
0616 0742 54              LR    4,A       RESTORE R4
0617 0743 29 06 A6 REGJ   JMP   INCPG     BR TO INCREMENT REGEN COUNTER
0618 0746 44      ZERO    LR    A,4       LOAD R4
0619 0747 22 40           OI    H'40'     SET FLAG BIT
061A 0749 54              LR    4,A       RESTORE R4
061B 074A 90 28           BR    EXIT      EXIT
061C 074C 72      REG3    LIS   2         LOAD 2
061D 074D 06              LR    QU,A      INTO REGEN COUNTER
061E 074E 90 21           BR    OFFU
061F 0750 01      RGP2    LR    A,KL      LOAD A WITH SYSTEM STATUS
0620 0751 18              COM   A         COMPLIMENT DATA
0621 0752 21 0C           NI    H'0C'     SAVE PORT VALID & PROBE ENABLE BITS
```

```
0622 0754 94 1E           BNZ   EXIT      EXIT IF BOTH NOT TRUE
0623 0756 45              LR    A,5       LOAD A WITH PORT STATUS
0624 0757 21 04           NI    H'04'     P2 BIT = 1 ?
0625 0759 94 F2           BNZ   REGB      BRANCH IF DO NOT COMPARE
0626 075B 01              LR    A,KL      LOAD SYSTEM STATUS 2
0627 075C 21 9C           NI    H'9C'     RESET LOW SALT SINCE REGEN
0628 075E 05              LR    KL,A      RESTORE STATUS
0629 075F 20 FC           LI    H'FC'     TURN ON VALVE 1&2
062A 0761 B0              OUTS  0         PORT 0
062B 0762 67              LISU  7         LOAD ISAR WITH 74
062C 0763 6C              LISL  4         R74 IS MINUTE CTR
062D 0764 70              CLR   A         CLEAR A
062E 0765 CC              AS    S         ADD CONTENTS OF MINUTE CTR
062F 0766 94 0C           BNZ   EXIT      EXIT IF NOT ZERO
0630 0768 01              LR    A,KL      LOAD STATUS
0631 0769 22 81           OI    H'81'     SET GOTO BYPASS & SERVICE BITS
0632 076B 05              LR    KL,A      RESTORE STATUS
0633 076C 00        REGB  LR    A,KU      LOAD INTERNAL STATUS REGISTER
0634 076D 21 D0           NI    H'D0'     RESET GOTO & REGEN BITS
0635 076F 04              LR    KU,A      RESTORE STATUS
0636 0770 20 FF     OFFU  LI    H'FF'     CLEAR TURN OFF ALL VALVES
0637 0772 B0              OUTS  0         PORT 0
0638
0639              *******************************************
063A              *
063B              *
063C              *                 SALT CHECK
063D              *
063E              * THIS ROUTINE CHECKS THE SALT PROBE (P2) WHEN
063F              * NOT IN REGEN, AND SETS OR CLEARS SALT LOW STATUS.
0640              *
0641              *
0642              *******************************************
0643 0773 00       EXIT  LR    A,KU      LD STATUS IN ACC
0644 0774 21 01           NI    H'01'     MASK FOR REGN BIT
0645 0776 94 1C           BNZ   CWOG      IF IN REGN, BR TO CONT WITH ON GOING
0646 0778 01              LR    A,KL      LD STATUS IN ACC
0647 0779 18              COM   A         INVERT BITS
0648 077A 21 0C           NI    H'0C'     MASK FOR VALID AND PROBES ENABLED
0649 077C 94 16           BNZ   CWOG      IF NOT BOTH BITS, BR TO CWOG
064A 077E 45              LR    A,5       LOAD EXT STATUS IN ACC
064B 077F 13              SL    1         SHIFT TO ISOLATE P3
064C 0780 00              LR    A,KU      LOAD STATUS IN ACC
064D 0781 81 05           BP    CLRS      IF SALT OK, BR TO CLEAR SALT STATUS
064E 0783 22 10           OI    H'10'     SET SALT STATUS BIT
064F 0785 90 0C           BP    RELS      BR TO RELOAD STATUS BYTE
0650 0787 21 10     CLRS  NI    H'10'     MASK FOR SALT BIT
0651 0789 84 09           BZ    CWOG      IF NO SALT STATUS, BR TO CWOG
0652 078B 01              LR    A,KL      LOAD LOWER STATUS IN ACC
0653 078C 22 02           OI    H'02'     SET SALTY REGN BIT
0654 078E 05              LR    KL,A      RESTORE LOWER STATUS
0655 078F 00              LR    A,KU      LOAD STATUS IN ACC
0656 0790 21 EF           NI    H'EF'     DELETE SALT STATUS BIT
0657 0792 04       RELS   LR    KU,A      RELOAD STATUS BYTE
0658
0659              *******************************************
065A              *
065B 0793 29 00 29 CWOG   JMP   PCBT      TO PCB TEST & CONT WITH ON GOING
065C              *
065D              *
065E              *******************************************
065F              *
0660              *
0661              *              TABLE - DISPLAY MANAGER
0662              *
0663              *
0664              *******************************************
0665              *
0666                     ORG    H'797'
0667              *
```

```
0668 0797 11      ETBL  DC    0'21'
0669 0798 13            DC    0'23'
066A 0799 15            DC    0'25'
066B 079A 17            DC    0'27'
066C 079B 19            DC    0'31'
066D 079C 1B            DC    0'33'
066E 079D 1D            DC    0'35'
066F 079E 1F            DC    0'37'
0670 079F 21            DC    0'41'
0671 07A0 00            DC    0
0672 07A1 00            DC    0
0673 07A2 00            DC    0
0674 07A3 00            DC    0
0675 07A4 00            DC    0
0676 07A5 00            DC    0
0677 07A6 23            DC    0'43'
0678 07A7 25            DC    0'45'
0679 07A8 27            DC    0'47'
067A 07A9 29            DC    0'51'
067B 07AA 2B            DC    0'53'
067C 07AB 2D            DC    0'55'
067D 07AC 2F            DC    0'57'
067E 07AD 31            DC    0'61'
067F 07AE 33            DC    0'63'
0680 07AF 35            DC    0'65'
0681              *
0682              *
0683              ***************************************************
0684              *
0685              *
0686              *          TABLE - INTERVAL TIMER
0687              *
0688              *
0689              ***************************************************
068A              *
068B              *
068C 07B0 3F      DTBL  DC    H'3F'    0
068D 07B1 06            DC    H'06'    1
068E 07B2 5B            DC    H'5B'    2
068F 07B3 4F            DC    H'4F'    3
0690 07B4 66            DC    H'66'    4
0691 07B5 6D            DC    H'6D'    5
0692 07B6 7D            DC    H'7D'    6
0693 07B7 07            DC    H'07'    7
0694 07B8 7F            DC    H'7F'    8
0695 07B9 6F            DC    H'6F'    9
0696 07BA 77            DC    H'77'    A
0697 07BB 7C            DC    H'7C'    B
0698 07BC 39            DC    H'39'    C
0699 07BD 5E            DC    H'5E'    D
069A 07BE 79            DC    H'79'    E
069B 07BF 71            DC    H'71'    F
069C 07C0 77            DC    H'77'    A
069D 07C1 39            DC    H'39'    C
069E 07C2 79            DC    H'79'    E
069F 07C3 71            DC    H'71'    F
06A0 07C4 3D            DC    H'3D'    G
06A1 07C5 76            DC    H'76'    H
06A2 07C6 06            DC    H'06'    I
06A3 07C7 38            DC    H'38'    L
06A4 07C8 73            DC    H'73'    P
06A5 07C9 6D            DC    H'6D'    S
06A6 07CA 7F            DC    H'7F'    8
06A7 07CB 40            DC    H'40'    MINUS
06A8              *
06A9              ***************************************************
06AA              *
06AB              *
06AC              *          TABLE - POWER ON RESET
06AD              *
```

```
06AE              *
06AF              ****************************************************
06B0              *
06B1              *
06B2  07CC  88    PORT    DC    H'88'    INTERNAL SYSTEM STATUS POR & GOTO RGN
06B3  07CD  10            DC    H'10'    INTERNAL SYSTEM STATUS MSD  BYPASS ON
06B4  07CE  00            DC    H'00'    CURRENT REGEN CYCLE CTR.
06B5  07CF  00            DC    H'00'    KEYBOARD STATUS
06B6  07D0  00            DC    H'00'    TIME OF DAY MINUTES
06B7  07D1  12            DC    H'12'    TIME OF DAY HOURS
06B8  07D2  00            DC    H'00'    TIME OF REGEN. MINUTES
06B9  07D3  12            DC    H'12'    TIME OF REGEN. HOURS
06BA  07D4  00            DC    H'00'    DAY OF REGEN
06BB  07D5  00            DC    H'00'    DAY OF REGEN
06BC  07D6  01            DC    H'01'    DAY OF REGEN & TODAY
06BD  07D7  00            DC    H'00'    DAY OF REGEN
06BE  07D8  00            DC    H'00'    TOTAL ACC. GALLONS X 100
06BF  07D9  00            DC    H'00'    TOTAL ACC. GALLONS MSD
06C0  07DA  00            DC    H'00'    TOTAL ACC. REGENS
06C1  07DB  00            DC    H'00'    TOTAL ACC. REGENS MSD
06C2  07DC  00            DC    H'00'    TOTAL GALLONS
06C3  07DD  02            DC    H'02'    TOTAL GALLONS  MSD
06C4  07DE  01            DC    H'01'    24 HR GAL CAPACITY
06C5  07DF  00            DC    H'00'    24 HR GAL. CAP. MSD
06C6  07E0  90            DC    H'90'    WEIGHT OF REED
06C7  07E1  FF            DC    H'FF'    CHECK SUM
06C8  07E2  81            DC    H'81'    EC10
06C9  07E3  0A            DC    H'0A'    REGEN #1
06CA  07E4  83            DC    H'83'    EC11
06CB  07E5  1A            DC    H'1A'    REGEN #2
06CC  07E6  86            DC    H'86'    EC12
06CD  07E7  02            DC    H'02'    REGEN #3
06CE  07E8  00            DC    H'00'    EC13
06CF  07E9  00            DC    H'00'    REGEN #4
06D0  07EA  00            DC    H'00'    EC14
06D1  07EB  00            DC    H'00'    REGEN #5
06D2  07EC  00            DC    H'00'    EC15
06D3  07ED  00            DC    H'00'    REGEN #6
06D4  07EE  00            DC    H'00'    EC16
06D5  07EF  00            DC    H'00'    REGEN #7
06D6  07F0  00            DC    H'00'    EC17
06D7  07F1  00            DC    H'00'    REGEN #8
06D8  07F2  00            DC    H'00'    EC18
06D9  07F3  00            DC    H'00'    REGEN #9
06DA  07F4  AA            DC    H'AA'    STATUS TO DISPLAY
06DB  07F5  AA            DC    H'AA'    STATUS TO DISPLAY
06DC  07F6  00            DC    H'00'    GALLON CT SINCE REGEN LSD
06DD  07F7  00            DC    H'00'    GALLON CT SINCE REGEN MSD
06DE  07F8  3C            DC    H'3C'    EXT. TIME BASE CTR. (59)
06DF  07F9  FF            DC    H'FF'    INTERNAL TIME BASE CTR
06E0  07FA  00            DC    H'00'    SECONDS CTR
06E1  07FB  00            DC    H'00'    REGEN SEC CTR
06E2  07FC  00            DC    H'00'    REGEN MIN CTR
06E3  07FD  00            DC    H'00'    GALLON SWITCH CTR
06E4  07FE  64            DC    H'64'    GALLON COUNT
06E5  07FF  00            DC    H'00'    DISPLAY STATUS TIMER
06E6              *
06E7              END
00

AFTN  05BE   BYP1  02E0   BYP2  02F5   BYP4  02FB   BYP5  0300
BYP6  02C2   BYP7  02C7   BYPA  02D1   BYPS  02AD   CE48  00C2
CHHP  0140   CHEK  01AA   CHKM  055B   CITE  0007   CISS  0118
CLPS  0787   CMLP  000C   COUT  0154   CPES  000B   CS00  04E0
CS01  04E5   CS02  04E8   CS03  04FE   CS04  0504   CS05  0508
CS06  0521   CITS  0505   CWNG  0795   DAD3  0582   DAD5  058E
DAD7  0597   DAPB  0000   DAYM  05CD   DDST  0102   DE01  03AF
DE02  03EA   DE03  03CC   DE04  03FB   DE05  0415   DE06  041E
DE07  0427   DE08  042A   DE09  043E   DE10  044D   DE11  0487
```

While the form of apparatus herein described constitute a preferred embodiment of the invention, it is to be understood that the invention is not limited to this precise form of apparatus, and that changes may be made therein without departing from the scope of the invention.

What is claimed is:

1. An electronic control means for initiating and controlling the resin regeneration sequence in a resin-type ion exchange apparatus of the type requiring periodic resin regeneration and having an electrically activated main control valve for controlling at least the regeneration sequence functions of backwashing, brining and rinsing, said control means comprising:

a memory means for storing therein a predetermined value loading program, a regeneration initiation program including at least the step of initiating regeneration a predetermined period after the previous regeneration, a regenerated sequence control program and a plurality of predetermined values;

a microprocessor calculating means including a clock means incorporated therein, said microprocessor calculating means connected to said memory means, for loading a plurality of predetermined values into said memory means according to said predetermined value loading program, for initiating a regeneration sequence comprising at least the steps of backwashing, brining and rinsing a predetermined period after the previous regeneration according to said regeneration initiation program and at least one of said predetermined values and for controlling said regeneration sequence by production of valve control signals according to said regeneration sequence control program and at least some of said predetermined values;

a programming means connected to said microprocessor calculating means for application of at least some of said predetermined values to said microprocessor calculating means for storing in said memory means; and an output buffer means connected to said microprocessor calculating means and the main control valve for converting said valve control signals into electrical valve operating signals for controlling the main control valve.

2. An electronic control means as claimed in claim 1, wherein:

said regeneration sequence control program coprises the steps of backwashing for a predetermined period, brining for a predetermined period and rinsing for a predetermined period; and said microprocessor calculating means controls said regeneration sequence by producing said valve control signals (1) for placing said main control valve in said backwashing state until said clock means indicates an elapsed time equal to a first predetermined value, thereafter (2) for placing said main control valve in said brining state until said clock means indicates an elapsed time equal to a second predetermined value, thereafter (3) for placing said main control valve in said rinsing state until said clock means indicates an elapsed time equal to a third predetermined value, and thereafter (4) for placing said main control valve in the ordinary operation state.

3. An electronic control means as claimed in claim 1 wherein:
   said regeneration initiation program comprises the steps of initiating said regeneration sequence at a predetermined time of day a predetermined number of days after the previous regeneration sequence,
   whereby said microprocessor calculating means initiates said regeneration sequence when said clock means indicates a time of day corresponding to a predetermined value, a number of days equal to a further predetermined value after the previous regeneration sequence.

4. An electronic control means as claimed in claim 1, wherein:
   said programming means comprises means for manually initiating a regenerating sequence and means for resetting said regeneration initiation program.

5. An electronic control means as claimed in claim 1, further comprising:
   a display means connected to said microprocessor calculating means for displaying the time remaining before initiation of the next regeneration sequence.

6. An electronic control means for initiating and controlling the resin regeneration sequence in a resin-type ion exchange apparatus of the type requiring periodic resin regeneration and having an electrically activated main control valve for controlling at least the regeneration sequence functions of backwashing, brining and rinsing, said control means comprising:
   a fluid parameter measuring means for measuring at least one parameter of the fluid flowing into the resin-type ion exchange apparatus;
   an input buffer means connected to said fluid parameter measuring means for generating an electrical signal corresponding to said at least one parameter measured by said fluid parameter measuring means;
   a memory means for storing therein a predetermined value loading program, a regeneration initiation program including at least the step of initiating regeneration according to said at least one parameter measured by said fluid parameter measuring means, a regeneration sequence control program and a plurality of predetermined values;
   a microprocessor calculating means connected to said input buffer means and said memory means for loading a plurality of predetermined values into said memory means according to said predetermined value loading program, for initiating a regeneration sequence comprising at least the steps of backwashing, brining and rinsing according to said regeneration initiation program, said electrical signal corresponding to said at least one fluid parameter measure by said fluid parameter measuring means and at least one of said predetermined values and for controlling said regeneration sequence by production of valve control signals according to said regeneration sequence control program and at least some of said predetermined values;
   a programming means connected to said microprocessor calculating means for application of at least some of said predetermined values to said microprocessor calculating means for storing in said memory means; and
   an output buffer means connected to said microprocessor calculating means and the main control valve for converting said valve control signals into electrical valve operating signals for controlling the main control valve.

7. An electronic control means as claimed in claim 6, wherein:
   said fluid parameter measuring means comprises a fluid flow measuring means for measuring the volume of fluid flow into the resin-type ion exchange apparatus;
   said electrical signal generated by said input buffer means corresponds to said volume of fluid flow measured by said fluid flow measuring means;
   said regeneration initiation program comprises at least the step of initiating said regeneration sequence after a predetermined amount of fluid has passed through said fluid flow measuring means; and
   said microprocessor calculating means initiates the regeneration sequence by calculating the volume of fluid that has passed through said fluid flow measuring means from said electrical signal corresponding to said volume of fluid flow and initiating said regeneration when said volume of fluid equals a predetermined value.

8. An electronic control means as claimed in claim 7, wherein:
   said regeneration sequence control program comprises the steps of backwashing for a predetermined period, brining for a predetermined period and rinsing for a predetermined period; and
   said microprocessor calculating means controls said regeneration sequence by producing said valve control signals (1) for placing said main control valve in said backwashing state until said clock means indicates an elapsed time equal to a first predetermind value, thereafter (2) for placing said main control valve in said brining stage until said clock means indicates an elapsed time equal to a second predetermined value, thereafter (3) for placing said main control valve in said rinsing state until said clock means indicates an elapsed time equal to a third predetermined value, annd thereafter (4) for placing said main control valve in the ordinary operation state.

9. An electronic control means as claimed in claim 7, wherein:
   said programming means comprises means for manually initiating a regenerating sequence and means for resetting said regeneration initiation program.

10. An electronic control means as claimed in claim 7, further comprising:
    a display means connected to said microprocessor calculating means for displaying the amount of fluid flow remaining before initiation of the next regeneration sequence.

* * * * *